(12) United States Patent
Shimoda et al.

(10) Patent No.: US 12,396,059 B2
(45) Date of Patent: Aug. 19, 2025

(54) COMMUNICATION SYSTEM, COMMUNICATION TERMINAL, AND NETWORK

(71) Applicant: Mitsubishi Electric Corporation, Tokyo (JP)

(72) Inventors: Tadahiro Shimoda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/734,790

(22) Filed: Jun. 5, 2024

(65) Prior Publication Data

US 2024/0324067 A1    Sep. 26, 2024

Related U.S. Application Data

(63) Continuation of application No. 17/628,123, filed as application No. PCT/JP2020/029497 on Jul. 31, 2020, now abandoned.

(30) Foreign Application Priority Data

Aug. 7, 2019    (JP) .................................. 2019-145425

(51) Int. Cl.
*H04W 76/30* (2018.01)
*H04W 60/06* (2009.01)
(Continued)

(52) U.S. Cl.
CPC ........... *H04W 76/30* (2018.02); *H04W 60/06* (2013.01); *H04W 68/005* (2013.01); *H04W 76/20* (2018.02)

(58) Field of Classification Search
None
See application file for complete search history.

(56) References Cited

U.S. PATENT DOCUMENTS

2015/0189691 A1    7/2015  Zhang et al.
2018/0199398 A1*   7/2018  Dao ...................... H04W 76/34
(Continued)

FOREIGN PATENT DOCUMENTS

WO    2019/074411 A1    4/2019

OTHER PUBLICATIONS

"3rd Generation Partnership Project; Technical Specification Group Services and System Aspects; Study on enhancement of 5G System (5GS) for vertical and Local Area Network (LAN) services (Release 16)," 3GPP TR 23.734 V16.2.0, 2019, pp. 1-117.
(Continued)

*Primary Examiner* — Lonnie V Sweet
(74) *Attorney, Agent, or Firm* — PROCOPIO, CORY, HARGREAVES & SAVITCH LEP

(57)    ABSTRACT

Provided is a technology that can increase the robustness of a communication system. A communication system includes: a communication terminal; a first network configured to perform radio communication with the communication terminal; and at least one second network configured to perform communication with the first network. When the first network determines to release connection between the first network and the communication terminal (ST1401) with the communication terminal being connected to the first network and to the at least one second network through the first network, the communication terminal or the first network instructs the at least one second network to release the connection with the communication terminal (ST1405).

10 Claims, 44 Drawing Sheets

(51) Int. Cl.
 H04W 68/00 (2009.01)
 H04W 76/20 (2018.01)

(56) References Cited

U.S. PATENT DOCUMENTS

| | | | | |
|---|---|---|---|---|
| 2018/0279411 | A1* | 9/2018 | Kang | H04W 36/0033 |
| 2019/0098537 | A1* | 3/2019 | Qiao | H04W 36/0033 |
| 2019/0200414 | A1* | 6/2019 | Abraham | H04W 76/27 |
| 2019/0313477 | A1* | 10/2019 | Kim | H04W 76/32 |
| 2019/0357301 | A1* | 11/2019 | Li | H04L 45/74 |
| 2020/0145954 | A1 | 5/2020 | Wang et al. | |
| 2020/0275515 | A1 | 8/2020 | Li et al. | |
| 2021/0281993 | A1* | 9/2021 | Tiwari | H04W 60/04 |
| 2021/0289579 | A1 | 9/2021 | Ke et al. | |

OTHER PUBLICATIONS

"QoS suppoly for access to PLMN services via SNPN and vice versa", SA WG2 Meeting #132, S2-1903275, Qualcomm Incorporated, 2019, 4 total pages.
Huang et al., "A Traffic-Based Method of Detecting Dead Internet Key Exchange (IKE) Peers", Network Working Group, RFC 3706, Informational, Feb. 2004, pp. 1-13.
Kaufman et al., "Internet Key Exchange Protocol Version 2 (IKEv2)", Internet Engineering Task Force (Ietf), Rfc 7296, Standards Track, Oct. 2014, pp. 1-142.
"3rd Generation Partnership Project; Technical Specification Group Radio Access Network; NG-RAN;NG Application Protocol (NGAP) (Release 15", 3GPP TS 38.413 V15.3.0, 2019, pp. 1-319.
"3rd Generation Partnership Project; Technical Specification Group Services and System Aspects; Procedures for the 5G System; Stage 2 (Release 16)", 3GPP TS 23.502 V16.1.1, 2019, pp. 1-494.
"3rd Generation Partnership Project; Technical Specification Group Core Network and Terminals; Non-Access-Stratum (NAS) protocol for 5G System (5GS); Stage 3 (Release 16)," 3GPP TS 24.501 V16.1.0, 2019, pp. 1-541.
"3rd Generation Partnership Project; Technical Specification Group Radio Access Network; NR; Radio Resource Control (RRC) protocol specification (Release 15)," 3GPP TS 38.331 V15.6.0, 2019, pp. 1-517.
International Search Report mailed on Nov. 5, 2020 in PCT/JP2020/032344 filed on Aug. 27, 2020 (citing references therein, 1 page).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, 2018, pp. 1-363.
"LS on HNB/HeNB Open Access Mode," 3GPP TSG-SA1 #42, S1-083461, 3GPP SA WG1, 2008, 2 total pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.2.0, 2017, pp. 1-105.
"LTE; Feasibility study for Further Advancements for E-UTRA (LTE-Advanced) (3GPP TR 36.912 version 15.0.0 Release 15)," ETSI TR 136 912 V15.0.0, 2018, 63 total pages.
"Mobile and wireless communications Enablers for the Twenty-twenty Information Society (METIS) Deliverable D1.1 Scenarios, requirements and KPIs for 5G mobile and wireless system" METIS, ICT-317669-METIS/D1.1, 2013, 84 total pages.
"3rd Generation Partnership Project; Technical Specification Group Services and System Aspects; Study on Architecture for Next Generation System (Release 14)," 3GPP TR 23.799 V14.0.0, 2016, pp. 1-522.
"3rd Generation Partnership Project; Technical Specification Group Radio Access Network; Study on new radio access technology: Radio access architecture and interfaces (Release 14)," 3GPP TR 38.801 V14.0.0, 2017, pp. 1-91.

"3rd Generation Partnership Project; Technical Specification Group Radio Access Network; Study on New Radio Access Technology Physical Layer Aspects (Release 14)," 3GPP TR 38.802 V14.2.0, 2017, pp. 1-144.
"3rd Generation Partnership Project; Technical Specification Group Radio Access Network; Study on New Radio Access Technology; Radio Interface Protocol Aspects (Release 14)," 3GPP TR 38.804 V14.0.0, 2017, pp. 1-57.
"5G; Study on new radio access technology (3GPP TR 38.912 version 14.1.0 Release 14)," ETSI TR 138 912 V14.1.0, 2017, 78 total pages.
"Revised WID on New Radio Access Technology," 3GPP TSG Ran Meeting #77, RP-172115, NTT Docomo, Inc., 2017, 47 total pages.
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.2.0, 2018, pp. 1-55.
"5G; NR; Physical channels and modulation (3GPP TS 38.211 version 15.2.0 Release 15)," ETSI TS 138 211 V15.2.0, 2018, 98 total pages.
"5G; NR; Physical layer procedures for control (3GPP TS 38.213 version 15.2.0 Release 15)," ETSI TS 138 213 V15.2.0, 2018, 101 total pages.
"5G; NR; Physical layer procedures for data (3GPP TS 38.214 version 15.2.0 Release 15)," ETSI TS 138 214 V15.2.0, 2018, 95 total pages.
"5G; NR; Overall description; Stage-2 (3GPP TS 38.300 version 15.2.0 Release 15)," ETSI TS 138 300 V15.2.0, 2018, 86 total pages.
"5G; NR; Medium Access Control (MAC) protocol specification (3GPP TS 38.321 version 15.2.0 Release 15)," ETSI TS 138 321 V15.2.0, 2018, 74 total pages.
"5G Architecture Options—Full Set," Joint RAN/SA Meeting, Deutsche Telekom AG, RP-161266, 2016, pp. 1-11.
"Universal Mobile Telecommunications System (UMTS); LTE; Architecture enhancements for V2X services (3GPP TS 23.285 version 15.2.0 Release 15)," ETSI TS 123 285 V15.2.0, 2019, 38 total pages.
"3rd Generation Partnership Project; Technical Specification Group Services and System Aspects; Architecture enhancements for 5G System (5GS) to support Vehicle-to-Everything (V2X) services (Release 16)," 3GPP TS 23.287 V1.0.0, 2019, pp. 1-47.
"3rd Generation Partnership Project; Technical Specification Group Services and System Aspects; System Architecture for the 5G System; Stage 2 (Release 16)," 3GPP TS 23.501 V16.1.0, 2019, pp. 1-367.
"RAN2-aspects of Non-Public Networks (NPN)," 3GPP TSG-RAN WG2 #105, Ericsson, R2-1900408, 2019, pp. 1-8.
"Use case for ProSe Device to Device communication for cyber-physical," 3GPP TSG-SA WG1 Meeting #86, Huawei Qualcomm, Siemens, S1-191338, 2019, 4 total pages.
"FS_eCAV—TR 22.832—D2D/ProSe communication for cooperative carrying," 3GPP TSG-SA WG1 Meeting #86, Siemens AG, S1-191580, 2019, pp. 1-7.
"Revised SID: Study on NR V2X," 3GPP TSG RAN Meeting #81, LG Electronics, RP-182111, 2018, 6 total pages.
Siemens, "eCAV—further 5G service requirements for ProSe communication for Cav", 3GPP TSG-SA WG1 Meeting #87, S1-192274, Aug. 23, 2019, 2 total pages.
SA WG2, "Presentation of TR 23.734: 'Study on 5GS Enhanced support of Vertical and LAN Services (Rel-16)' for approval", TSG SA Meeting #SP-82, SP-181105, Nov. 5, 2018, 107 total pages.
Extended European Search Report issued Jul. 7, 2023 in European Application No. 20849032.6, 9 pages.
International Search Report Repolitmailed on Sep. 29, 2020 in PCT/JP2020/029497 filed on Jul. 31, 2020 (2 pages).
"3rd Generation Partnership Project; Technical Specification Group Radio Access Network; NR; Multiplexing and channel coding (Release 15)," 3GPP TS 38.212V15.2.0, 2018, pp. 1-94.
"3rd Generation Partnership Project; Technical Specification Group Radio Access Network; Feasibility study for Further Advancements for E-UTRA (LTE-Advanced) (Release 15)," 3GPP TR 36.912 V15.0.0, 2018, 252 total pages.

(56) References Cited

OTHER PUBLICATIONS

"Mobile and wireless communications Enablers for the Twenty-twenty Information Society (METIS) Deliverable 01 .1 Scenarios, requirements and KP Is for 5G mobile and wireless system" METIS, ICT-317669-METIS/01.1, 2013, 84 total pages.

"3rd Generation Partnership Project; Technical Specification Group Radio Access Network; Study on New Radio (NR) access technology (Release 14)," 3GPP TR 38.912 V14.1.0, 2017, pp. 1-74.

"3rd Generation Partnership Project; Technical Specification Group Radio Access Network; NR; Physical channels and modulation (Release 15)," 3GPP TS 38.211 V15.2.0, 2018, pp. 1-93.

"3rd Generation Partnership Project; Technical Specification Group Radio Access Network; NR; Physical layer procedures for control (Release 15)," 3GPP TS 38.213 V15.2.0, 2018, pp. 1-98.

"3rd Generation Partnership Project; Technical Specification Group Radio Access Network; NR; Physical layer procedures for data (Release 15)," 3GPP TS 38.214 V15.2.0, 2018, pp. 1 95.

"3rd Generation Partnership Project; Technical Specification Group Radio Access Network; NR; NR and NG-RAN Overall Description; Stage 2 (Release 15)," 3GPP TS 38.300 V15.2.0, 2018, pp. 1-87.

"3rd Generation Partnership Project; Technical Specification Group Radio Access Network; NR; Medium Access Control (MAC) protocol specification (Release 15)," 3GPP TS 38.321 V15.2.0, 2018, pp. 1-73.

Chinese Patent Office, Office Action, Application No. 202080048206.5, dated Jun. 20, 2024, in 12 pages.

European Patent Office, Extended European Search Report, Application No. 24170606.8, dated Jul. 8, 2024, in 10 pages.

3GPP TSG-SA WG2 Meeting #130, S2-1900122, Jan. 21-25, Kochi, India, Introducing support for Non-Public Networks, in 15 pages.

vivo, Charter Communications, Orange, China Telecom, China Unicom, Ericsson, 3GPP TSG SA WG2 Meeting #132 "Discussion on the QoS differentiation issue when accessing to PLMN services via SNPN and vice versa", S2-1904597, Apr. 8-12, 2019, Xi'an, China, in 10 pages.

Interdigital Inc., 3GPP TSG SA WG2 Meeting #129bis "Update to Solution #20 on QoS flow", S2-1812028, Nov. 26-30, 2018, West Palm Beach, USA, in 10 pages.

Japanese Patent Office, Office Action, Application No. 2021-537291, dated Jun. 4, 2024, in 8 pages.

Indian Hearing Notice, Application No. 202147057528, dated Feb. 24, 2025, in 3 pages.

\* cited by examiner

F I G. 1
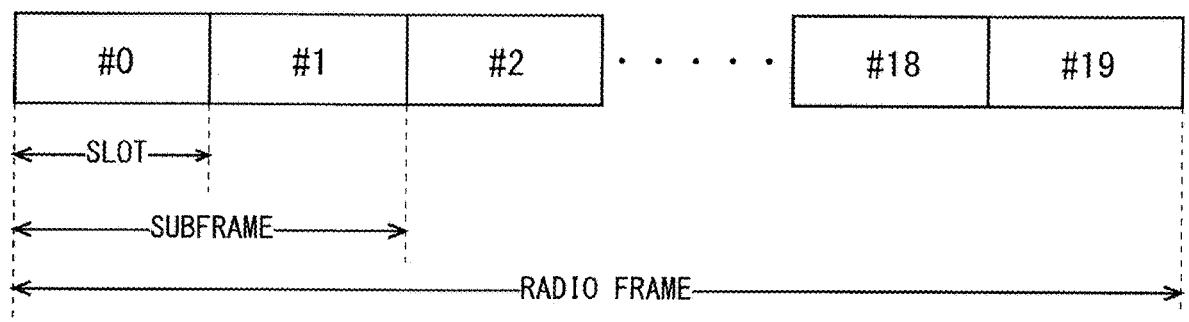

F I G. 3
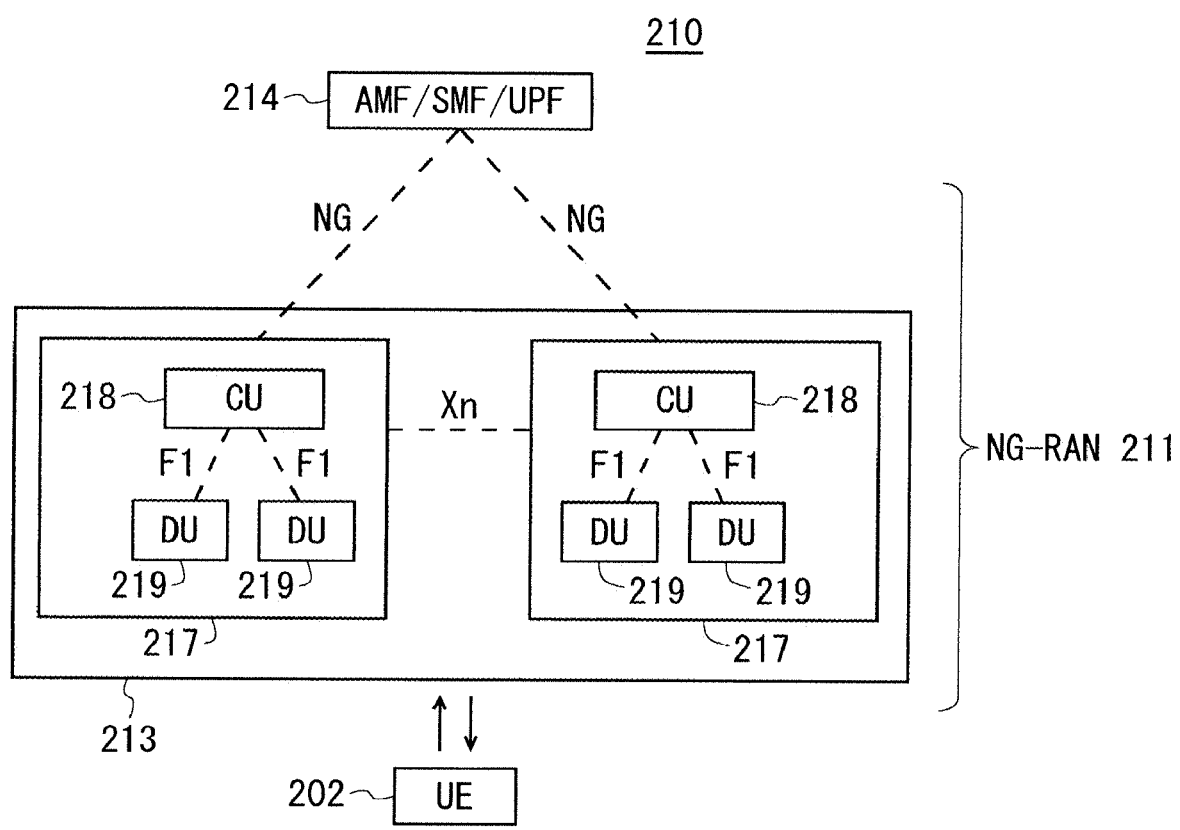

F I G. 6
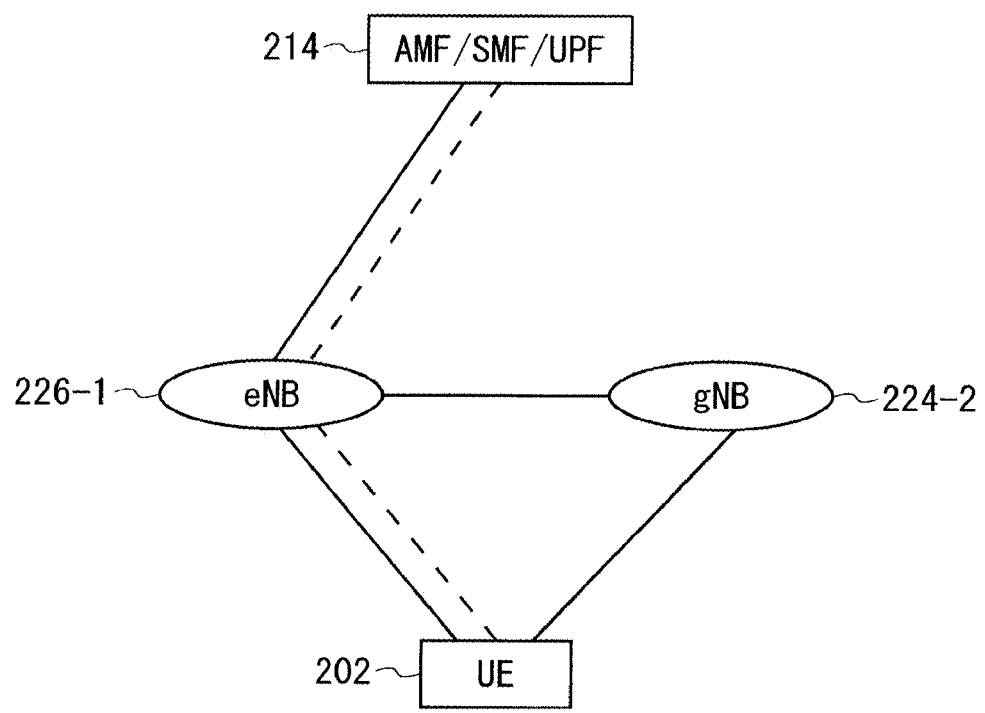

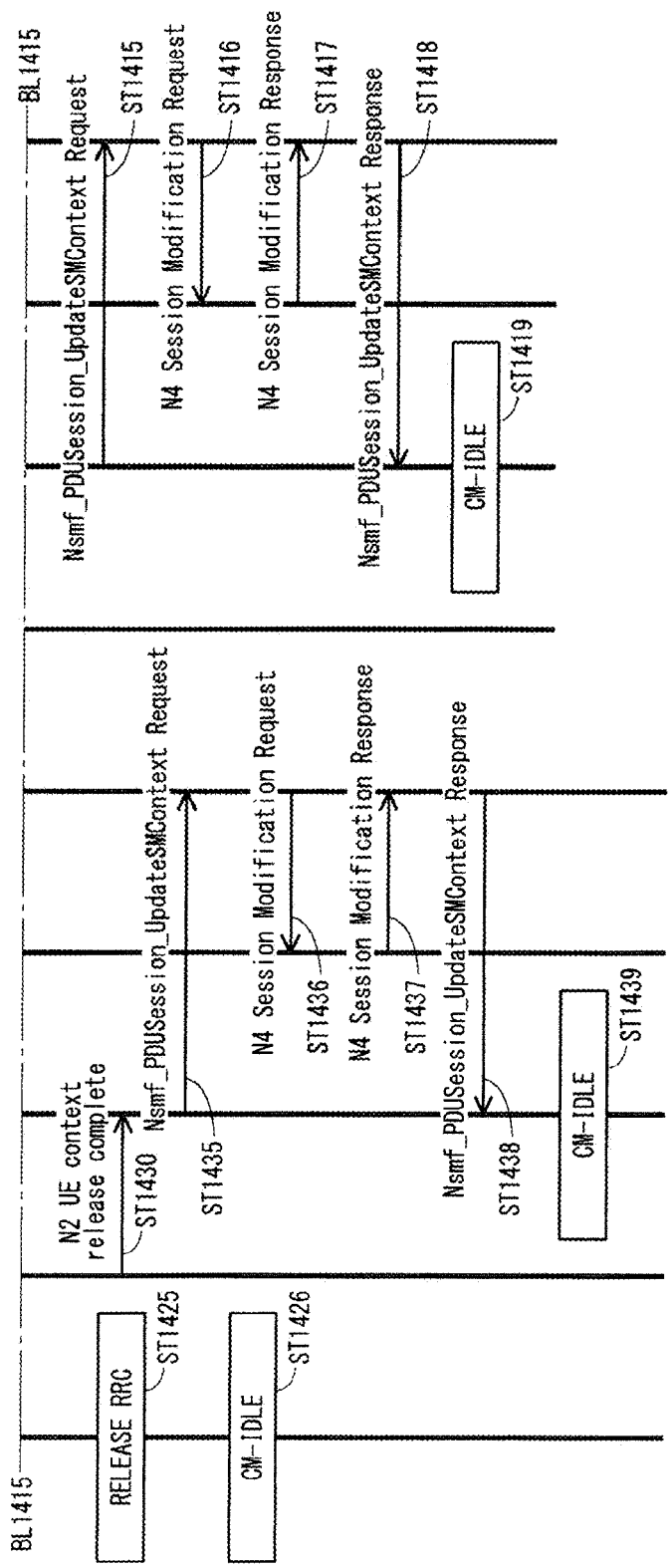
F I G. 15

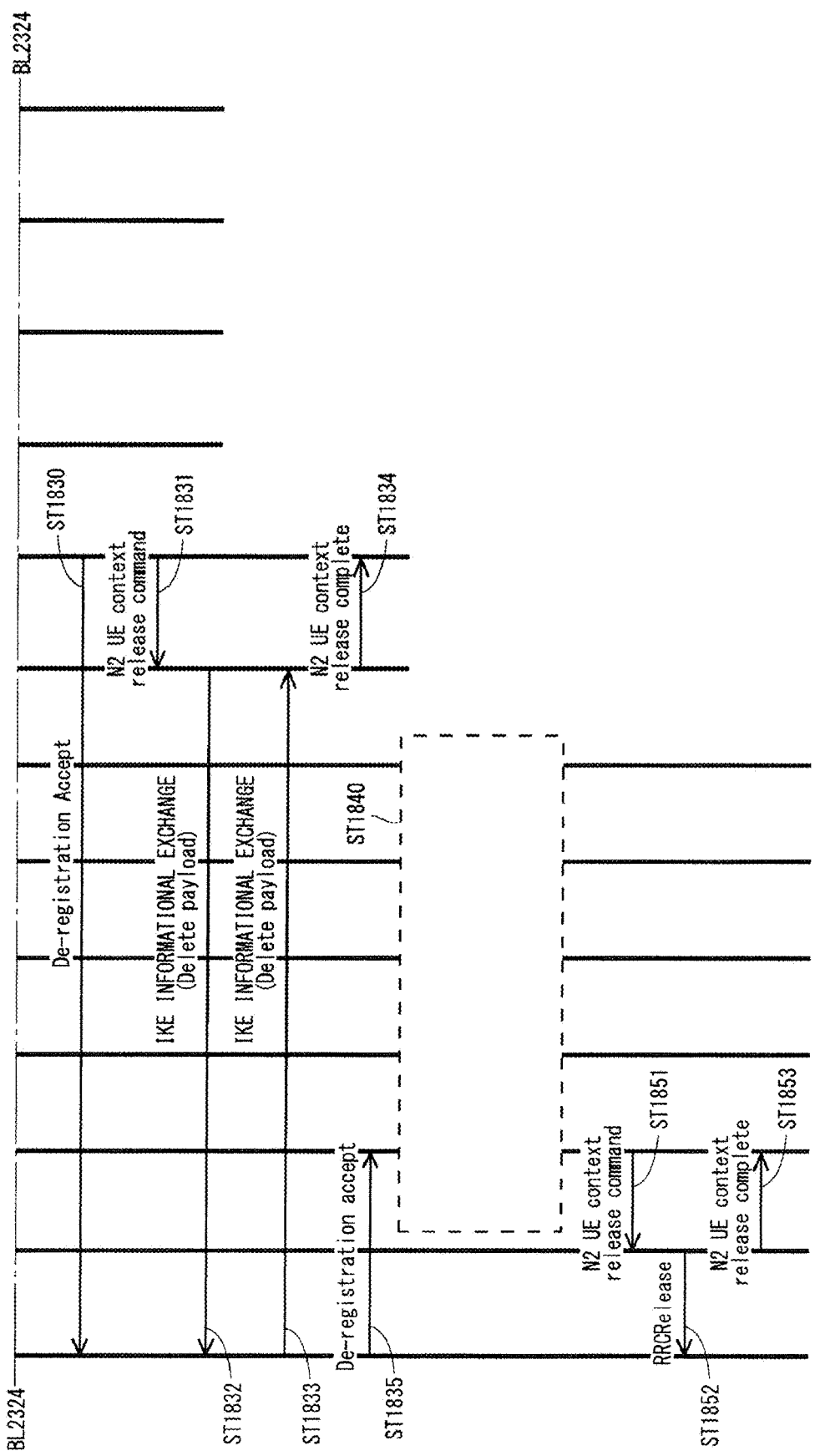

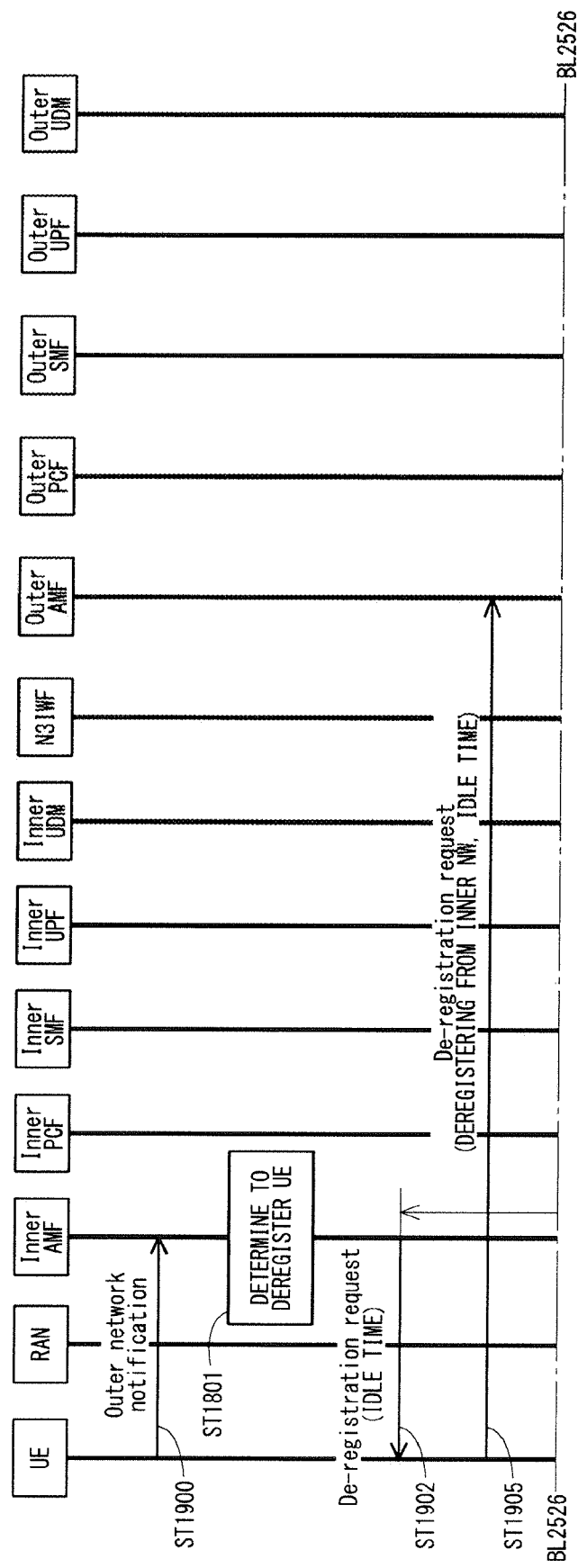
F I G. 2 5

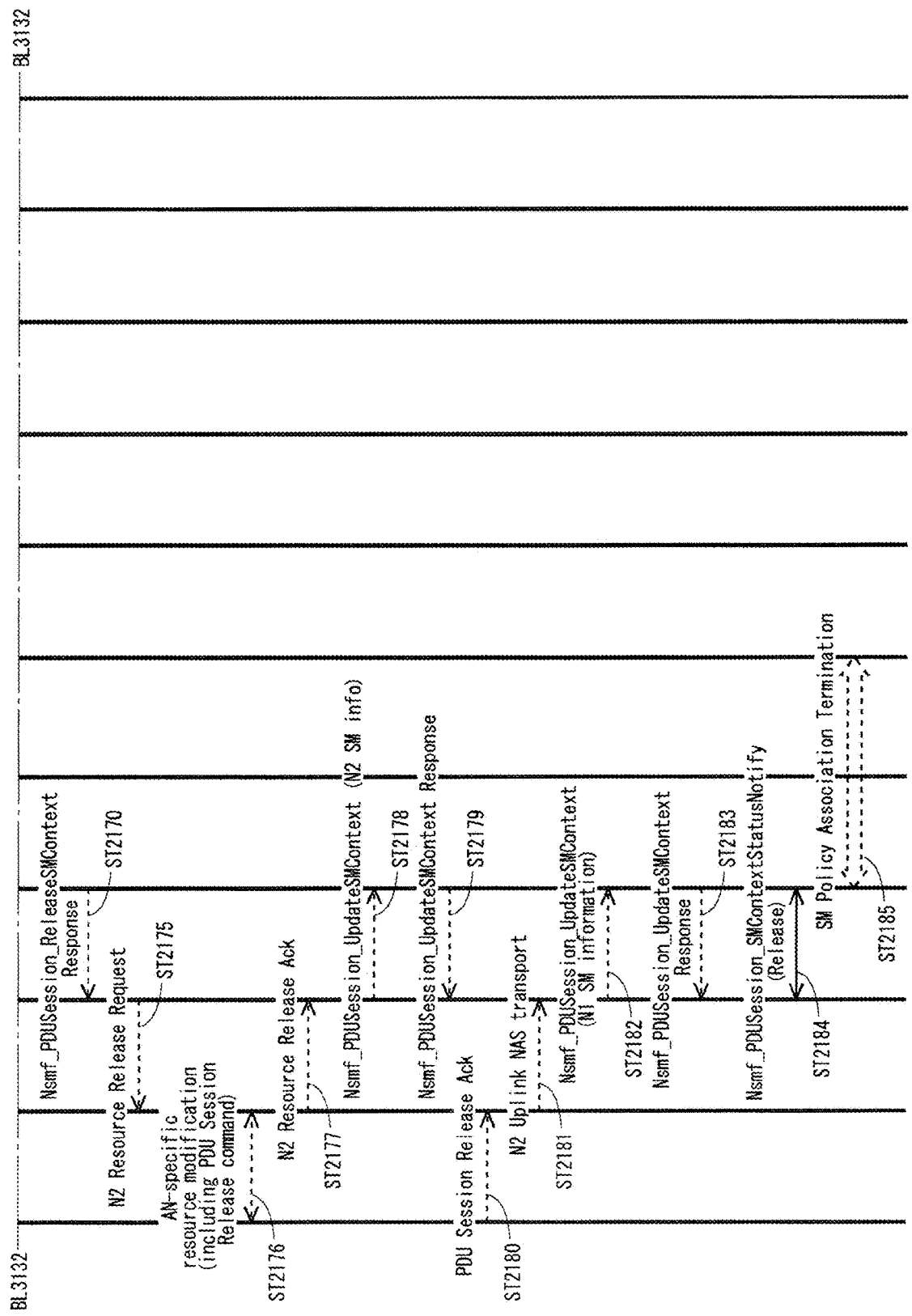

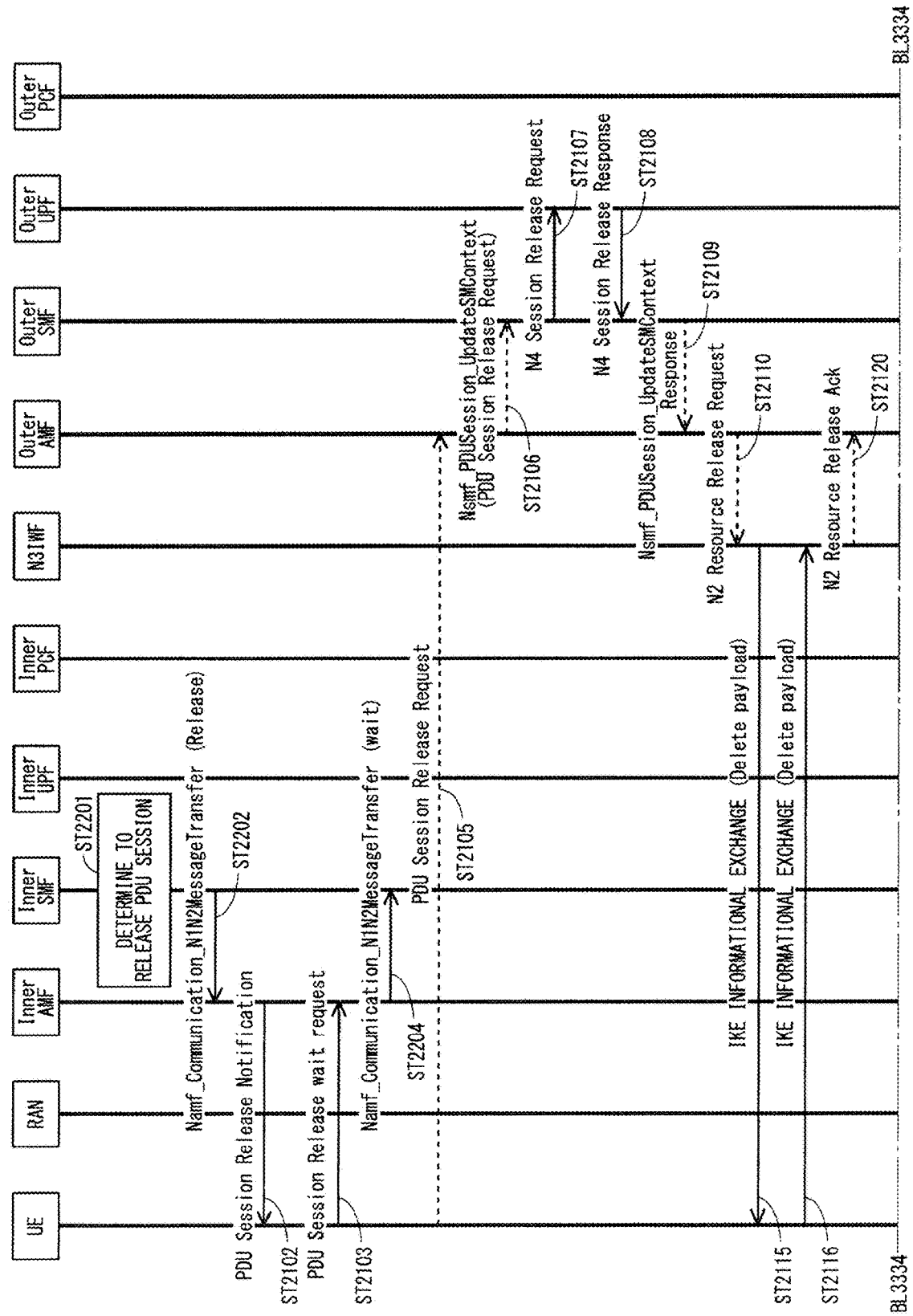
F I G. 3 3

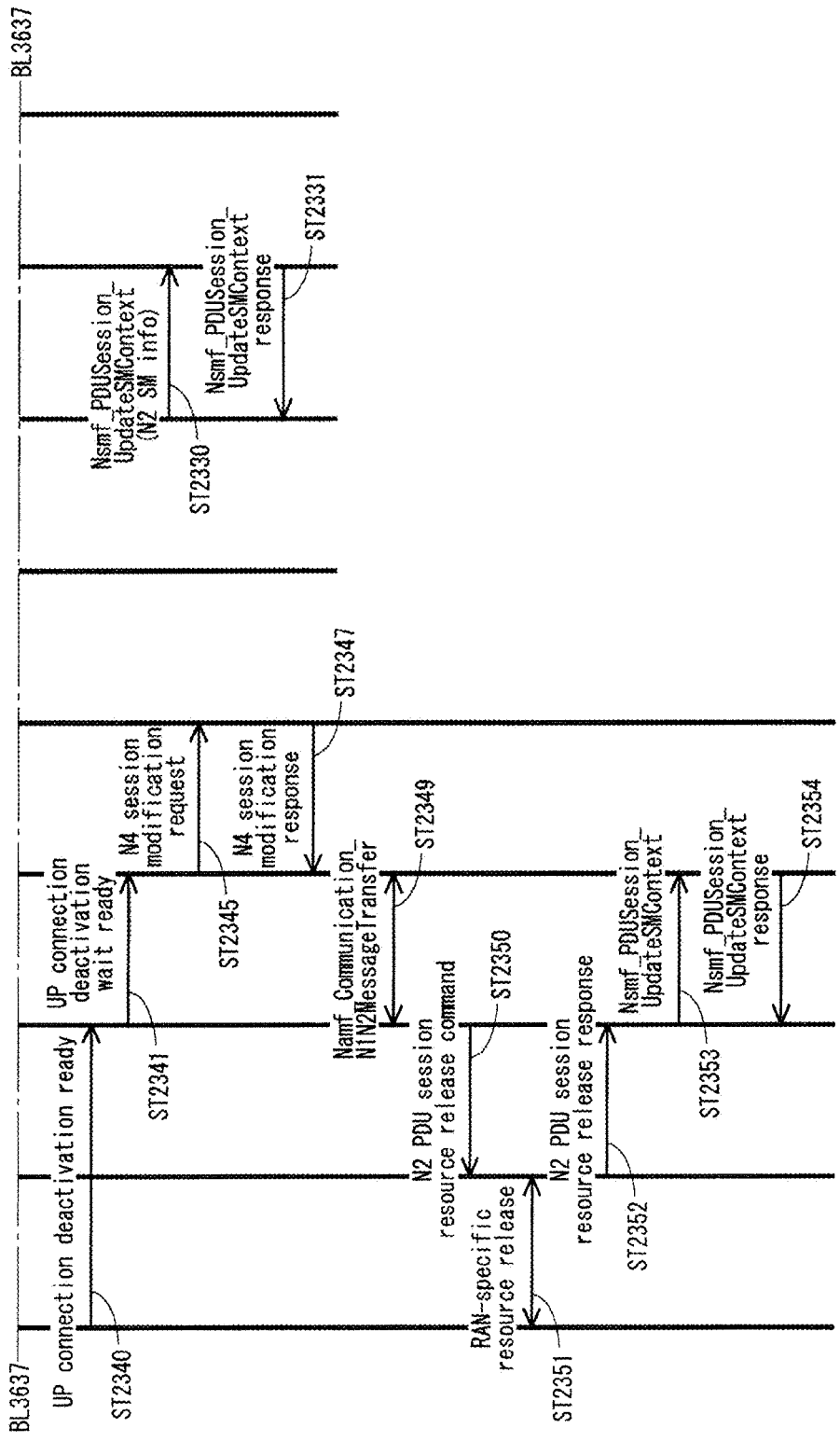
F I G. 3 7

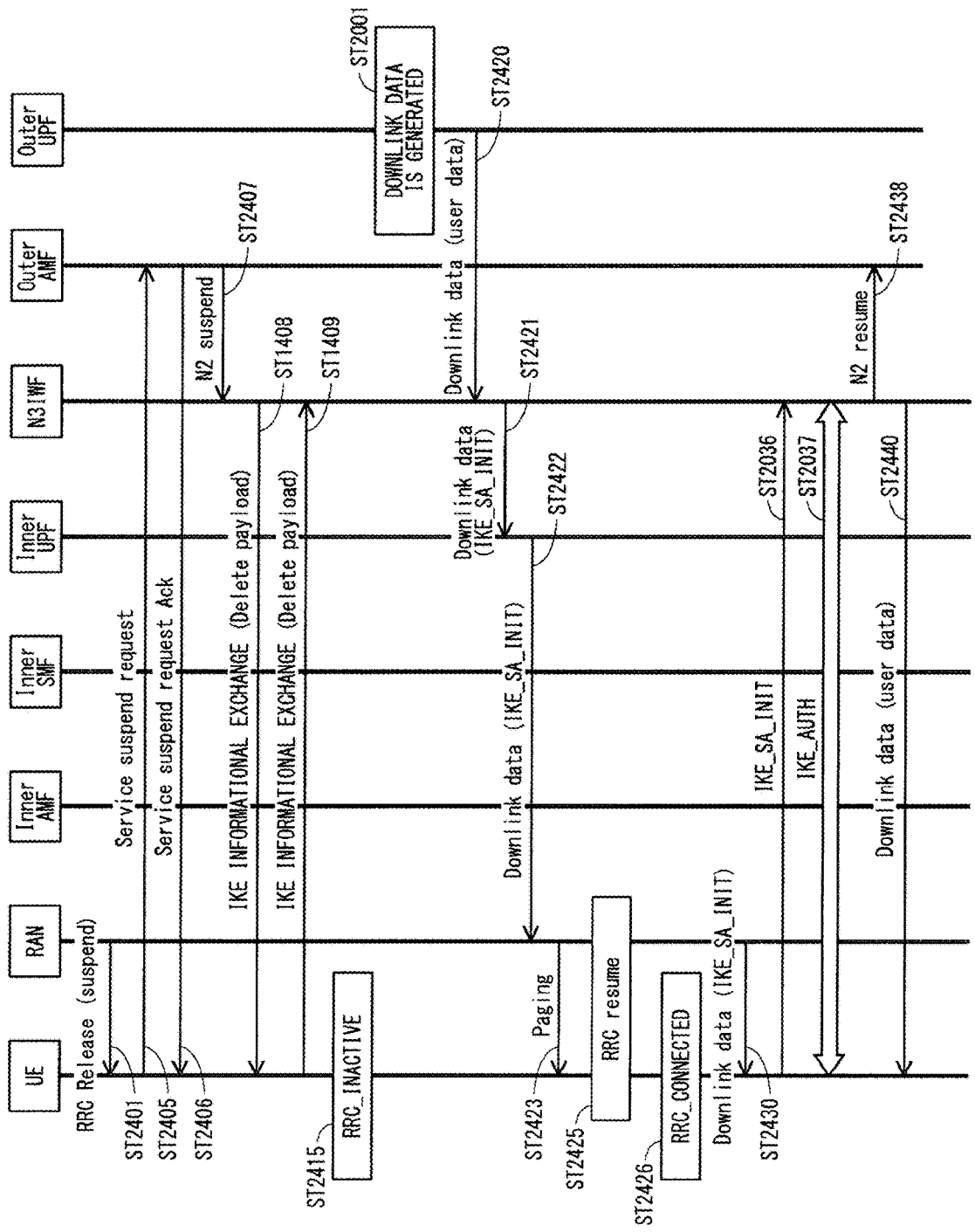
F I G. 3 8

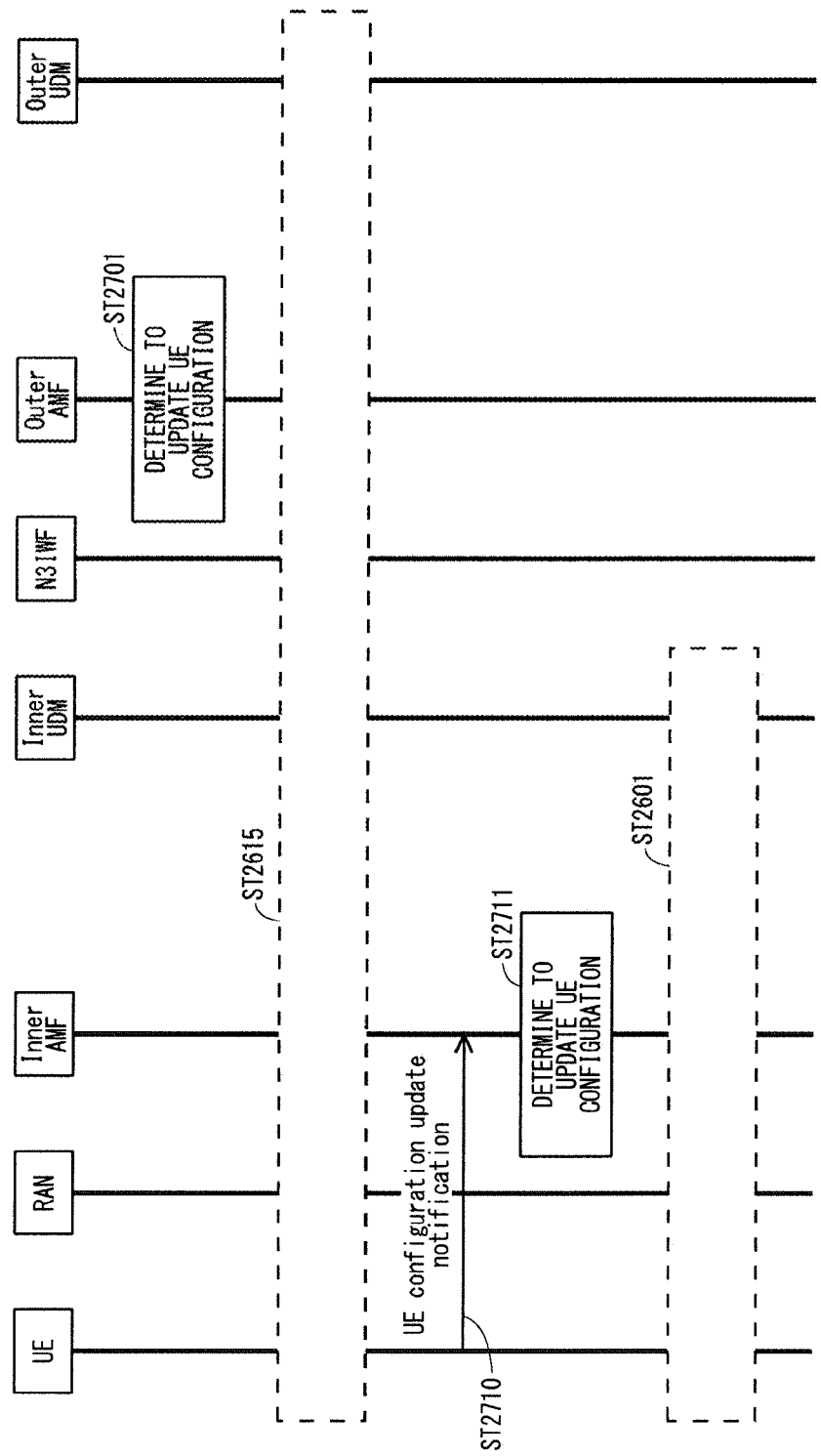
F I G. 41

F I G. 4 2
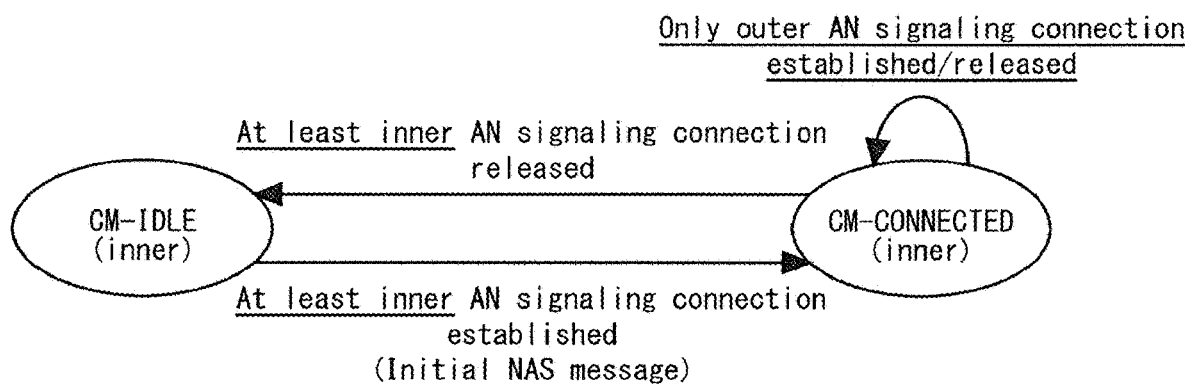

F I G. 4 3
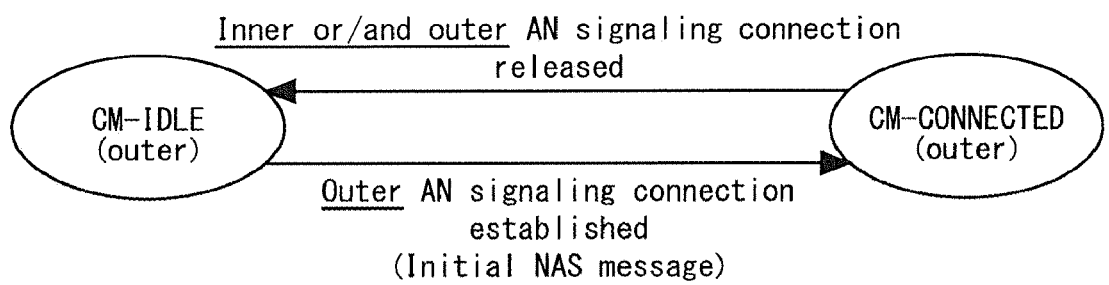

COMMUNICATION SYSTEM, COMMUNICATION TERMINAL, AND NETWORK

This application is a continuation of U.S. patent application Ser. No. 17/628,123 filed on Jan. 18, 2022, which is a National Stage of PCT/JP2020/029497 filed on Jul. 31, 2020, and claims priority to Japanese Patent Application No. 2019-145425 filed on Aug. 7, 2019, the entire contents of each of which are incorporated herein by reference.

TECHNICAL FIELD

The present disclosure relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and the secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/ negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

The secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as the secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 V15.2.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 19).

Furthermore, several new technologies have been studied in 3GPP. The example studies include non-public networks (NPNs), connection to a PLMN through the NPNs, and connection to the NPNs through the PLMN (see Non-Patent Documents 20 and 21).

PRIOR-ART DOCUMENTS

Non-Patent Documents

Non-Patent Document 1: 3GPP TS 36.300 V15.4.0
Non-Patent Document 2: 3GPP S1-083461
Non-Patent Document 3: 3GPP TR 36.814 V9.2.0
Non-Patent Document 4: 3GPP TR 36.912 V15.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.2.0
Non-Patent Document 9: 3GPP TR 38.804 V14.0.0
Non-Patent Document 10: 3GPP TR 38.912 V14.1.0
Non-Patent Document 11: 3GPP RP-172115
Non-Patent Document 12: 3GPP TS 37.340 V15.2.0
Non-Patent Document 13: 3GPP TS 38.211 V15.2.0
Non-Patent Document 14: 3GPP TS 38.213 V15.2.0
Non-Patent Document 15: 3GPP TS 38.214 V15.2.0
Non-Patent Document 16: 3GPP TS 38.300 V15.2.0
Non-Patent Document 17: 3GPP TS 38.321 V15.2.0
Non-Patent Document 18: 3GPP TS 38.212 V15.2.0
Non-Patent Document 19: 3GPP RP-161266
Non-Patent Document 20: 3GPP TR 23.734 V16.2.0
Non-Patent Document 21: 3GPP S2-1903275
Non-Patent Document 22: 3GPP TS 23.501 V16.1.0
Non-Patent Document 23: IETF RFC7296
Non-Patent Document 24: 3GPP TS 38.413 V15.3.0
Non-Patent Document 25: 3GPP TS 23.502 V16.1.1
Non-Patent Document 26: 3GPP TS 24.501 V16.1.0
Non-Patent Document 27: 3GPP TS 38.331 V15.6.0
Non-Patent Document 28: IETF RFC3706

SUMMARY

Problems to be Solved by the Invention

In 3GPP, introduction of the NPNs using the 5G communication system (hereinafter may be referred to as the 5G system) has been studied. Introduction of the NPNs using the 5G for indoor use, for example, inside factories has been studied (see Non-Patent Document 20 (3GPP TR23.734 V16.2.0)). Connection of the UE to a public network through a NPN and connection of the UE to a NPN through a public network have been studied. However, none defines a procedure when the two networks are connected in cascade as described above. For example, in the case where the connection between the UE and the NPN is released and then the UE is connected to the public network through the NPN, none discloses how to connect the UE to the public network. This causes a problem of a malfunction between the UE and the public network, and a problem of instable operations in the communication system.

In view of the problems, one of the objects of the present disclosure is to provide a technology that can increase the robustness of the communication system.

Means to Solve the Problems

The present disclosure provides a communication system including: a communication terminal; a first network configured to perform radio communication with the communication terminal; and at least one second network configured to perform communication with the first network, wherein when the first network determines to release connection between the first network and the communication terminal with the communication terminal being connected to the first network and to the at least one second network through the first network, the communication terminal or the first network instructs the at least one second network to release the connection with the communication terminal.

The present disclosure provides a communication terminal configured to perform radio communication with a first network, wherein when the first network notifies the communication terminal to release connection between the first network and the communication terminal with the communication terminal being connected to the first network and to at least one second network through the first network, the communication terminal instructs the at least one second network to release the connection with the communication terminal.

The present disclosure provides a network configured to perform radio communication with a communication terminal and perform communication with at least another network, wherein when the network determines to release connection between the network and the communication terminal with the communication terminal being connected to the network and to the at least another network through the network, the network instructs the at least another network to release the connection with the communication terminal.

Effects of the Invention

The present disclosure can increase the robustness of the communication system.

The object, features, aspects and advantages of the present disclosure will become more apparent from the following detailed description and the accompanying drawings of the present disclosure.

BRIEF DESCRIPTION OF DRAWINGS

FIG. 1 is a diagram illustrating the configuration of a radio frame for use in an LTE communication system.

FIG. 3 is a block diagram illustrating an overall configuration of a NR communication system 210 that has been discussed in 3GPP.

FIG. 6 illustrates a structure of the DC to be performed by the eNB and the gNB that are connected to the NG core.

FIG. 15 is a sequence diagram illustrating the first example of operations for releasing the UE connected to the outer NW through the inner NW from connection with the inner NW and the outer NW according to the first embodiment.

FIG. 24 is a sequence diagram illustrating the first example of operations for deregistering the UE connected to the outer NW through the inner NW according to the first modification of the first embodiment.

FIG. 25 is a sequence diagram illustrating the second example of operations for deregistering the UE connected to the outer NW through the inner NW according to the first modification of the first embodiment.

FIG. 32 is a sequence diagram illustrating the first example of operations for releasing the outer PDU session as the inner PDU session is released for the UE connected to the outer NW through the inner NW according to the third modification of the first embodiment.

FIG. 33 is a sequence diagram illustrating the second example of operations for releasing the outer PDU session as the inner PDU session is released for the UE connected to the outer NW through the inner NW according to the third modification of the first embodiment.

FIG. 37 is a sequence diagram illustrating operations for deactivating the outer U-plane as the inner U-plane is deactivated for the UE connected to the outer NW through the inner NW according to the fourth modification of the first embodiment.

FIG. 38 is a sequence diagram illustrating the first example of operations for releasing the outer AN as the UE transitions to RRC_INACTIVE state according to the fifth modification of the first embodiment.

FIG. 41 is a sequence diagram illustrating operations for notifying the inner NW to update the UE configuration in the outer NW according to the sixth modification of the first embodiment.

FIG. 42 is a transition diagram of CM states of the UE on the inner NW, where the UE is connected to the outer NW through the inner NW, according to the second embodiment.

FIG. 43 is a transition diagram of CM states of the UE on the outer NW, where the UE is connected to the outer NW through the inner NW, according to the second embodiment.

DESCRIPTION OF EMBODIMENTS

The First Embodiment

Figure 2:
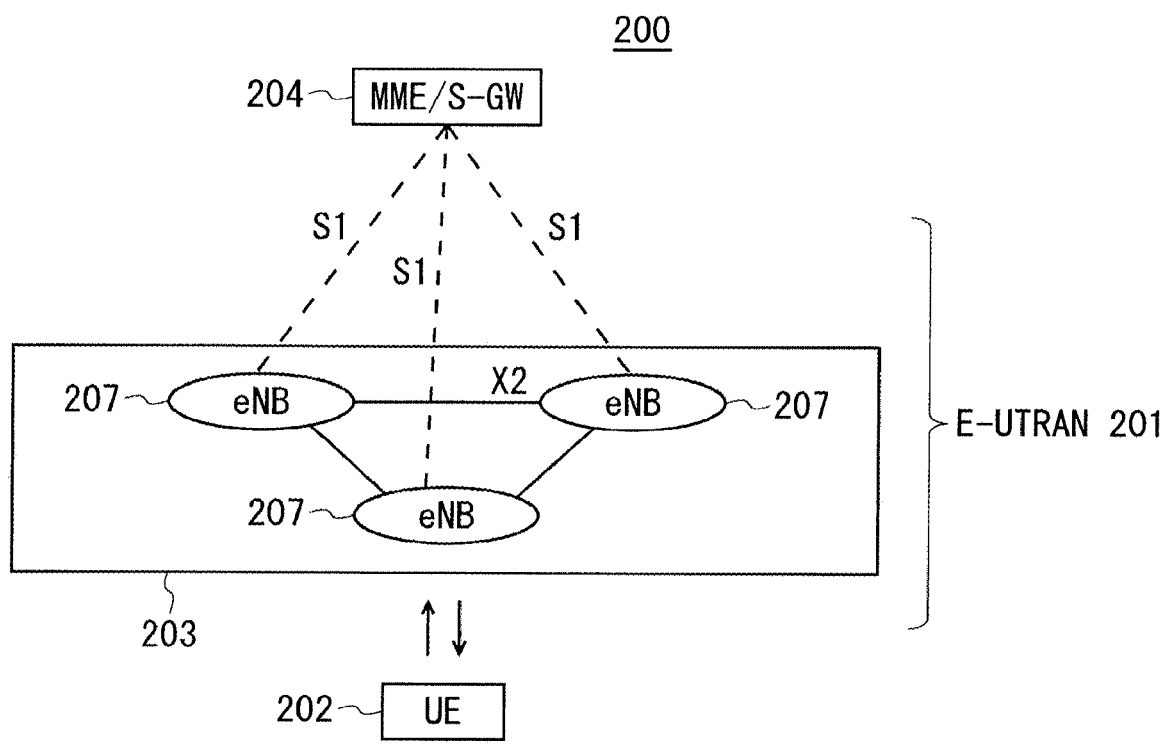
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NR base station (NG-RAN NodeB (gNB))") 213, and transmits and receives signals to and from the NR base station 213 via radio communication. Furthermore, the core network is referred to as a 5G Core (5GC).

When control protocols for the UE 202, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

The 5G communication system may further include the Unified Data Management (UDM) function and the Policy Control Function (PCF) described in Non-Patent Document 22 (3GPP TS23.501 V16.1.0). The UDM and/or the PCF may be included in the 5GC unit in FIG. 3.

The 5G communication system may further include the Non-3GPP Interworking Function (N3IWF) described in Non-Patent Document 22 (3GPP TS23.501 V16.1.0). The N3IWF may terminate an Access Network (AN) in a non-3GPP access with the UE.

Figure 4:
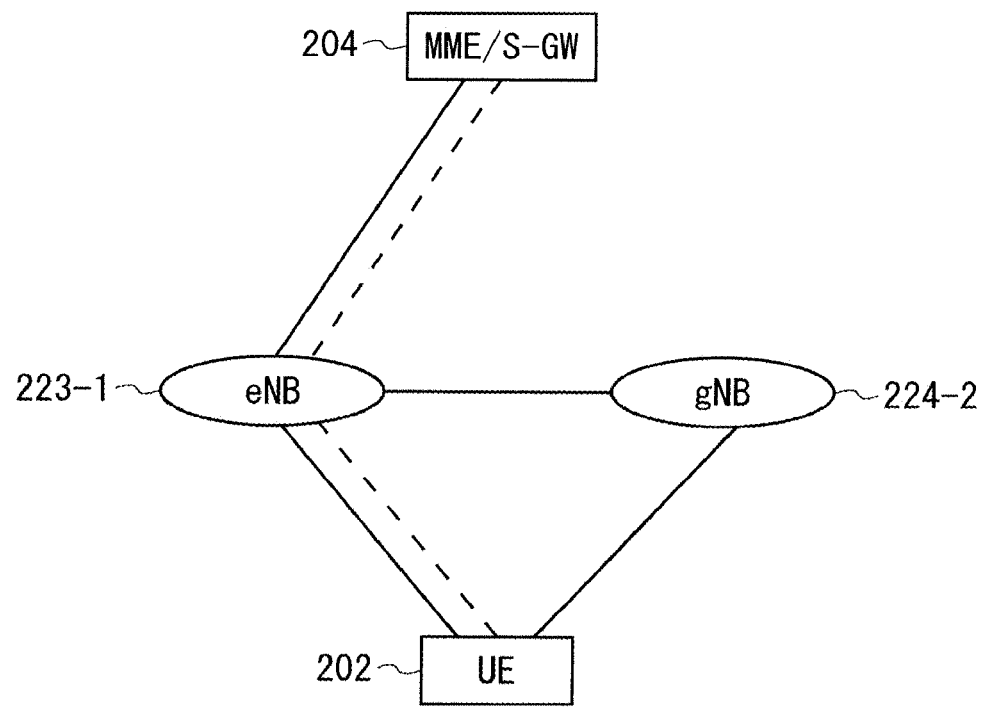
FIG. 4 illustrates a structure of the DC to be performed by an eNB and a gNB that are connected to the EPC.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes the secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

Figure 5:
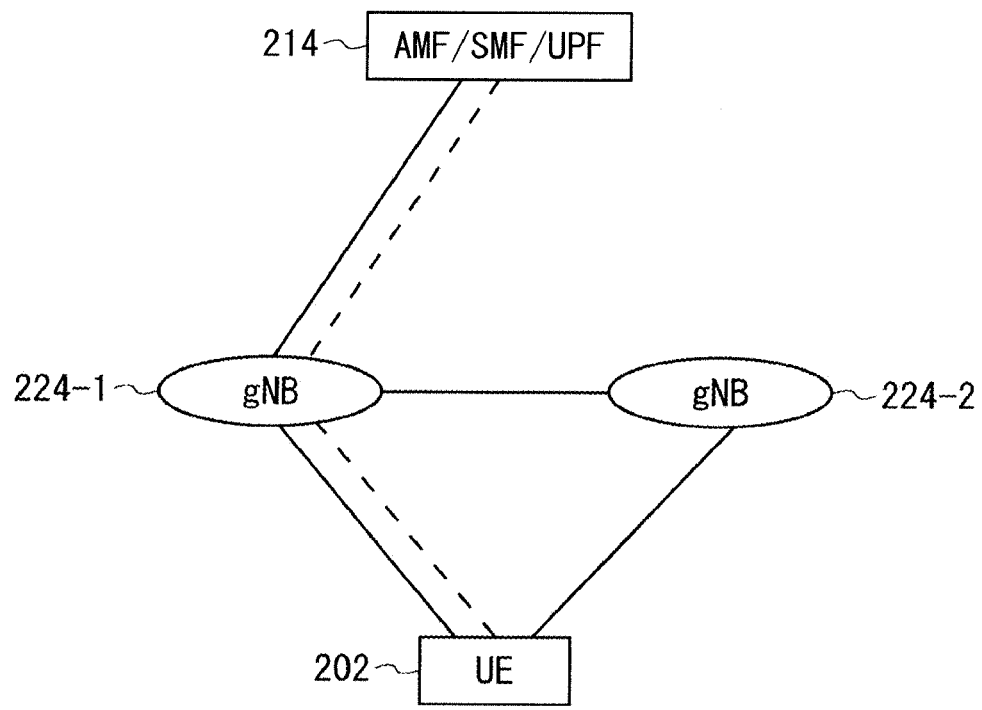
FIG. 5 illustrates a structure of the DC to be performed by gNBs that are connected to the NG core.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes the secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes the secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

Figure 7:
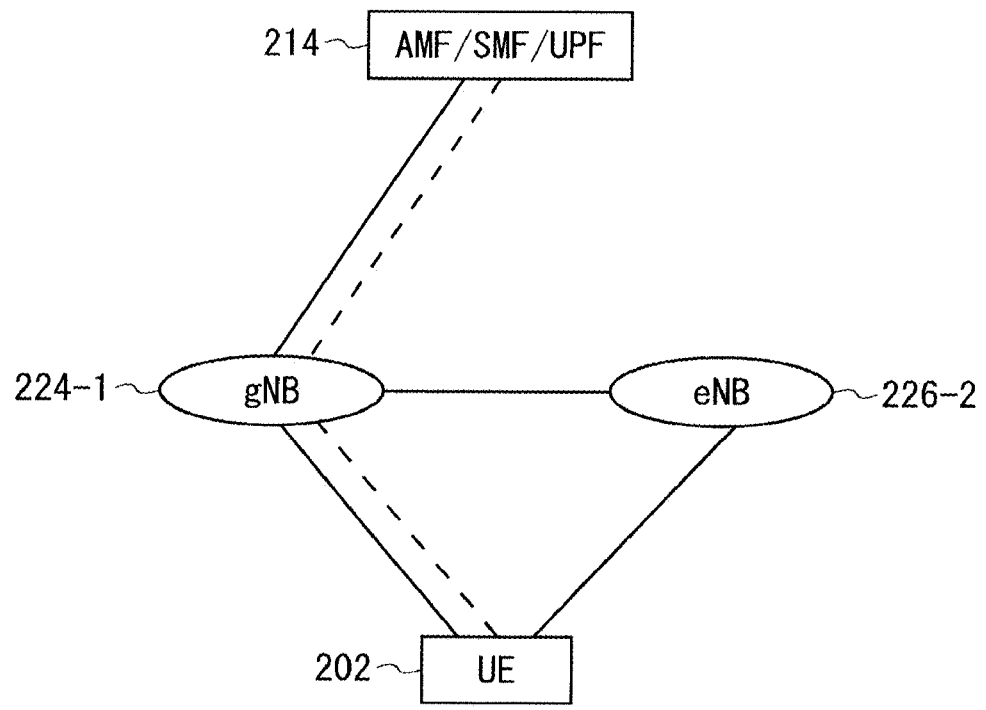
FIG. 7 illustrates a structure of the DC to be performed by the eNB and the gNB that are connected to the NG core.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes the secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
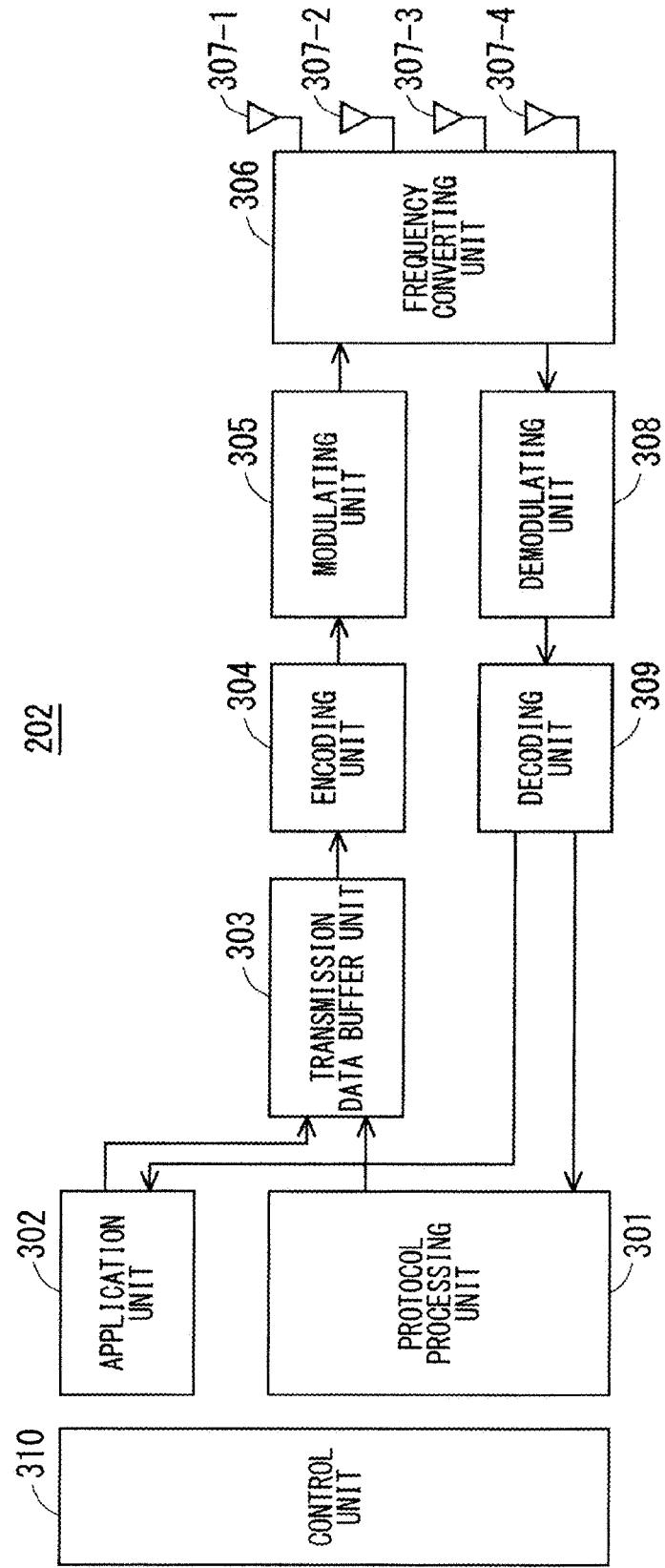
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
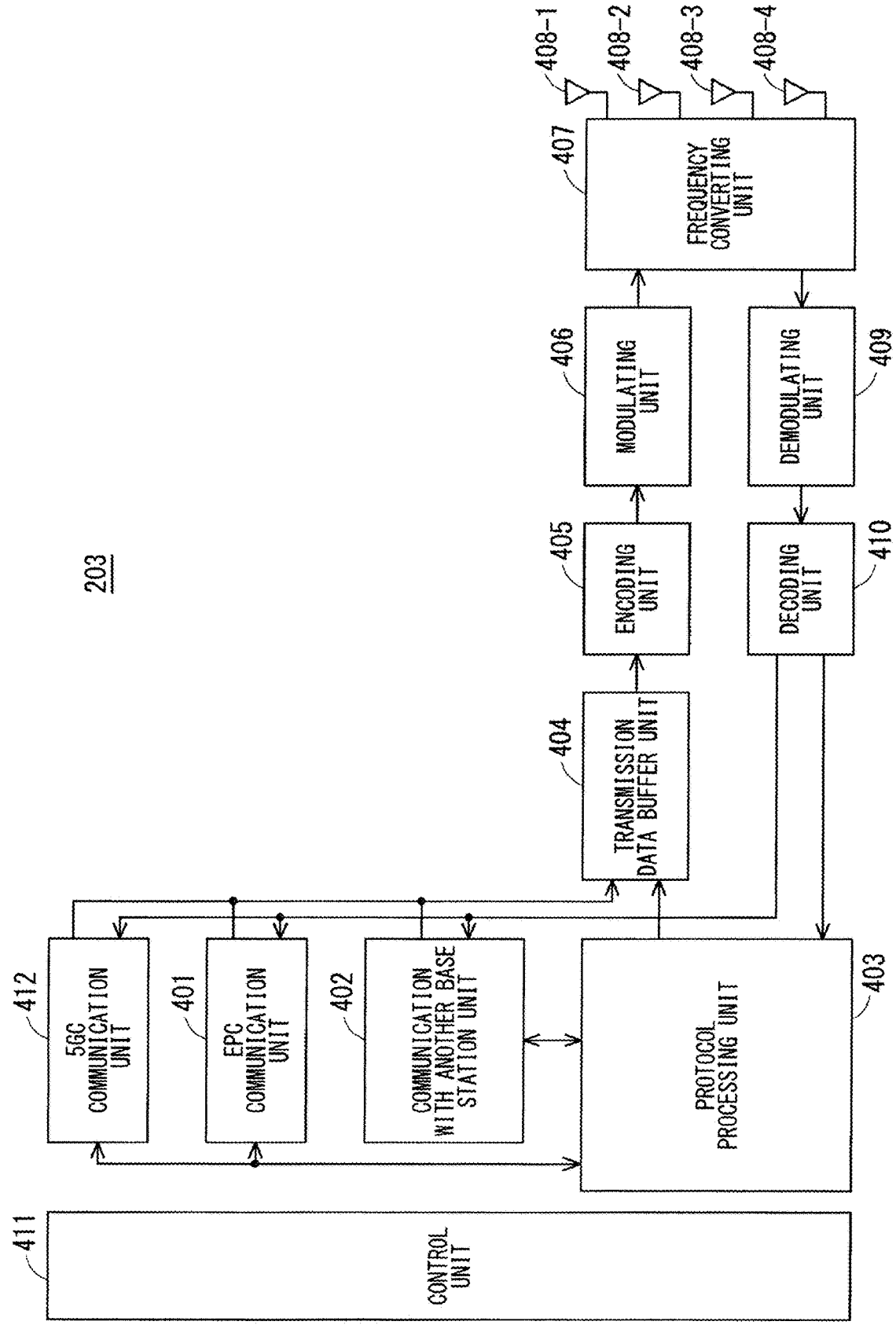
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204). A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the 5GC communication unit 412, the EPC communication unit 401, or the communication with another base station unit 402, and the user data is passed to the 5GC communication unit 412, the EPC communication unit 401, and the communication with another base station unit 402. A series of processes by the base station 203 is controlled by a control unit 411. This means that, though not shown in FIG. 9, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
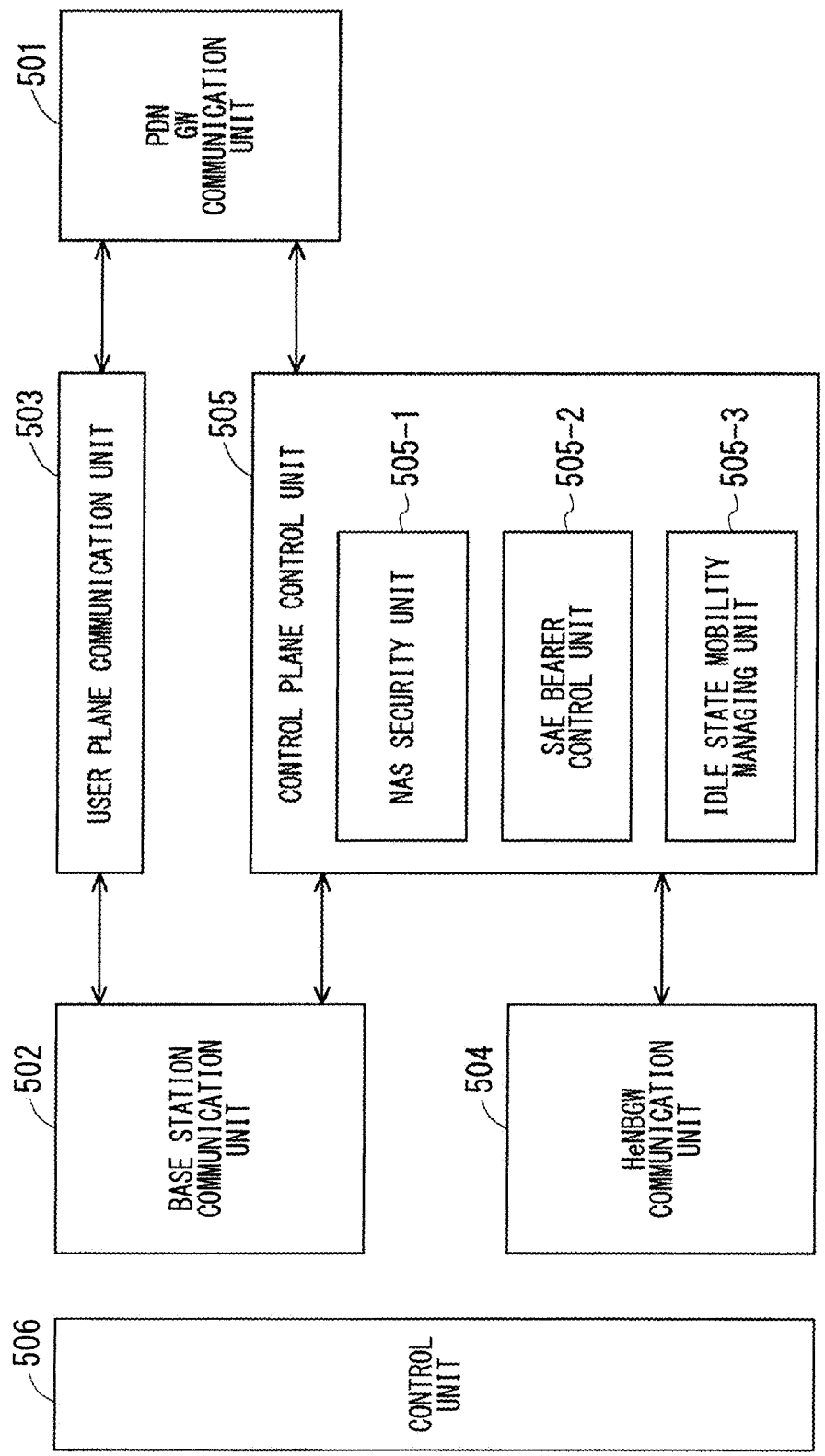
FIG. 10 is a block diagram showing the configuration of an MME.

FIG. 10 is a block diagram showing the configuration of the MME. FIG. 10 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the eNBs 207 to be connected to the MME 204a, CSG IDs, and a whitelist.

Figure 11:
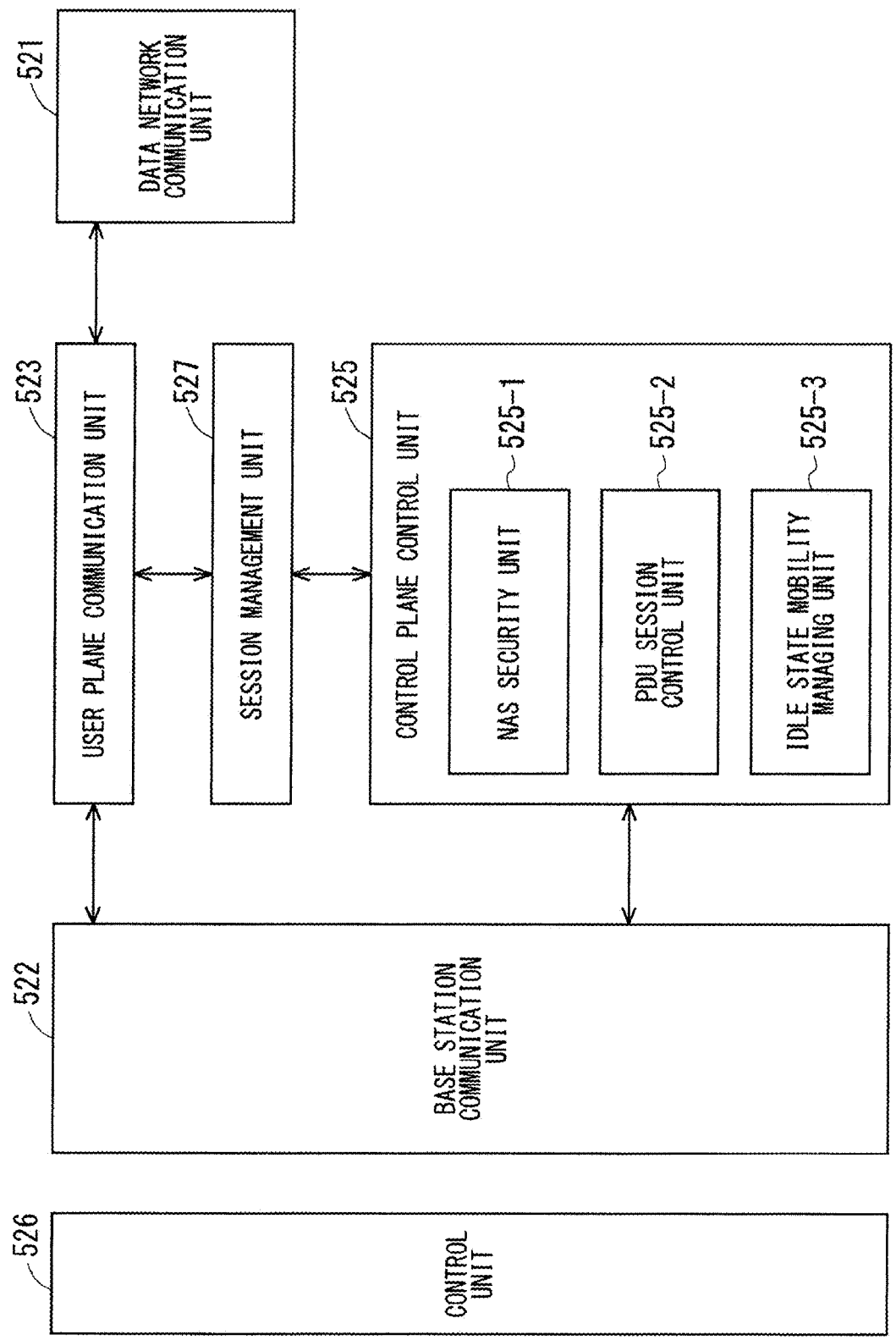
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527 through the user plane control unit 523. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility managing unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility managing unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
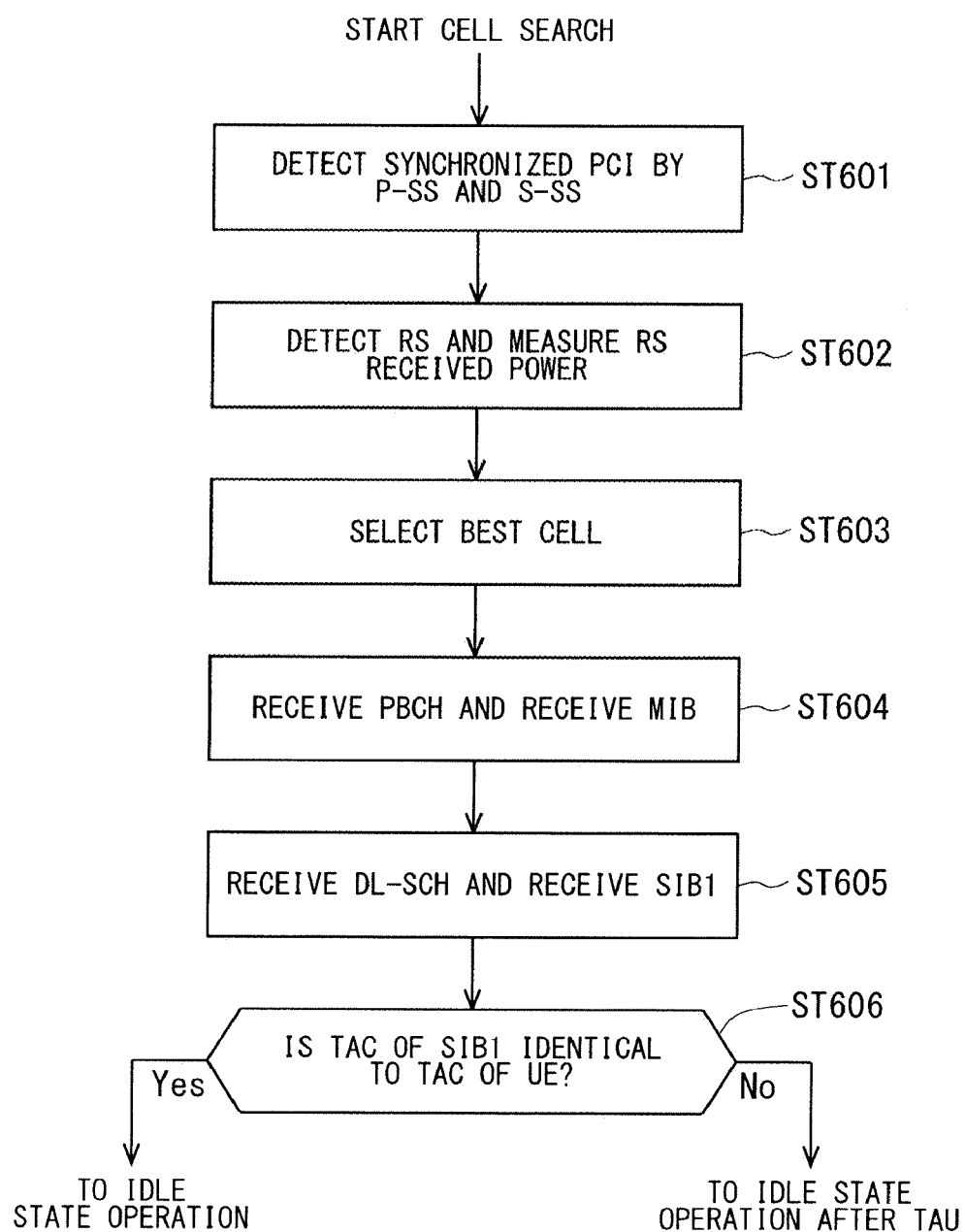
FIG. 12 is a flowchart showing an outline from a cell search to an idle state operation performed by a communication terminal (UE) in LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and the secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 13:
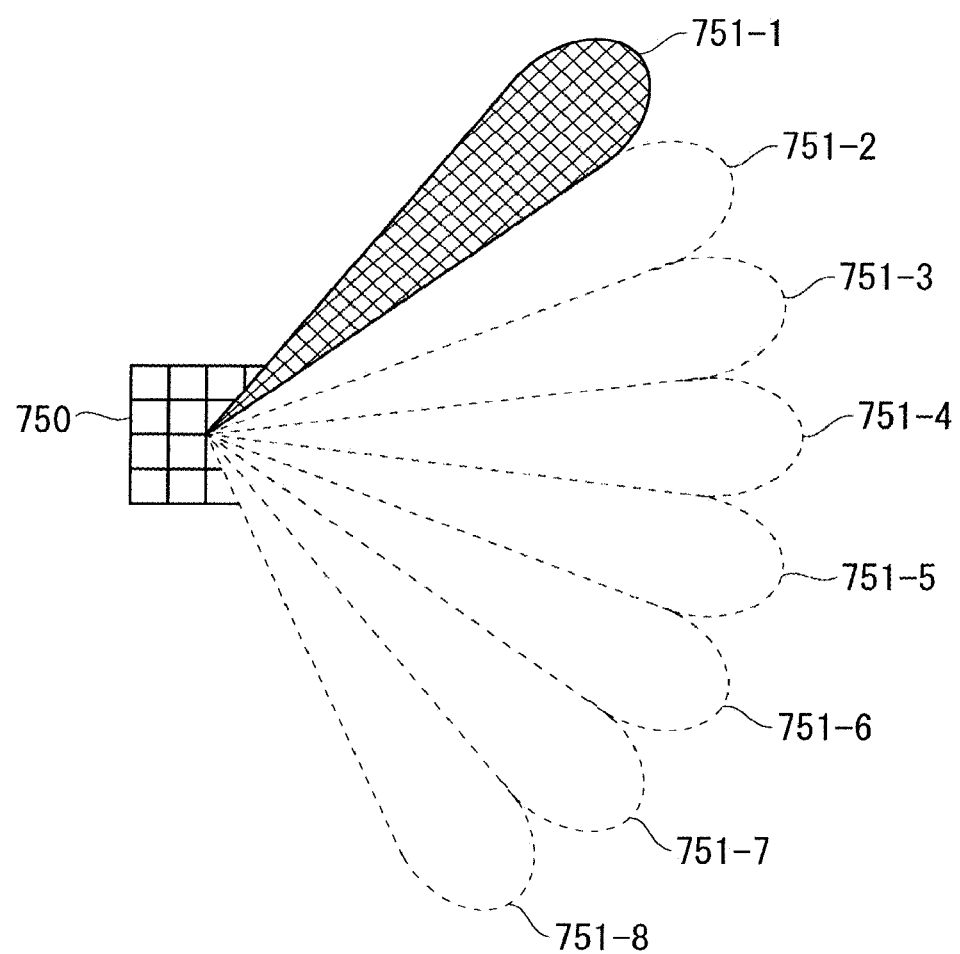
FIG. 13 illustrates an example structure of a cell in an NR system.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

The UE may be connected in cascade with a plurality of NWs. At least one of the plurality of NWs may be a NPN. The UE may be connected to a base station (hereinafter may be referred to as a RAN) served by a NW (hereinafter may be referred to as an inner NW). The UE may be connected to another NW (hereinafter may be referred to as an outer NW) through the RAN and a UPF in the inner NW (hereinafter may be referred to as an inner UPF). The UE may be connected to the outer NW through the N3IWF served by the outer NW. A connection between the inner UPF and the N3IWF may be established.

The inner NW may be a NPN or a PLMN. The outer NW may be a PLMN or a NPN. The NPN may be a standalone NPN, that is, a NPN configured without any support of a PLMN. Alternatively, the NPN may be a NPN integrated into a public network, that is, a NPN configured with support of the public network. The same may apply to the following description.

The UE may establish an N1 interface with an AMF in each of the NWs. The UE may establish the N1 interface with the AMF in the inner NW (hereinafter may be referred to as an inner AMF) through the RAN. The UE may establish the N1 interface with the AMF in the outer NW (hereinafter may be referred to as an outer AMF) through the RAN, the inner UPF, and the N3IWF. The N1 interface between the UE and the inner AMF and the N1 interface between the UE and the outer AMF may coexist.

The UE may establish an Access Network (AN) connection in the inner NW, with the RAN. The UE may establish the AN connection in the outer NW, with the N3IWF. The outer AN connection of the UE may be the IPsec connection using Internet Key Exchange Protocol Version 2 (IKEv2) disclosed in Non-Patent Document 23 (IETF RFC7296). The inner AN connection and the outer AN connection of the UE may coexist.

An N2 interface between the RAN and the inner AMF may be established in the connection between the UE and the inner NW. An N2 interface between the N3IWF and the outer AMF may be established in the connection between the UE and the outer NW. The N2 interface between the RAN and the inner AMF and the N2 interface between the N3IWF and the outer AMF may coexist.

An N3 interface between the RAN and the inner UPF may be established in the connection between the UE and the inner NW. An N3 interface between the N3IWF and a UPF in the outer NW (hereinafter may be referred to as an outer UPF) may be established in the connection between the UE and the outer NW. The N3 interface between the RAN and the inner UPF and the N3 interface between the N3IWF and the outer UPF may coexist.

An N4 interface between the inner UPF and a SMF in the inner NW (hereinafter may be referred to as an inner SMF) may be established in the connection between the UE and the inner NW. An N4 interface between the outer UPF and a SMF in the outer NW (hereinafter may be referred to as an outer SMF) may be established in the connection between the UE and the outer NW. The N4 interface between the inner UPF and the inner SMF and the N4 interface between the outer UPF and the outer SMF may coexist.

An N11 interface between the inner AMF and the inner SMF may be established in the connection between the UE and the inner NW. An N11 interface between the outer AMF and the outer SMF may be established in the connection between the UE and the outer NW. The N11 interface between the inner AMF and the inner SMF and the N11 interface between the outer AMF and the outer SMF may coexist.

The UE connected in cascade with a plurality of NWs is connected to two AMFs through one RAN. Thus, connection between the inner AMF and the UE and connection between the outer AMF and the UE have mutual dependence. However, none defines a procedure when the connections have mutual dependence. As a result, conventional sequences are not applicable as they are. This causes, for example, a problem that unnecessary memory is reserved (e.g., unnecessary data remains) in one of the AMFs.

The first embodiment discloses a method for solving the problem.

The UE releases the outer NW before releasing the inner NW. The inner AMF may start releasing the inner NW. The UE may release the outer NW after a base station (hereinafter may be referred to as the RAN) instructs releasing the RRC.

The RAN may instruct the UE to release the RRC when the inner AMF instructs the RAN to release the N2 connection on the UE. The signaling to be used for the instruction from the inner AMF to the RAN may be, for example, the N2 UE Context Release Command described in Non-Patent Document 24 (TS38.413).

The UE may request the outer AMF to release the NAS connection between its own UE and the outer NW. The UE may make the request, for example, via the NAS signaling. The NAS signaling indicating the request may be newly provided. The NAS signaling may be, for example, a service release request. This can prevent a situation in which, for example, the connection between the UE and the inner NW is disconnected while the connection between the UE and the outer NW remains in the communication system. This can reduce unnecessary memory usage in each device in the outer NW.

The NAS signaling may include information on a cause of the request for releasing the connection. The cause may be, for example, disconnection from the inner NW. This enables, for example, each device in the outer NW to determine whether to perform processes except disconnection from the outer NW, such as directly connecting the UE to the outer NW. Consequently, the flexibility in the communication system can be increased.

The outer AMF may accept the request from the UE. The outer AMF may transmit, to the UE, acknowledgement to the request. The outer AMF may transmit the request via the NAS signaling. This enables, for example, the UE to recognize acceptance of the request. Consequently, a malfunction in the communication system can be prevented.

As another example, the outer AMF may reject the request from the UE. The outer AMF may transmit, to the UE, a rejection response to the request. The outer AMF may transmit the response via the NAS signaling. The response may include information on a cause of the rejection. Examples of the cause may include a cause of maintaining the connection with the outer NW and a cause of the direct connection with the outer NW. This enables, for example, each device in the outer NW to determine whether to perform processes except disconnection from the outer NW, such as directly connecting the UE to the outer NW. Consequently, the flexibility in the communication system can be increased.

The UE may release the RRC with the RAN even when the response from the outer AMF is a rejection response. The UE may select or reselect a cell with a base station served by the outer NW. The UE may select or reselect a cell when the cause included in the rejection response from the outer AMF is the cause of the direct connection with the outer NW. This enables, for example, the UE to promptly establish the direct connection with the outer NW.

The UE may preferentially select or reselect a cell with a base station served by the outer NW in the aforementioned selection or reselection. This enables, for example, the UE to promptly establish the direct connection with the outer NW.

The UE may have a timer on the selection or reselection of a cell. The UE may reset the timer upon start of connection with the inner NW, upon start of the RRC connection with the RAN, or upon establishment of connection with the outer NW. The UE may start the timer upon start of the selection or reselection of a cell. The UE may stop the timer using completion of the RRC connection with the base station served by the outer NW as a trigger, or using transmission of the PRACH to the base station served by the outer NW as a trigger. Using expiration of the timer as a trigger, the UE may normally select or reselect a cell, for example, select or reselect a cell without prioritizing a cell with a base station served by the outer NW. This enables, for example, the UE to manage operations for selecting or reselecting a cell. The outer AMF or the RAN may have the timer. This facilitates, for example, management of the operations for selecting or reselecting a cell in the outer AMF.

The outer AMF may release the outer NW between the outer AMF and the UE. This can, for example, reduce the memory usage in each device in the outer NW when many UEs are connected in the outer NW. The outer AMF may release the outer NW in response to the request from the UE. The outer AMF may instruct the N3IWF to release the N2 connection on the UE between the outer AMF and the N3IWF. The signaling to be used for the instruction may be, for example, the N2 UE Context Release Command described in Non-Patent Document 24 (TS38.413). The N3IWF may release the N2 connection on the UE in response to the instruction. The N3IWF may release, for example, the AN connection between the N3IWF and the UE. The release of the AN connection between the N3IWF and the UE may be release of an IPsec configuration. The UE notifies the N3IWF to release the IPsec configuration.

The signaling to be used for the notification may be, for example, the IKE INFORMATIONAL exchange signaling described in Non-Patent Document 23 (IETF RFC7296). The signaling may include the Delete payload described in Non-Patent Document 23 (IETF RFC7296). The Delete payload may include information (e.g., an identifier) on Security Association (SA) to be released in the IPsec configuration. The N3IWF may release the IPsec configuration between the N3IWF and the UE. The N3IWF may notify the UE to release the IPsec configuration. The N3IWF may notify the UE to release the IPsec configuration, for example, via the signaling identical to that for the UE to notify the N3IWF to release the IPsec configuration.

The N3IWF may notify the outer AMF that the AN connection has been released. The notification may be a response to the release of the N2 connection on the UE. The signaling to be used for the notification may be, for example, the N2 UE Context Release Complete described in Non-Patent Document 24 (TS38.413).

The outer AMF instructs the outer SMF to deactivate the U-plane connection in the PDU session with the UE. The instruction may be Nsmf_PDUSession_UpdateSMContext described in 5.2.8.2.6 of Non-Patent Document 25 (TS23.502).

The UE releases the RRC connection with the RAN. The UE should release the RRC connection after requesting the outer AMF to release the NAS connection between its own UE and the outer NW. This enables, for example, the UE to request the outer AMF to release the connection with the outer NW before releasing the connection between its own UE and the inner NW.

The RAN may notify the inner AMF that the RRC connection has been released. The notification may be a response to the release of the N2 connection on the UE. The signaling to be used for the notification may be, for example, the N2 UE Context Release Complete described in Non-Patent Document 24 (TS38.413).

The inner AMF instructs the inner SMF to deactivate the U-plane connection in the PDU session with the UE. The instruction may be Nsmf_PDUSession_UpdateSMContext described in 5.2.8.2.6 of Non-Patent Document 25 (TS23.502).

Figure 14:
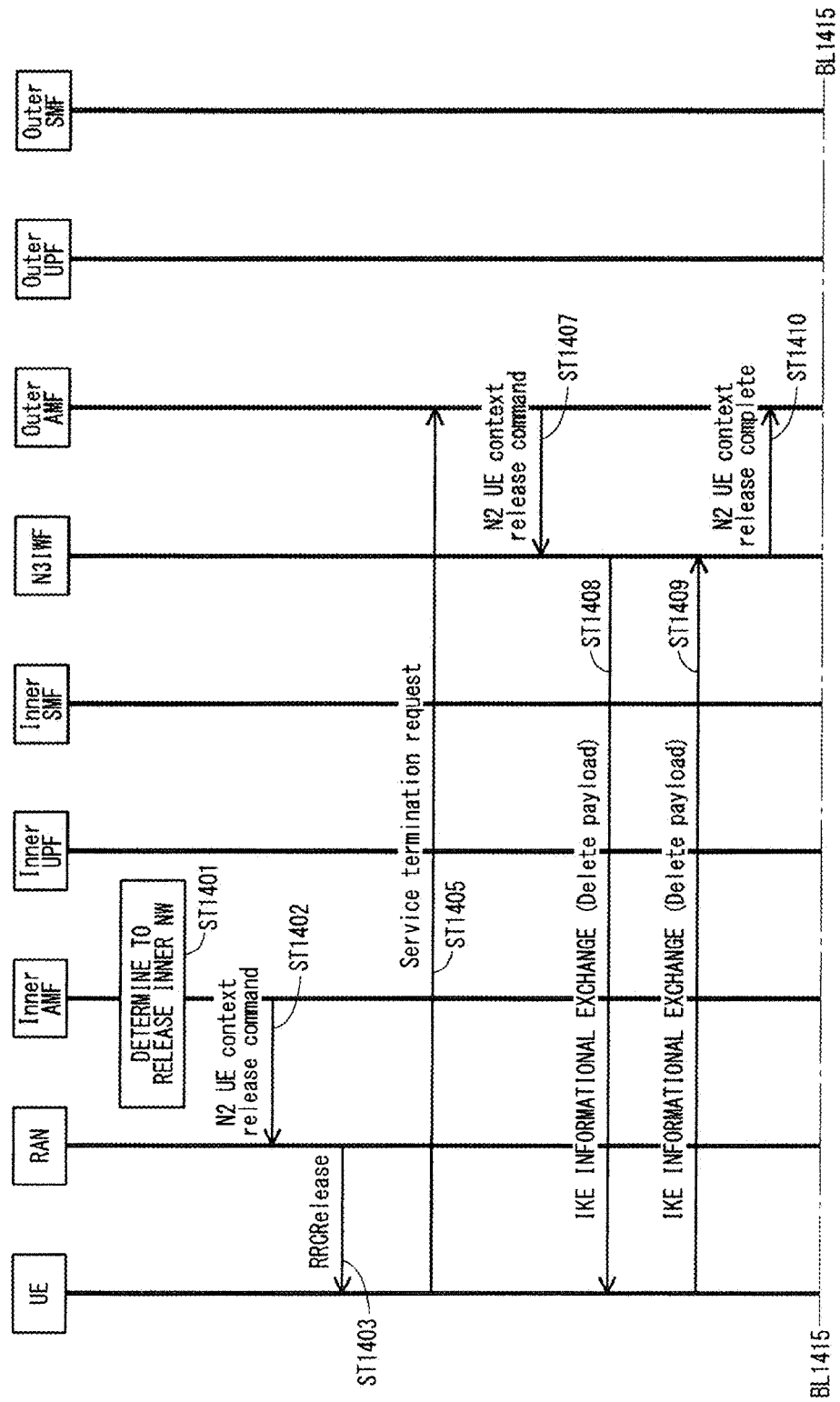
FIG. 14 is a sequence diagram illustrating the first example of operations for releasing the UE connected to an outer NW through an inner NW from connection with the inner NW and the outer NW according to the first embodiment.

FIGS. 14 and 15 are sequence diagrams illustrating the first example of operations for releasing the UE connected to the outer NW through the inner NW from the connection with the inner NW and the outer NW. FIGS. 14 and 15 are connected across a location of a border BL1415. FIGS. 14 and 15 illustrate an example where the inner AMF starts releasing the connection.

In Step ST1401 of FIG. 14, the inner AMF determines to release the connection between the UE and the inner NW. In Step ST1402, the inner AMF instructs the RAN to release the N2 connection on the UE between the inner AMF and the RAN. The signaling to be used for the instruction may be, for example, the N2 UE Context Release Command described in Non-Patent Document 24 (TS38.413).

In Step ST1403 of FIG. 14, the RAN instructs the UE to release the RRC connection. The signaling to be used for the instruction may be, for example, RRCRelease described in Non-Patent Document 27 (TS38.331).

In Step ST1405 of FIG. 14, the UE requests the outer AMF to release the NAS connection between its own UE and the outer NW. The UE may make the request via the NAS signaling. The NAS signaling may be the existing signaling described in Non-Patent Document 26 (TS24.501), or new signaling (e.g., Service termination request). The NAS signaling may include information on a cause of the request. The information on a cause may be, for example, release of the inner NW. The outer AMF may start operations for releasing the outer NW via the NAS signaling.

In Step ST1407 of FIG. 14, the outer AMF instructs the N3IWF to release the N2 connection on the UE between the outer AMF and the N3IWF. The signaling to be used for the instruction may be, for example, the N2 UE Context Release Command described in Non-Patent Document 24 (TS38.413).

In Steps ST1408 and ST1409 of FIG. 14, the AN connection between the N3IWF and the UE is released. In the example of FIG. 14, the IPsec configuration between the N3IWF and the UE is released. In Step ST1408, the N3IWF notifies the UE to release the IPsec configuration. The signaling to be used for the notification may be, for example, the IKE INFORMATIONAL exchange signaling described in Non-Patent Document 23 (IETF RFC7296). The signaling may include the Delete payload described in Non-Patent Document 23 (IETF RFC7296). The Delete payload may include information (e.g., an identifier) on Security Association (SA) to be released in the IPsec configuration. Upon receipt of the notification in Step ST1408, the UE releases the IPsec configuration with the N3IWF. In Step ST1409, the UE notifies the N3IWF that the IPsec configuration has been released. The UE may give the notification to the N3IWF, for example, via the same signaling in Step ST1408. Upon receipt of the notification in Step ST1409, the N3IWF recognizes that the IPsec configuration in the UE has been released. In Step ST1410, the N3IWF notifies the AMF that the AN connection has been released.

In Step ST1415 of FIG. 15, the outer AMF requests the outer SMF to deactivate the PDU session on the UE. For example, the Nsmf_PDUSession_UpdateSMContext request disclosed in 5.2.8.2.6 of Non-Patent Document 25 (TS23.502) may be used as the deactivation request in Step ST1415. The deactivation request in Step ST1415 may include information on the PDU session to be deactivated, for example, information on an identifier of the PDU session. In Step ST1416, the outer SMF requests the outer UPF to delete tunneling information with the UE. The request in Step ST1416 may include information on the PDU session from which the tunneling information is to be deleted, for example, information on an identifier of the PDU session. In response to the request in Step ST1416, the outer UPF deletes the tunneling information with the UE. In Step ST1417, the outer UPF transmits, to the outer SMF, a response to the request for deactivating the PDU session. For example, the N4 Session Modification procedure disclosed in 4.4.1.3 of Non-Patent Document 25 (TS23.502) may be used as Steps ST1416 and ST1417. In Step ST1418, the outer SMF transmits, to the outer AMF, a response to the request for deactivating the PDU session. For example, the Nsmf_PDUSession_UpdateSMContext response disclosed in 5.2.8.2.6 of Non-Patent Document 25 (TS23.502) may be used as the response in Step ST1418. In Step ST1419, the outer AMF completes the release of the connection with the UE, and transitions to CM-IDLE state.

In Step ST1425 of FIG. 15, the UE releases the RRC connection with the RAN. In Step ST1426, the UE transitions to CM-IDLE state as the connection between the UE and the inner AMF and the connection between the UE and the outer AMF are released.

In Step ST1430 of FIG. 15, the RAN notifies the inner AMF of the completion of the release of the N2 connection on the UE between the inner AMF and the RAN. In Step ST1435, the inner AMF requests the inner SMF to deactivate the PDU session on the UE. The inner AMF may make the request in Step ST1435 via the same signaling in Step ST1415. In Step ST1436, the inner SMF requests the inner UPF to delete the tunneling information with the UE. In response to the request in Step ST1436, the inner UPF deletes the tunneling information with the UE. In Step ST1437, the inner UPF transmits, to the inner SMF, a response to the request for deactivating the PDU session. Steps ST1436 and ST1437 may be performed via the same signaling in Steps ST1416 and ST1417. In Step ST1438, the inner SMF transmits, to the inner AMF, a response to the request for deactivating the PDU session. The inner SMF may respond in Step ST1438 via the same signaling in Step ST1418. In Step ST1439, the inner AMF completes the release of the connection with the UE, and transitions to CM-IDLE state.

The UE may hold information indicating which one of the AMFs to which the UE is connected is the inner AMF. This information may be, for example, an identifier of the inner AMF. The information may be included in, for example, information held by the UE on the AMF to which the UE is connected, or the NAS context held by the UE. This enables, for example, the UE to identify the inner AMF from among the AMFs to which the UE is connected. Consequently, a malfunction in the communication system can be prevented.

As another example, the UE may hold information indicating whether each AMF to which the UE is connected is the inner AMF, or information indicating in which stage of a cascade connection of the NWs each AMF to which the UE is connected is connected. The information may be included in, for example, information held by the UE on the AMF to which the UE is connected, or the NAS context held by the UE. The UE may hold the information, for example, in combination with an identifier of each of the AMFs. This produces, for example, the same advantages as previously described.

The UE may hold information on the number of stages in the cascade connection of the NWs. The information may be included in, for example, the information held by the UE on the AMF to which the UE is connected, or the NAS context held by the UE. The UE may, for example, determine using the information whether the cascade connection is established. As another example, the UE may determine using the information whether to request the outer AMF to release the connection. This, for example, saves the UE from having to transmit the request to the outer NW when the UE is connected to only one NW. This can reduce the amount of signaling in the communication system.

The UE may notify the upper layer (e.g., the NAS layer) in its own UE of information indicating the reception of an instruction for releasing the RRC connection from the RAN. The UE may give the notification, for example, soon after receiving the signaling indicating the instruction for releasing the RRC connection. The UE may give the notification, for example, before delay of 60 milliseconds described in 5.3.8.3 of Non-Patent Document 27 (TS38.331). The UE may request the outer AMF to release the NAS connection between its own UE and the outer NW within a duration of the delay. The UE may release the AS connection with the N3IWF (e.g., transmission of the IKE INFORMATIONAL EXCHANGE including the Delete payload from the UE to the N3IWF) within the duration of the delay. This enables, for example, the UE to complete the release of the AN connection with the N3IWF before releasing the RRC connection.

The UE may determine whether to give the notification, using information on the presence or absence of the connection between its own UE and the outer NW. For example, when the UE is connected to the outer NW, the UE may give the notification to the upper layer (e.g., the NAS layer) in its own UE before the delay of 60 milliseconds. Moreover, when the UE is not connected to the outer NW, the UE may give the notification to the upper layer (e.g., the NAS layer) in its own UE after the delay of 60 milliseconds. These enable, for example, application of conventional design to the design of the UE. Consequently, the complexity in designing the UE can be avoided.

The duration of the delay may be changed. For example, the duration of the delay may be set longer than 60 milliseconds. This can, for example, prevent the release of the RRC connection before the release of the AN connection between the UE and the N3IWF.

The inner AMF may change the duration of the delay. The UE may notify the inner AMF of information on the outer NW in advance. The information may be, for example, information indicating that the UE is connected to the outer NW through the inner NW. The UE may give the notification via the NAS signaling. The NAS signaling may be the signaling described in Non-Patent Document 26 (TS24.501), or new NAS signaling (e.g., outer NW connection notification). The inner AMF may change the duration of the delay, using the information. The inner AMF may notify the RAN of information on change in the idle time. The information may be, for example, a changed duration of the delay, or an amount of change in the duration of the delay. The information may be included in, for example, the instruction for releasing the N2 connection. The RAN may notify the UE of the information. The RAN may include the information, for example, in the signaling for releasing the RRC (RRCRelease), and notify the UE of the information.

As another example, the RAN may change the duration of the delay. The UE may notify the RAN of information on the outer NW in advance. The information may be, for example, information indicating that the UE is connected to the outer NW through the inner NW. The RAN may change the duration of the delay, using the information. The RAN may notify the UE of information on change in the idle time. The information may be, for example, a changed duration of the delay, or an amount of change in the duration of the delay. The RAN may include the information, for example, in the signaling for releasing the RRC (RRCRelease), and notify the UE of the information. For example, the duration of the delay can be changed with less amount of signaling.

The UE may have a timer for managing the time until the RRC is released. The timer may be, for example, a timer for managing the duration of the delay. The UE may reset the timer upon establishment of the RRC connection with the RAN, using the reception of notification on change in the duration of the delay from the inner AMF and/or the RAN as a trigger, or upon establishment of the AN connection with the N3IWF. The UE may start the timer using the reception of an instruction for releasing the RRC connection from the RAN as a trigger. The UE may stop the timer using release of the AS connection with the N3IWF as a trigger. Using expiration of the timer as a trigger, the UE may release the RRC connection with the RAN, or perform operations disclosed in 5.3.8.3 of Non-Patent Document 27 (TS38.331). This facilitates, for example, management of the operations for AN release in the UE. The inner AMF or the RAN may have the timer. This facilitates, for example, management of the operations for AN release in the AMF and/or the RAN.

The UE and the RAN may hold one timer to be used in the RRC (hereinafter may be referred to as an RRC timer)

per type. In other words, a new timer need not be provided for the outer NW. The UE may use the timer only for the connection with the inner NW, for example, the RAN. Examples of the timer per type may include T302, T325, and T380 described in Non-Patent Document 27 (TS38.331). The value of the timer may be changed similarly to the duration of the delay. The value of the timer may be changed when the UE is connected to the outer NW through the inner NW. The RAN or the inner AMF may change the value of the timer. This facilitates, for example, control of the UE in the communication system. A method for changing the timer may be identical to the method for changing the duration of the delay.

As another example, the UE may hold a plurality of RRC timers per type. For example, the UE may hold an RRC timer for the inner NW and an RRC timer for the outer NW per type. The RAN may hold the RRC timer for the inner NW. The N3IWF may hold the RRC timer for the outer NW. The timers per type may be, for example, the ones described above. The RAN or the inner AMF may change the value of the RRC timer for the inner NW. The N3IWF or the outer AMF may change the value of the RRC timer for the outer NW. These can, for example, increase flexibility of control of the UE in the communication system.

The plurality of timers may have dependency, for example, the magnitude relationship. For example, a value of an RRC timer in the inner NW may be larger or smaller than a value of a similar RRC timer in the outer NW. The UE may notify the RAN of the value of the RRC timer in the outer NW. The UE may notify the N3IWF of the value of the RRC timer in the inner NW. The RAN and/or the N3IWF may determine and/or change the value of the timer, using the notification. This can prevent, upon expiration of the timer in one of the NWs, an unintended operation, for example, an operation of releasing the NW. Consequently, the robustness in the communication system can be increased.

The RAN and/or the N3IWF may notify the UE of the determined and/or changed value of the timer. The RAN and/or the N3IWF may notify a cause of the determination and/or change in the notification. The cause may be, for example, information on change in the RRC timer in a NW on the opposite side. This can, for example, prevent the RAN and the N3IWF from repeating change in the RRC timer.

The UE may hold a plurality of timers in the NAS layer. For example, the timers in the NAS layer may be sorted into those for the inner NW and those for the outer NW. Each of the inner AMF and the outer AMF may hold the timers in the NAS layer. This can, for example, increase flexibility of control of the UE in the communication system. Examples of the timers in the NAS layer may include the service gap timer described in Non-Patent Document 22 (TS23.501), the barring timers described in Non-Patent Document 26 (TS24.501), and T3540 described in Non-Patent Document 26 (TS24.501).

For example, the timers in the NAS layer may be common to the inner NW and the outer NW. This can, for example, reduce the memory usage in the UE. The inner AMF and the outer AMF may share the timers, or one of the inner AMF and the outer AMF may hold the timers. The entities that hold the timers per type may be different or identical in the inner AMF and the outer AMF. The inner AMF and the outer AMF may mutually notify information on the timers. The inner AMF and the outer AMF may give the notification through the UE. The NAS signaling for the notification may be newly provided. As another example, the inner AMF and the outer AMF may give the notification via the signaling between the inner AMF and the outer AMF. An interface between the inner AMF and the outer AMF may be provided. As another example, the inner AMF and the outer AMF may give the notification through the inner SMF. The inner AMF may give the notification to the outer AMF through the inner SMF and the outer SMF, whereas the outer AMF may give the notification to the inner AMF through the outer SMF and the inner SMF. An interface between the inner SMF and the outer SMF may be provided. As another example of giving the notification through the SMFs, the inner AMF may give the notification to the outer AMF through the inner SMF, the inner UPF, and the N3IWF, through the inner SMF, the inner UPF, the N3IWF, the outer UPF, and the outer SMF, or through the RAN, the inner UPF, and the N3IWF. The outer AMF may give the notification to the inner AMF through the N3IWF, the inner UPF, and the inner SMF, through the outer SMF, the outer UPF, the N3IWF, the inner UPF, and the inner SMF, or through the N3IWF, the inner UPF, and the RAN.

Another solution is disclosed. The inner AMF notifies the UE to release the connection with its own AMF. The inner AMF may give the notification via the NAS signaling. The NAS signaling for the notification may be newly provided. The new NAS signaling may be, for example, service termination notification signaling. The UE may request release of the NAS connection between its own UE and the outer NW. The UE may make the request in response to the notification from the inner AMF to its own UE. The signaling to be used for the request may be identical to that for the aforementioned solution. In response to the notification from the UE, the outer AMF may release the connection with the UE in the outer NW. The outer AMF may release the connection with the outer NW similarly to that for the aforementioned solution.

The UE may notify the inner AMF of information on the outer NW. The information may be, for example, information indicating that the UE is connected to the outer NW through the inner NW. The UE may give the notification via the NAS signaling. The NAS signaling may be the signaling described in Non-Patent Document 26 (TS24.501), or new NAS signaling (e.g., outer NW connection notification). The inner AMF may determine whether to notify the UE to release the connection with its own AMF, using the information. For example, the inner AMF need not notify the UE to release the connection with its own AMF, using the notification indicating that the UE is not connected to the outer AMF. This can, for example, reduce the NAS signaling.

The UE may notify the inner AMF of acceptance of releasing the connection in the inner NW, or information indicating that the UE is not connected to the outer NW. The UE may transmit the notification after releasing the connection with the outer NW. For example, the UE may transmit the notification after releasing the AN connection with the N3IWF. The UE may give the notification via the NAS signaling. The NAS signaling for the notification may be newly provided. The new NAS signaling may be, for example, service termination ready signaling. The inner AMF may release the inner NW with the UE, after the notification from the UE. In other words, the inner AMF need not perform the operation for releasing the inner NW with the UE, before the notification from the UE. This can, for example, increase the robustness in the communication system.

The UE may request the inner AMF to wait for release of the inner NW. The UE may request the inner AMF via the NAS signaling. The NAS signaling indicating the request may be newly provided. The NAS signaling may be, for example, a service termination wait request. In response to the request, the inner AMF may wait for release of the connection by the UE. This enables, for example, notification to the outer NW even when the inner AMF starts releasing the connection with the UE.

The UE may include, in the request, information on the idle time for releasing the connection. The UE may determine the information. The inner AMF may wait for release of the connection with the inner NW during the idle time indicated in the information. The UE may release the connection with the outer NW during the idle time. This can, for example, prevent the inner NW from being released before completion of the release of the connection with the outer NW, and consequently increase the robustness in the communication system.

As another example of the idle time, the idle time may be defined in a standard. In response to the waiting request from the UE, the inner AMF may wait for the release of the connection of the inner AMF during a defined idle time. This can, for example, increase the robustness in the communication system and reduce the size of the signaling in the communication system.

The UE may have a timer for managing the idle time. The UE may reset the timer upon establishment of the RRC connection with the RAN, using the reception of the notification on change in the duration of the delay from the inner AMF and/or the RAN as a trigger, or upon establishment of the AN connection with the N3IWF. The UE may start the timer using the reception of the instruction for releasing the RRC connection from the inner AMF as a trigger. The UE may stop the timer using release of the AS connection with the N3IWF as a trigger. Using expiration of the timer as a trigger, the UE may release the RRC connection with the RAN, or perform the operations disclosed in 5.3.8.3 of Non-Patent Document 27 (TS38.331). This facilitates, for example, management of the operations for AN release in the UE. The RAN or the inner AMF may have the timer. This facilitates, for example, management of the operations for AN release in the RAN and/or the inner AMF.

After transmitting the request to the inner AMF, the UE starts releasing the connection with the outer NW. As another example, the UE starts releasing the connection with the outer NW before transmitting the request to the inner AMF. This enables, for example, the UE to promptly start releasing the connection with the outer NW. The aforementioned methods may be used for releasing the connection with the outer NW.

The UE may notify the inner AMF of acceptance of releasing the connection in the inner NW. The UE may transmit the notification after releasing the connection with the outer NW. The UE may give the notification in the aforementioned manner. The inner AMF resumes releasing the connection with the UE in the inner NW, using the notification from the UE indicating the acceptance of releasing the connection in the inner NW.

As another example of notifying resumption of the release of the connection from the UE to the inner AMF, the UE need not give the notification to the inner AMF. The operation may be applied, for example, when the UE notifies the inner AMF of the idle time for releasing the connection or when the idle time is predefined. After a lapse of the idle time, the inner AMF may resume releasing the connection with the UE in the inner NW. This can, for example, reduce the amount of signaling in the communication system.

Figure 16:
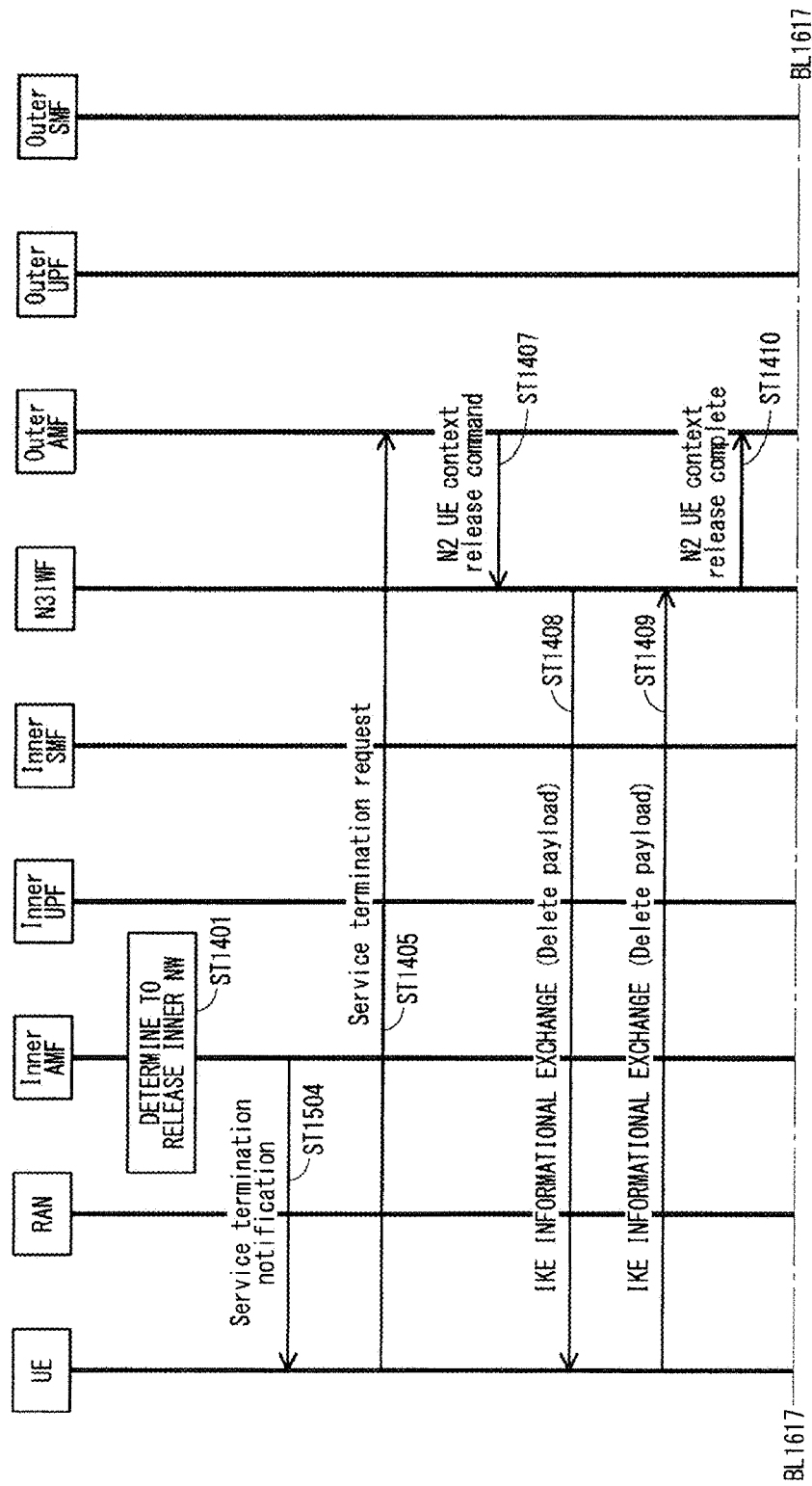
FIG. 16 is a sequence diagram illustrating the second example of operations for releasing the UE connected to the outer NW through the inner NW from connection with the inner NW and the outer NW according to the first embodiment.
Figure 17:
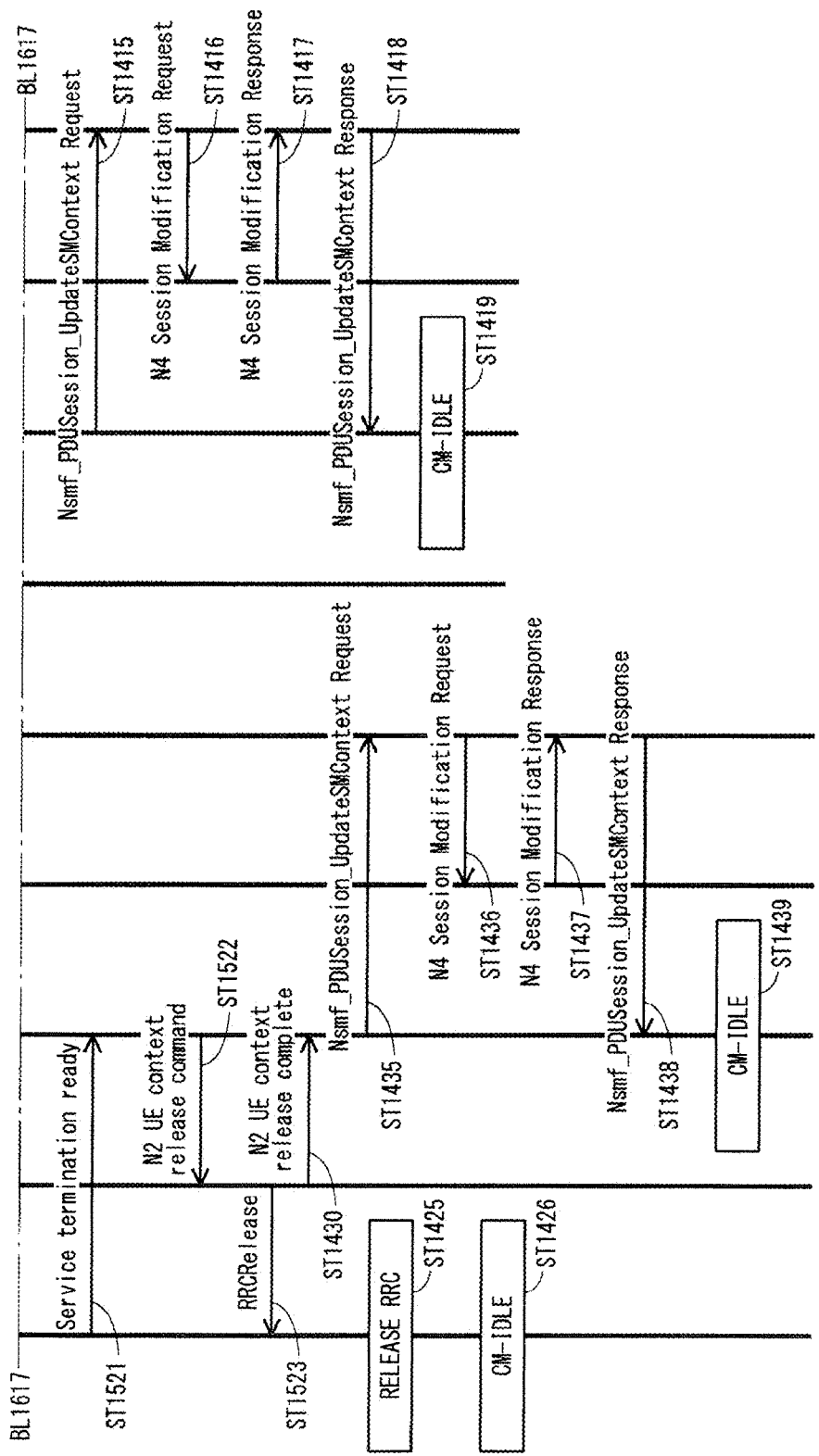
FIG. 17 is a sequence diagram illustrating the second example of operations for releasing the UE connected to the outer NW through the inner NW from connection with the inner NW and the outer NW according to the first embodiment.

FIGS. 16 and 17 are sequence diagrams illustrating the second example of operations for releasing the UE connected to the outer NW through the inner NW from the connection with the inner NW and the outer NW. FIGS. 16 and 17 are connected across a location of a border BL1617. FIGS. 16 and 17 illustrate an example where the inner AMF starts releasing the connection. FIGS. 16 and 17 also illustrate that the inner AMF notifies the UE of release of the inner NW. In FIGS. 16 and 17, the same step numbers are applied to the processes identical to those in FIGS. 14 and 15, and the common description thereof is omitted.

Step ST1401 in FIG. 16 is identical to that in FIG. 14.

In Step ST1504 of FIG. 16, the inner AMF notifies the UE of the release of the inner NW. The inner AMF may give the notification via the NAS signaling. The NAS signaling may be the service termination notification signaling or another signaling. Upon receipt of the notification in Step ST1504, the UE may recognize that the connection with the inner NW will be released, or perform the next process of Step ST1405. The inner AMF may suspend the release of the inner NW until a response to Step ST1504 is given.

Steps ST1405 to ST1419 in FIGS. 16 and 17 are identical to those in FIGS. 14 and 15.

In Step ST1521 of FIG. 17, the UE notifies the inner AMF of acceptance of releasing the connection in the inner NW. The UE may give the notification via the NAS signaling. The NAS signaling for the notification may be newly provided. The new NAS signaling may be, for example, the service termination ready signaling.

In response to the notification in Step ST1521, the inner AMF performs operations for releasing the connection with the inner NW in Steps ST1522 to ST1439 in FIG. 17. Step ST1522 in FIG. 17 is identical to Step ST1402 in FIG. 14. Step ST1523 in FIG. 17 is identical to Step ST1403 in FIG. 14.

Steps ST1425 and ST1426 in FIG. 17 are identical to those in FIG. 15.

Steps ST1430 to ST1439 in FIG. 17 are identical to those in FIG. 15.

Another solution is disclosed. The RAN may request the outer AMF to release the connection with the UE in the outer NW. The RAN may make the request when the inner AMF determines to release the connection with the UE in the inner NW. The inner AMF may instruct the RAN to release the connection in the inner NW. In response to the instruction, the RAN may make the request. This can, for example, reduce the amount of signaling in the communication system.

The UE may notify the RAN of information indicating that the UE is connected to the outer NW through the inner NW. The information may be information indicating establishment of the AN connection between the UE and the N3IWF. The RAN may make the request to the outer AMF through the N3IWF. The N3IWF may release the AN connection with the UE. In response to the request from the RAN, the N3IWF may release the AN connection.

Another solution is disclosed. The N3IWF may request the outer AMF to release the connection with the UE in the outer NW. The signaling to be used for the request may be, for example, the N2 UE Context Release Request described in Non-Patent Document 24 (TS38.413). The N3IWF may make the request using the release of the AN connection between the UE and its own N3IWF as a trigger. In response to the request, the outer AMF may instruct the N3IWF to release the N2 connection. This can, for example, reduce the amount of signaling in the communication system.

The UE may release the AN connection with the N3IWF. The UE may release the AN connection in response to the instruction for releasing the RRC from the RAN to the UE.

The RAN may instruct the UE to release the RRC in response to the instruction for releasing the N2 connection on the UE from the inner AMF to the RAN. As an example where the UE releases the AN connection, the UE may notify the N3IWF to release the IPsec configuration. The N3IWF may release the IPsec configuration with the UE in response to the notification. The N3IWF may notify the UE to release the IPsec configuration. The N3IWF may give the notification to the UE after releasing the IPsec configuration in the N3IWF.

Figure 18:
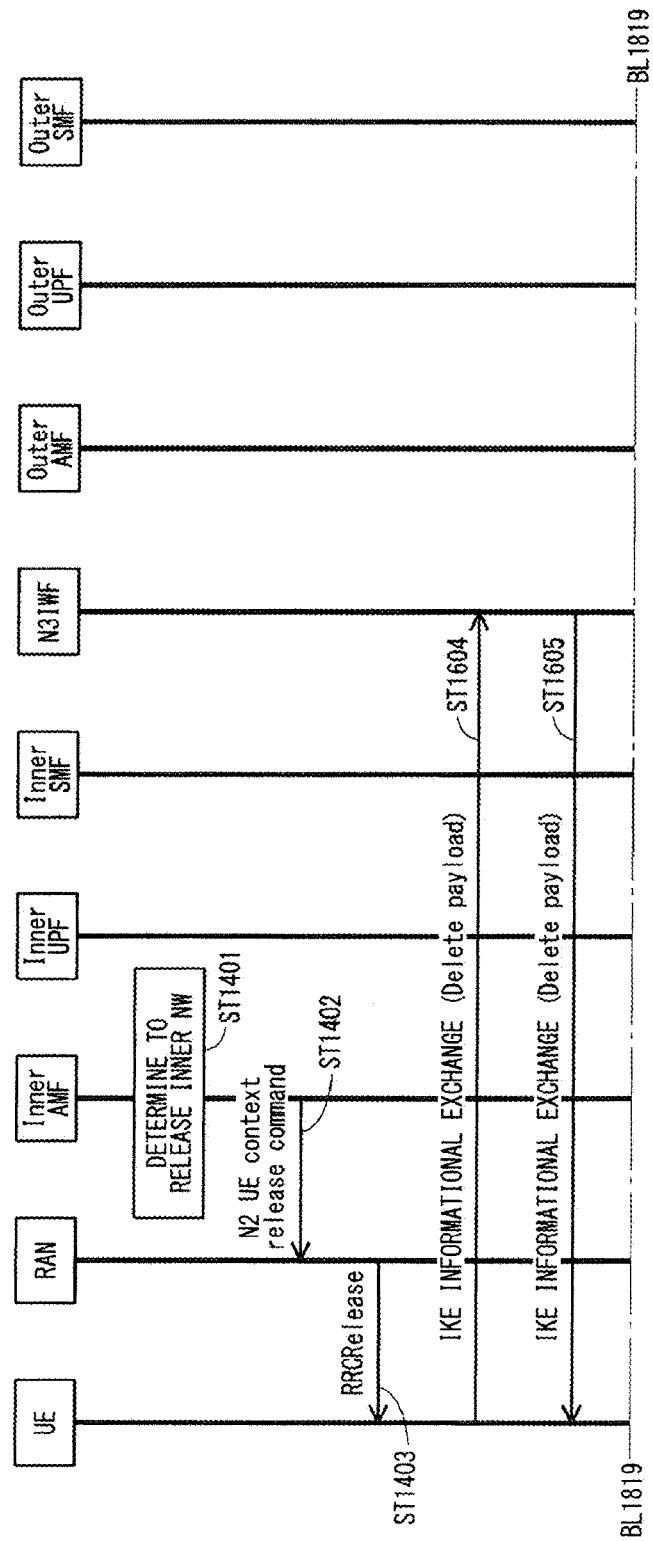
FIG. 18 is a sequence diagram illustrating the third example of operations for releasing the UE connected to the outer NW through the inner NW from connection with the inner NW and the outer NW according to the first embodiment.
Figure 19:
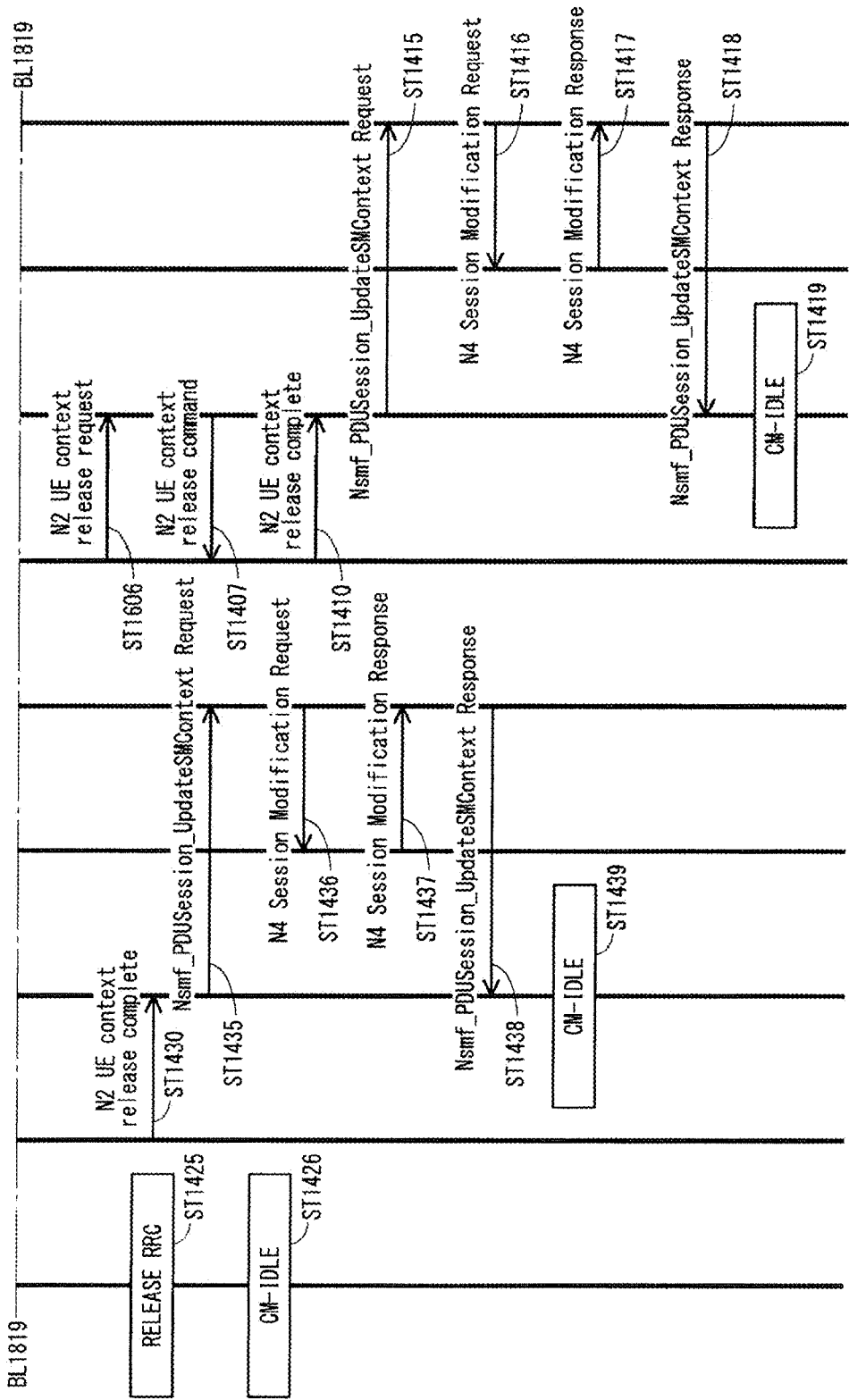
FIG. 19 is a sequence diagram illustrating the third example of operations for releasing the UE connected to the outer NW through the inner NW from connection with the inner NW and the outer NW according to the first embodiment.

FIGS. 18 and 19 are sequence diagrams illustrating the third example of operations for releasing the UE connected to the outer NW through the inner NW from the connection with the inner NW and the outer NW. FIGS. 18 and 19 are connected across a location of a border BL1819. FIGS. 18 and 19 illustrate an example where the inner AMF starts releasing the connection. FIGS. 18 and 19 also illustrate an example where the N3IWF releases the outer NW. FIGS. 18 and 19 also illustrate an example where the AN connection in the UE is released using the instruction for releasing the RRC as a trigger. In FIGS. 18 and 19, the same step numbers are applied to the processes identical to those in FIGS. 14 and 15, and the common description thereof is omitted.

Steps ST1401 to ST1403 in FIG. 18 are identical to those in FIG. 14.

In Step ST1604 of FIG. 18, the UE releases the AN connection with the N3IWF. The release of the AN connection may be release of the IPsec configuration with the N3IWF. The UE notifies the N3IWF to release the IPsec configuration. The signaling to be used for the notification may be, for example, the IKE INFORMATIONAL exchange signaling described in Non-Patent Document 23 (IETF RFC7296). The signaling may include the Delete payload described in Non-Patent Document 23 (IETF RFC7296). The Delete payload may include information (e.g., an identifier) on Security Association (SA) to be released in the IPsec configuration. Upon receipt of the notification in Step ST1604, the N3IWF releases the IPsec configuration with the UE. In Step ST1605, the N3IWF notifies the UE that the IPsec configuration has been released. The N3IWF may give the notification to the UE, for example, via the same signaling in Step ST1604.

In Step ST1606 of FIG. 19, the N3IWF requests the outer AMF to release the N2 connection on the UE between the outer AMF and the N3IWF. The signaling to be used for the request may be, for example, the N2 UE Context Release Request described in Non-Patent Document 24 (TS38.413). In response to the request, the outer AMF performs operations for releasing the outer NW in Steps ST1407 to ST1419.

Steps ST1407 to ST1419 in FIG. 19 are identical to those in FIGS. 14 and 15.

In Step ST1425 of FIG. 19, the UE releases the RRC connection with the RAN. Upon receipt of the notification of the release of the IPsec configuration in Step ST1605, the UE may release the RRC connection. In Step ST1426, the UE transitions to CM-IDLE state as the connection between the UE and the inner AMF and the connection between the UE and the outer AMF are released.

Steps ST1430 to ST1439 in FIG. 19 are identical to those in FIG. 15.

The UE may release the AN connection with the N3IWF, in response to the notification of releasing the connection with the inner AMF from the inner AMF to the UE. The inner AMF may give the notification via the NAS signaling similarly to that for the aforementioned solution, or the NAS signaling for the notification may be newly provided. The new NAS signaling may be, for example, the service termination notification signaling. The UE may notify the inner AMF of acceptance of releasing the connection in the inner NW. The UE may transmit the notification after releasing the connection with the outer NW. For example, the UE may transmit the notification after releasing the AN connection with the N3IWF. The UE may give the notification via the NAS signaling. The NAS signaling for the notification may be newly provided. The new NAS signaling may be, for example, the service termination ready signaling. The inner AMF may release the inner NW with the UE, after the notification from the UE. This can, for example, prevent a variance on connected state of the UE, between the UE and the outer AMF.

Figure 20:
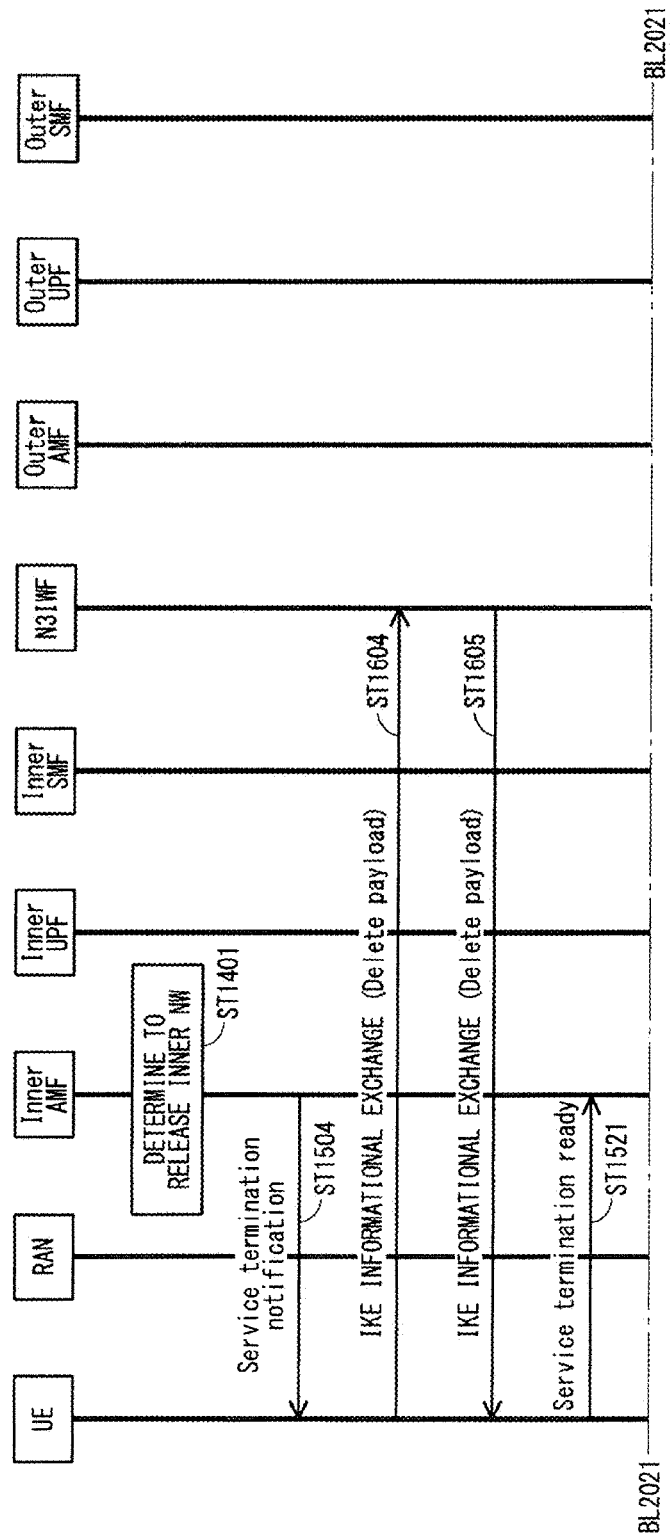
FIG. 20 is a sequence diagram illustrating the fourth example of operations for releasing the UE connected to the outer NW through the inner NW from connection with the inner NW and the outer NW according to the first embodiment.
Figure 21:
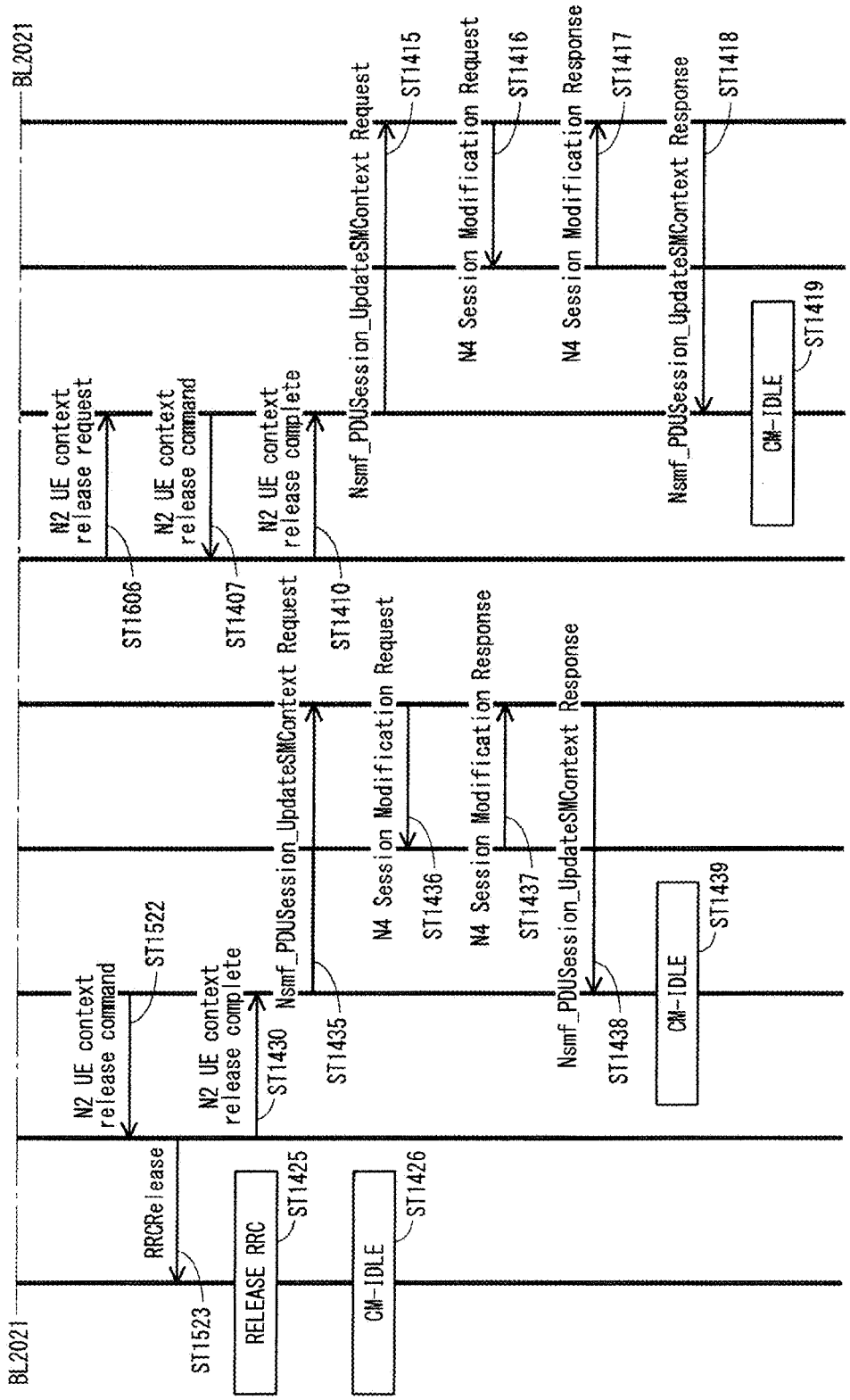
FIG. 21 is a sequence diagram illustrating the fourth example of operations for releasing the UE connected to the outer NW through the inner NW from connection with the inner NW and the outer NW according to the first embodiment.

FIGS. 20 and 21 are sequence diagrams illustrating the fourth example of operations for releasing the UE connected to the outer NW through the inner NW from the connection with the inner NW and the outer NW. FIGS. 20 and 21 are connected across a location of a border BL2021. FIGS. 20 and 21 illustrate an example where the inner AMF starts releasing the connection. FIGS. 20 and 21 also illustrate an example where the N3IWF releases the outer NW. FIGS. 20 and 21 also illustrate an example where the AN connection in the UE is released using the notification of releasing the inner NW from the inner AMF as a trigger. In FIGS. 20 to 21, the same step numbers are applied to the processes identical to those in FIGS. 14 to 19, and the common description thereof is omitted.

Step ST1401 in FIG. 20 is identical to that in FIG. 14. Step ST1504 is identical to that in FIG. 16.

In Step ST1604 of FIG. 20, the UE releases the AN connection with the N3IWF. The signaling for releasing the AN connection may be identical to that in FIG. 18. In response to Step ST1504, the UE may transmit the signaling for releasing the AN connection to the N3IWF. Step ST1605 in FIG. 20 is identical to that in FIG. 18.

Step ST1606 in FIG. 21 is identical to that in FIG. 19. Steps ST1407 to ST1419 are identical to those in FIG. 14.

In Step ST1521 of FIG. 20, the UE notifies the inner AMF of acceptance of releasing the connection in the inner NW. The signaling to be used for the notification may be identical to that in FIG. 17. The UE may transmit the notification using the reception in Step ST1605 as a trigger.

Steps ST1522 and ST1523 in FIG. 21 are identical to those in FIG. 17. Steps ST1425, ST1426, and ST1430 to ST1439 are identical to those in FIG. 14.

Another solution is disclosed. The inner AMF may request the outer AMF to release the connection with the UE in the outer NW. This can, for example, reduce the amount of processing in the UE for performing operations for releasing the outer NW. The UE may notify the inner AMF of information indicating establishment of the N1 connection with the outer AMF. The UE may give the notification to the inner AMF, for example, before the inner AMF determines to release the inner NW with the UE or after the UE has established the N1 connection with the outer AMF. The information may be, for example, information indicating establishment of the AS connection between the UE and the N3IWF, or states of the UE (e.g., CM states or RM states). The states may be, for example, states in the outer NW to be disclosed in the second embodiment.

The inner AMF may request the N3IWF to release the connection with the UE in the outer NW. The inner AMF may transmit the request through the inner SMF and the inner UPF. An interface between the inner AMF and the N3IWF may be provided. The inner AMF may transmit the request via the signaling in the interface. The N3IWF may transfer the request to the outer AMF.

As another example, the inner AMF may request the outer AMF to release the connection with the UE in the outer NW. The inner AMF may make the request via the signaling between the inner AMF and the outer AMF. An interface between the inner AMF and the outer AMF may be provided. As another example, the inner AMF may make the request to the outer AMF through the inner SMF and the outer SMF. An interface between the inner SMF and the outer SMF may be provided. As another example, the inner AMF may make the request to the outer AMF through the inner SMF, the inner UPF, and the N3IWF or through the RAN, the inner UPF, and the N3IWF. This, for example, saves addition of the signaling in the interface between the aforementioned devices, and can consequently avoid the complexity in the communication system.

The outer AMF may notify the inner AMF of states of the outer AMF on the UE. The states may be the CM states or the RM states described in Non-Patent Document 22 (TS23.501), or the 5GMM states described in Non-Patent Document 26 (TS24.501). The outer AMF may give the notification to the inner AMF via the signaling between the outer AMF and the inner AMF. An interface between the inner AMF and the outer AMF may be provided. As another example, the outer AMF may give the notification to the inner AMF through the outer SMF and the inner SMF. An interface between the inner SMF and the outer SMF may be provided. As another example, the outer AMF may give the notification to the inner AMF through the N3IWF, the inner UPF, and the inner SMF or through the N3IWF, the inner UPF, and the RAN. In response to the notification, the inner AMF may determine whether to release the outer NW. This, for example, saves addition of the signaling in the interface between the aforementioned devices, and can consequently avoid the complexity in the communication system.

The inner AMF may notify the outer AMF of states of the inner AMF on the UE. The states may be the CM states or the RM states described in Non-Patent Document 22 (TS23.501), or the 5GMM states described in Non-Patent Document 26 (TS24.501). The inner AMF may give the notification to the outer AMF via the signaling between the inner AMF and the outer AMF. An interface between the inner AMF and the outer AMF may be provided. As another example, the inner AMF may give the notification to the outer AMF through the inner SMF and the outer SMF. An interface between the inner SMF and the outer SMF may be provided. As another example, the inner AMF may give the notification to the outer AMF through the inner SMF, the inner UPF, and the N3IWF or through the RAN, the inner UPF, and the N3IWF. The outer AMF may change a connection topology with the UE in response to the notification. For example, when the state of the inner AMF is CM-IDLE state, the outer AMF may instruct the UE to camp on a cell served by the outer NW. This can, for example, increase the flexibility in the communication system.

A plurality of the aforementioned solutions may be combined. For example, change in the duration of the delay in releasing the RRC connection may be used when the N3IWF releases the outer NW. The UE may notify the N3IWF to release the IPsec configuration during the changed duration of the delay. This enables, for example, the UE to notify the release of the IPsec configuration with sufficient leeway. Consequently, the robustness in the communication system can be increased.

The UE may be connected to a plurality of outer NWs through the inner NW. The plurality of outer NWs may be connected in parallel. One of the outer NWs may be allocated for each communication service (e.g., audio, video, or mission critical communication). The methods disclosed in the first embodiment or methods to be disclosed in the following embodiments or modifications may be used in the communication system in which the UE is connected in parallel with the plurality of outer NWs. This can, for example, increase the flexibility in the communication system.

As another example where the UE is connected to the plurality of outer NWs through the inner NW, the plurality of outer NWs may be connected in cascade. For example, the outer NWs connected in cascade and/or the inner NW may differ in communication range and communication target UE. The methods disclosed in the first embodiment or the methods to be disclosed in the following embodiments or modifications may be used in the communication system in which the UE is connected in cascade with the plurality of outer NWs. This can, for example, increase the flexibility in the communication system.

The first embodiment can prevent a variance on connected state of the UE, between the UE and the outer AMF, and consequently increase the robustness in the communication system.

The First Modification of the First Embodiment

The first embodiment discloses methods on the AN release of the UE that is connected in cascade with a plurality of NWs. The first modification discloses deregistering methods in the UE.

The UE deregisters from the outer NW prior to deregistering from the inner NW. The deregistering may be applied to deregistering to be started by the UE. The method disclosed in 4.2.2.3.2 of Non-Patent Document 25 (TS23.502) may be used for deregistering each of the NWs. This can, for example, reduce the memory usage when information on registration in the outer NW remains.

As another example, the UE may release the connection with the outer NW prior to deregistration from the inner NW. The method disclosed in the first embodiment may be applied to releasing the connection with the outer NW. For example, the UE may request the outer AMF to release the NAS connection between its own UE and the outer NW. The UE may make the request via the NAS signaling. The NAS signaling may be the existing signaling described in Non-Patent Document 26 (TS24.501). Alternatively, new signaling (e.g., Service termination request) may be provided. As another example, the N3IWF may request the outer AMF to release the outer NW with the UE. The N3IWF may make the request using the release of the AN connection between the UE and the N3IWF as a trigger.

As another example, the UE may maintain the connection with the outer NW in deregistering from the inner NW. For example, the UE may be connected to the RAN served by the outer NW. This can, for example, secure the continuity of service of the outer NW for the UE.

When the UE maintains the connection with the outer NW, tracking areas of the UE in the outer NW before and after deregistering from the inner NW may be the same or different. For example, the AMFs to which the UE is connected before and after deregistering from the inner NW may be the same or different. When the AMFs to which the UE is connected are the same, the procedure described in 4.9.2.1 of Non-Patent Document 25 (TS23.502) may be used. When the AMFs to which the UE is connected are different, the procedure described in 4.12.8 of Non-Patent Document 25 (TS23.502) may be used.

The outer AMF may notify the UE of information on the base stations whose tracking areas and/or AMFs before and after the switching are the same. In the switching, the UE may be preferentially connected to the base stations included in the information. This enables, for example, the UE to promptly perform the switching operation, and can reduce the signaling in the communication system. As another example, the outer AMF may notify the UE of information on the base stations whose tracking areas and/or AMFs before and after the switching are different. In the switching, the UE may be preferentially connected to a base station that is not included in the information. For example, when the number of the base stations whose tracking areas and/or AMFs before and after the switching are different is less around the UE, the size of the signaling from the outer AMF to the UE can be reduced.

The UE may notify the outer AMF of information on the position of its own UE or information on the base station to which its own UE can be connected. The information on the base station to which the UE can be connected may include, for example, an identifier of the base station or information on a cell to which the base station belongs (e.g., PCI). The UE may give the notification to the outer AMF, for example, before the switching. This enables, for example, the outer AMF to promptly identify the base stations whose tracking areas and/or AMFs before and after the switching are the same.

The UE may notify the outer AMF of information on deregistering from the inner NW. The UE may notify the information via the NAS signaling. The NAS message may be the NAS signaling described in Non-Patent Document 26 (TS24.501), or new NAS signaling may be provided. The outer AMF may determine processes on the connection with the UE, using the information. Examples of the processes may include deregistering the UE, releasing the connection between the UE and the outer NW, and maintaining the connection between the UE and the outer NW. This can, for example, increase the flexibility in the communication system.

Another solution is disclosed. The UE starts deregistering from the outer NW before being deregistered from the inner NW. The method may be applied, for example, when the inner NW starts deregistering the UE.

The UE may request the inner AMF to wait for deregistering from the NW. The UE may make the request to the inner AMF via the NAS signaling. The NAS signaling indicating the request may be newly provided. The NAS signaling may be, for example, a deregistration wait request. In response to the request, the inner AMF may wait for deregistering the UE. This enables, for example, notification to the outer NW even when the inner AMF starts deregistering the UE.

The UE may include, in the request, information on the idle time for deregistering. The UE may determine the information. The inner AMF may wait for deregistering from the inner NW during the idle time indicated in the information. The UE may deregister from the outer NW during the idle time. his can, for example, prevent deregistration from the inner NW before completion of deregistering from the outer NW, and consequently increase the robustness in the communication system.

As another example of the idle time, the idle time may be defined in a standard. In response to the waiting request from the UE, the inner AMF may wait for the deregistration during a defined idle time. This can, for example, increase the robustness in the communication system and reduce the size of the signaling in the communication system as described above.

The UE may have a timer for managing resumption of deregistration. The timer may be, for example, a timer for managing the idle time. The UE may reset the timer upon completion of registration in the inner NW. The UE may start the timer using the reception of the deregistering instruction from the inner AMF as a trigger. The UE may stop the timer using deregistering from the outer NW as a trigger. The UE may recognize resumption of deregistering from the inner NW using expiration of the timer as a trigger. This facilitates, for example, management of the deregistering operations in the UE.

The inner AMF may have a timer for managing resumption of deregistration. The timer may be, for example, a timer for managing the idle time. The inner AMF may reset the timer upon completion of registration of the UE in the inner NW. The inner AMF may start the timer using transmission of the deregistering instruction to the UE as a trigger. The inner AMF may stop the timer, using notification of resumption of deregistration from the UE as a trigger. The inner may resume deregistering the UE from the inner NW, using expiration of the timer as a trigger. This facilitates, for example, management of deregistering operations in the inner AMF.

After transmitting the request to the inner AMF, the UE starts deregistering from the outer NW. As another example, the UE starts deregistering from the outer NW before transmitting the request to the inner AMF. This enables, for example, the UE to promptly start deregistering from the outer NW. This can, for example, reduce the memory usage in each device in the outer NW when many UEs are registered in the outer NW. The method disclosed in 4.2.2.3.2 of Non-Patent Document 25 (TS23.502) may be used for deregistering from the inner NW.

The UE may request or notify the inner AMF to resume deregistering from the inner NW. The UE may give the request or the notification after deregistering from the outer NW. The UE may give the request or the notification via the NAS signaling. The NAS signaling may be new signaling, for example, deregistration ready. Alternatively, the NAS signaling may be the signaling described in Non-Patent Document 25 (TS23.502), for example, a deregistration request or deregistration acceptance (deregistration accept). The UE may include, in the NAS signaling, information on resumption of deregistration that has been put on hold and notify the inner AMF of the information. The UE may include, in the NAS signaling, information on the NAS signaling (e.g., an identifier of the NAS signaling) for deregistering from the inner NW which has been transmitted from the inner AMF to the UE, and notify the inner AMF of the information. This enables, for example, the inner AMF to promptly perform an association with the deregistration requested to the UE. Consequently, the deregistration processes in the inner AMF can be promptly performed. In response to the request or the notification for resuming deregistration which has been received from the UE, the inner AMF resumes deregistering the UE in the inner AMF.

As another example where the UE gives the request or the notification for resuming deregistration in the inner AMF, the UE need not give the request or the notification to the inner AMF. The operation may be applied, for example, when the UE notifies the inner AMF of the idle time for deregistration. Alternatively, the operation may be applied when the idle time is predefined. The inner AMF may resume deregistering the UE in the inner AMF after a lapse of the idle time. This can, for example, reduce the amount of signaling in the communication system.

Figure 22:
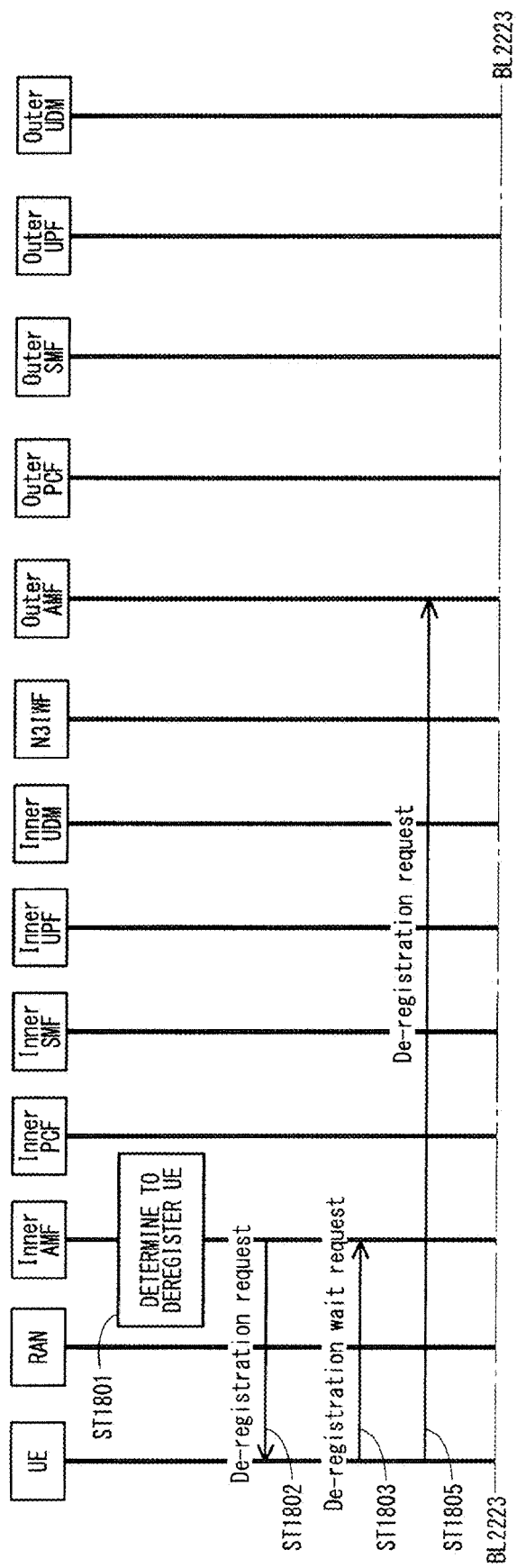
FIG. 22 is a sequence diagram illustrating the first example of operations for deregistering the UE connected to the outer NW through the inner NW according to the first modification of the first embodiment.
Figure 23:
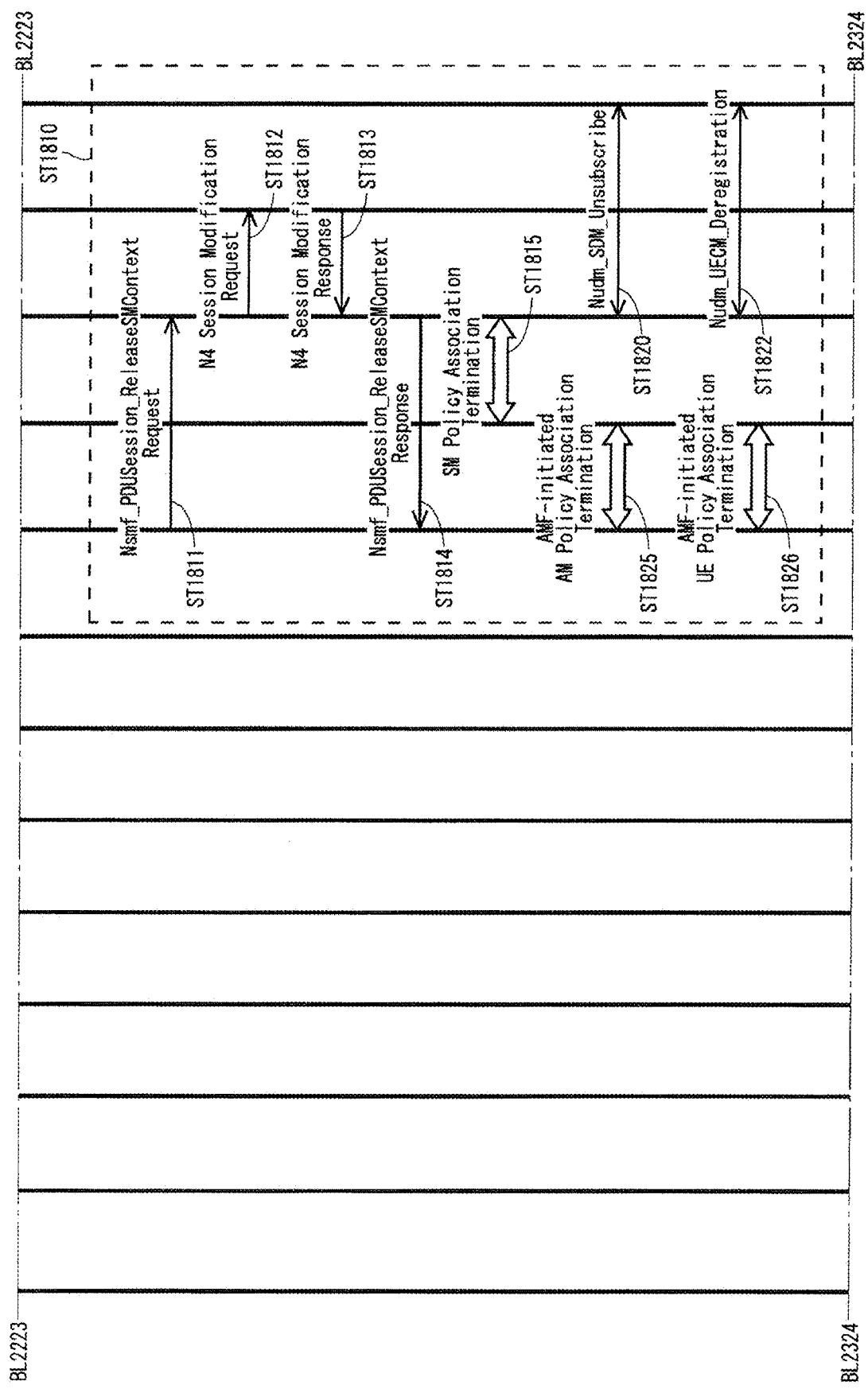
FIG. 23 is a sequence diagram illustrating the first example of operations for deregistering the UE connected to the outer NW through the inner NW according to the first modification of the first embodiment.

FIGS. 22 to 24 are sequence diagrams illustrating the first example of operations for deregistering the UE connected to the outer NW through the inner NW. FIGS. 22 to 24 are connected across locations of borders BL2223 and BL2324. FIGS. 22 to 24 illustrate an example where the inner AMF starts deregistration. FIGS. 22 to 24 also illustrate an example of deregistering from the outer NW as the UE is deregistered from the inner NW.

In Step ST1801 of FIG. 22, the inner AMF determines to deregister the UE in the inner NW. In Step ST1802, the inner AMF requests the UE to deregister from the inner NW. The inner AMF may make the request via the NAS signaling, for example, the deregistration request signaling described in Non-Patent Document 25 (TS23.502).

In Step ST1803 of FIG. 22, the UE requests the inner AMF to wait for the deregistration. The UE may make the request via the NAS signaling. The NAS signaling may be new NAS signaling, for example, deregistration wait request signaling. The signaling may include information on the idle time for deregistration. The inner AMF may wait for deregistering the UE, in response to the signaling. The inner AMF may wait for deregistering the UE during the idle time included in the signaling or during a predefined idle time. The inner AMF may wait for deregistering the UE until receiving notification of resuming deregistration from the UE, which will be described later. The starting point of the idle time in the inner AMF may be a point of receiving the wait request in Step ST1803.

In Step ST1805 of FIG. 22, the UE requests the outer AMF to deregister from the outer NW. The UE may make the request via the NAS signaling, for example, the deregistration request signaling described in Non-Patent Document 25 (TS23.502). The outer AMF starts the operation of deregistering the UE from the outer NW (a procedure 1810 in FIG. 23).

In the procedure 1810 in FIG. 23, processes of Steps ST1811 to ST1826 are performed.

In Step ST1811 of FIG. 23, the outer AMF requests the outer SMF to terminate the association between the AMF and the SMF as the PDU session on the UE is released. The request may be the Nsmf_PDUSession_ReleaseSMContext service operation described in 5.2.8.2.7 of Non-Patent Document 25 (TS23.502). In Step ST1812, the outer SMF requests the outer UPF to release resources such as an IP address allocated to the PDU session and relevant U-plane resources. The outer UPF releases the resources that have been requested for release in Step ST1812. In Step ST1813, the outer UPF notifies the outer SMF that the resources have been released. The N4 Session Modification Procedure disclosed in 4.4.1.3 of Non-Patent Document 25 (TS23.502) may be used as Steps ST1812 and ST1813. In Step ST1814, the outer SMF responds to the outer AMF on the request for terminating the association between the AMF and the SMF in Step ST1811. The response may be the Nsmf_PDUSession_ReleaseSMContext service operation described in 5.2.8.2.7 of Non-Patent Document 25 (TS23.502).

In Step ST1815 of FIG. 23, the outer SMF and the outer PCF perform the SM Policy Association Termination operations described in 4.16.6 of Non-Patent Document 25 (TS23.502).

In Step ST1820 of FIG. 23, the outer SMF performs, with the outer UDM, operations of terminating the Session Management Subscription data changes notification to the outer UDM. The operations may be the Nudm_SDM_Unsubscribe service operation described in 5.2.3.3.5 of Non-Patent Document 25 (TS23.502). In Step ST1822, the outer UDM performs, with the outer SMF, operations of deleting the association between the outer SMF, Data Network Name (DNN), and the PDU session ID. The operations may be the Nudm_UECM_Deregistration service operations described in 5.2.3.2.3 of Non-Patent Document 25 (TS23.502).

In Step ST1825 of FIG. 23, the outer AMF performs, with the outer PCF, operations of terminating the Admission Management (AM) policy association with the outer PCF. The operations may be the AMF-initiated AM Policy Association Termination procedure described in 4.16.3.2 of Non-Patent Document 25 (TS23.502). In Step ST1826, the outer AMF performs, with the outer PCF, operations of terminating the UE policy association with the outer PCF. The operations may be the AMF-initiated UE Policy Association Termination procedure described in 4.16.13.1 of Non-Patent Document 25 (TS23.502).

In Step ST1830 of FIG. 24, the outer AMF notifies the UE of acceptance of deregistration. The notification may be acceptance of deregistration (Deregistration Accept) described in Non-Patent Document 25 (TS23.502). In Step ST1831, the outer AMF instructs the N3IWF to release the N2 connection on the UE between the outer AMF and the N3IWF. The signaling to be used for the instruction may be, for example, the N2 UE Context Release Command described in Non-Patent Document 24 (TS38.413).

In Steps ST1832 and ST1833 of FIG. 24, the AN connection between the N3IWF and the UE is released. In the example of FIG. 24, the IPsec configuration between the N3IWF and the UE is released. The signaling and the operations between the N3IWF and the UE in Steps ST1832 and ST1833 may be identical to those in Steps ST1408 and ST1409 in FIG. 14. The UE may recognize the completion of deregistration from the outer NW, from the end of the notification to the N3IWF in Step ST1833.

In Step ST1834 of FIG. 24, the N3IWF notifies the outer AMF of the completion of the release of the N2 connection on the UE between the outer AMF and the N3IWF. The signaling to be used for the notification may be, for example, the N2 UE Context Release Complete described in Non-Patent Document 24 (TS38.413).

In Step ST1835 of FIG. 24, the UE notifies the inner AMF to resume the deregistration from the inner NW. The notification may be, for example, acceptance of deregistration (Deregistration accept) described in Non-Patent Document 25 (TS23.502). In response to the request, the inner AMF starts operations for deregistering the UE from the inner NW (a procedure 1840 in FIG. 24).

The procedure 1840 in FIG. 24 may be processes similar to those of the procedure 1810 indicating the operations of deregistering the UE from the outer NW. In such a case, the processes similar to those of the procedure 1810 are applied to the inner NW.

In Step ST1851 of FIG. 24, the inner AMF instructs the RAN to release the N2 connection on the UE between the inner AMF and the RAN. The signaling to be used for the instruction may be, for example, the N2 UE Context Release Command described in Non-Patent Document 24 (TS38.413).

In Step ST1852 of FIG. 24, the RAN instructs the UE to release the RRC connection. The signaling to be used for the instruction may be, for example, RRCRelease described in Non-Patent Document 27 (TS38.331). In response to the release instruction in Step ST1852, the UE releases the RRC connection with the RAN. The UE further recognizes the deregistration from the inner NW, from the release instruction in Step ST1852.

In Step ST1853 of FIG. 24, the RAN notifies the inner AMF of the completion of the release of the N2 connection on the UE between the inner AMF and the RAN. The signaling to be used for the instruction may be, for example, the N2 UE Context Release Complete described in Non-Patent Document 24 (TS38.413).

Although FIGS. 22 to 24 illustrate a case where the UE notifies the inner AMF to resume the deregistration from the inner NW (Step ST1835), the UE need not give the notification. For example, when the waiting request for the deregistration from the inner NW in Step ST1803 includes the idle time, the UE need not give the notification. Alternatively, when the idle time is predefined, the UE need not give the notification. This can, for example, reduce the amount of signaling in the communication system.

Another solution is disclosed. The UE may notify the inner AMF of information on the outer NW in advance. The information included in the notification may be, for example, information indicating that the UE is connected to the outer NW through the inner NW as described in the first embodiment. The inner AMF may configure the idle time until deregistering the UE, using the information. The inner AMF may notify the UE of information on the idle time. The notification may be included in, for example, the request for deregistration from the inner AMF to the UE. The UE may obtain, from the request, the idle time until the deregistration from the inner NW. This saves, for example, the aforementioned waiting request from the UE to the inner NW. Consequently, the amount of signaling between the UE and the AMF can be reduced.

The UE may notify the outer AMF of the idle time or information on deregistering from the inner NW. The UE may include the idle time in a deregistering request to the outer AMF, and notify the idle time. The UE may include the information on deregistering from the inner NW in the deregistering request to the outer AMF, and notify the information. For example, the UE may notify the information on deregistering from the inner NW as a cause of the deregistering request to the outer AMF. The outer AMF may obtain, from information on the idle time and/or the information on deregistering from the inner NW that is included in the deregistering request from the UE, the idle time until resumption of deregistering from the inner NW. The outer AMF may deregister the UE from the outer NW during the idle time. This can prevent a state where deregistering from the outer NW is too late for deregistering from the inner NW. Consequently, the robustness in the communication system can be increased.

The idle time until deregistering from the inner NW may be predefined. The inner AMF need not notify the UE of the idle time. The UE may notify the outer AMF of information on deregistering from the inner NW. For example, the UE may notify the information on deregistering from the inner NW as a cause of the deregistering request to the outer AMF. The outer AMF may obtain the idle time from the information. This saves, for example, notification of the idle time from the inner AMF to the UE and from the UE to the outer AMF. Consequently, the size of the signaling in the communication system can be reduced.

Figure 26:
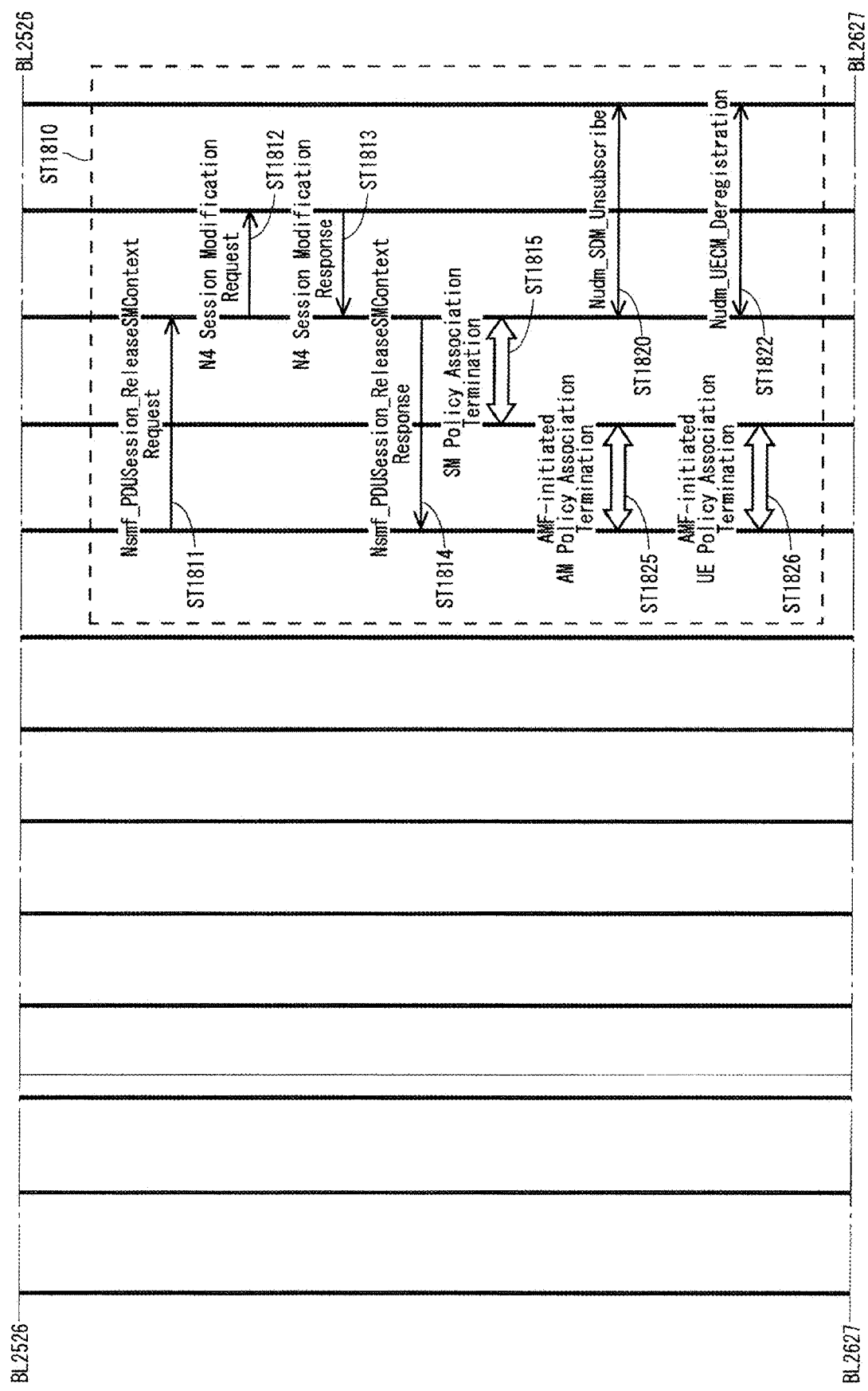
FIG. 26 is a sequence diagram illustrating the second example of operations for deregistering the UE connected to the outer NW through the inner NW according to the first modification of the first embodiment.
Figure 27:
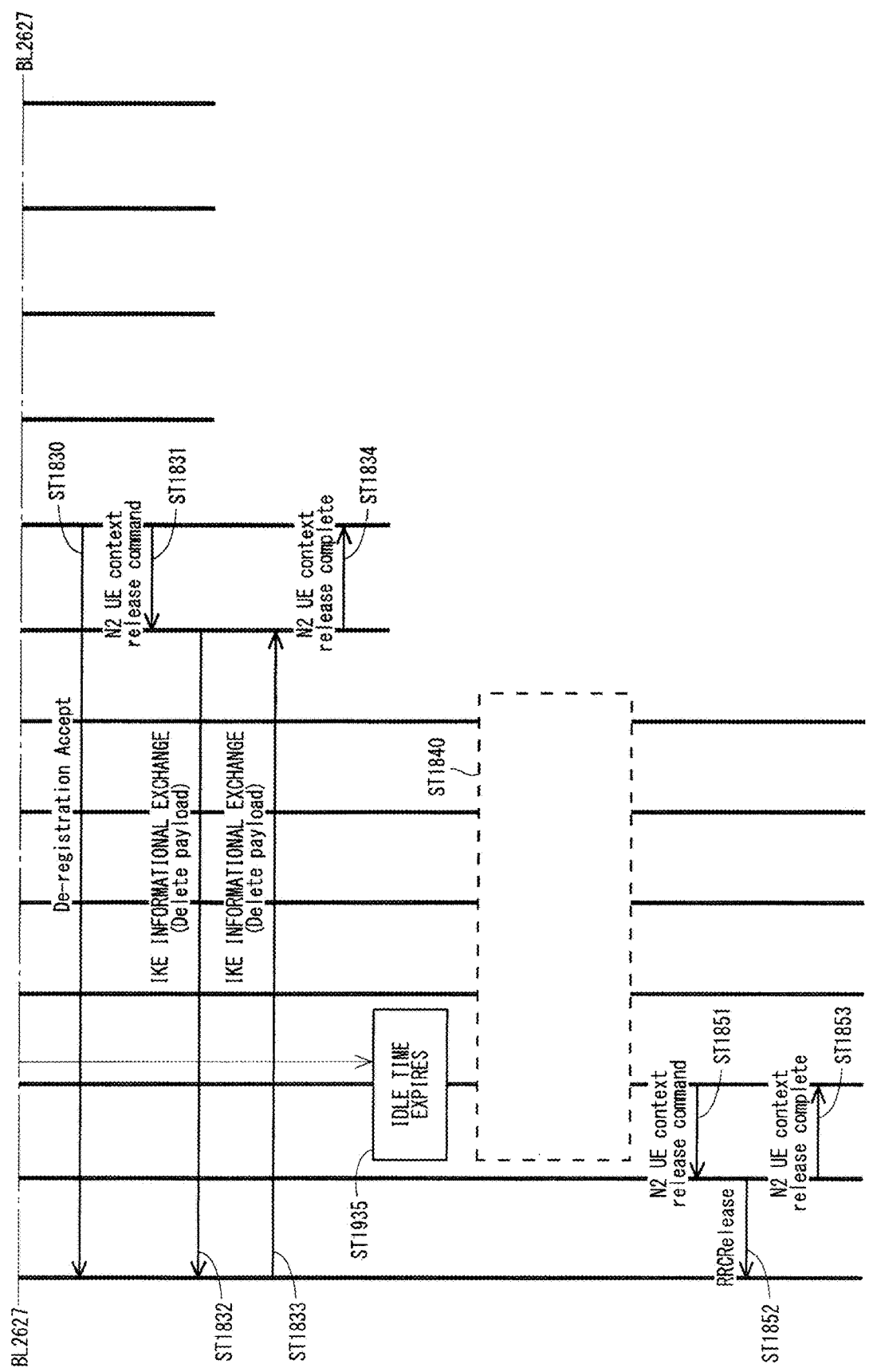
FIG. 27 is a sequence diagram illustrating the second example of operations for deregistering the UE connected to the outer NW through the inner NW according to the first modification of the first embodiment.

FIGS. 25 to 27 are sequence diagrams illustrating the second example of operations for deregistering the UE connected to the outer NW through the inner NW. FIGS. 25 to 27 are connected across locations of borders BL2526 and BL2627. FIGS. 25 to 27 illustrate an example where the inner AMF starts deregistration. FIGS. 25 to 27 also illustrate an example of deregistering from the outer NW as the UE is deregistered from the inner NW. FIGS. 25 and 27 also illustrate that the inner AMF determines the idle time until the deregistration from the inner NW and notifies the UE of the determined idle time. In FIGS. 25 to 27, the same numbers are applied to the operations identical to those in FIGS. 22 to 24, and the common description thereof is omitted.

In Step ST1900 of FIG. 25, the UE notifies the inner AMF of information on the outer NW. The notification may include, for example, information indicating that the UE is connected to the outer NW through the inner NW. The UE may give the notification via the NAS signaling. The NAS signaling may be the signaling described in Non-Patent Document 26 (TS24.501), or new NAS signaling, for example, outer network (NW) notification. The inner AMF may determine the idle time at deregistration, using the information notified in Step ST1900. The inner AMF may make the determination simultaneously in Step ST1801 to be described later.

Step ST1801 in FIG. 25 is identical to that in FIG. 22.

In Step ST1902 of FIG. 25, the inner AMF requests the UE to deregister from the inner NW. The inner AMF may include information on the idle time in the request, and notify the UE of the information. The signaling to be used in Step ST1902 may be identical to that in Step ST1802 of FIG. 22. The information on the idle time may be added, as a parameter, to the signaling identical to that in Step ST1802 of FIG. 22. The idle time may be started from the transmission in Step ST1802.

In Step ST1905 of FIG. 25, the UE requests the outer AMF to deregister from the outer NW. The UE may include information on the idle time in the request, and notify the outer AMF of the information. The UE may include information on deregistering from the inner NW in the request, and notify the outer AMF of the information. The signaling to be used in Step ST1905 may be identical to that in Step ST1805 of FIG. 22. The information on the idle time and/or the information on deregistering from the inner NW may be added, as a parameter, to the signaling identical to that in Step ST1805 of FIG. 18.

The procedure 1810 in FIG. 26 and Steps 1830 to ST1834 in FIG. 27 are identical to that in FIG. 23 and those in FIG. 24, respectively.

The idle time expires in Step ST1935 in FIG. 27. The inner AMF starts the procedure 1840 after the expiration of the idle time. The procedure 1840 in FIG. 27 is identical to that in FIG. 24.

Steps ST1851 to ST1853 in FIG. 27 are identical to those in FIG. 24.

Although the first modification discloses a case of deregistering from the outer NW according to deregistration from the inner NW, connection with the outer NW may be released instead of deregistration from the outer NW. The methods disclosed in the first embodiment may be applied to releasing the connection with the outer NW. This saves, for example, reregistration of the outer NW as the inner NW is reregistered. Consequently, the amount of signaling in the communication system can be reduced.

As another example, the connection with the outer NW may be maintained instead of deregistration from the outer NW. The UE may notify the outer AMF of information on deregistering from the inner NW. The UE may give the notification, for example, via the NAS signaling. The NAS signaling may be the signaling described in Non-Patent Document 26 (TS24.501), or new NAS signaling, for example, Inner Network (NW) deregistration notification. The outer NW may determine a cell served by the outer NW which is to be connected to the UE, using the information.

The outer NW may notify the UE of information on the cell. The UE may configure the cell indicated by the information as a connection target cell (destination cell). This can, for example, secure the continuity of service of the outer NW for the UE.

As another example, an outer NW device (e.g., the outer AMF, the outer SMF, or the outer PCF) may determine operations in the outer NW. The UE may notify the outer AMF of information on deregistering from the inner NW. The information may be the one previously described. The outer AMF may transfer the information to the outer SMF or the outer PCF. The outer NW device (e.g., the outer AMF, the outer SMF, or the outer PCF) may determine the operations in the outer NW, using the information. Examples of the operations may include deregistration from the outer NW, releasing the connection with the outer NW, and maintaining the connection with the outer NW. This can, for example, increase the flexibility in the communication system.

The value of an implicit deregistration timer in the inner NW may be set higher than or equal to the value of an implicit deregistration timer in the outer NW for the UE to be connected to the inner NW and the outer NW. The inner AMF may notify the UE of information on the timer in the inner NW. The UE may notify the outer AMF of information on the timer in the outer NW. The outer AMF may change the value of the timer in the outer NW, using the information notified from the UE. Similarly, the outer AMF may notify the UE of the information on the timer in the outer NW. The UE may notify the inner AMF of the information on the timer in the outer NW. The inner AMF may change the value of the timer in the inner NW, using the information notified from the UE. This can, for example, prevent implicit deregistration in the inner NW earlier than in the outer NW. Consequently, unnecessary memory usage in each device in the outer NW can be reduced.

The first modification enables deregistration from the outer NW or release of the connection with the outer NW after deregistration from the inner NW. This can reduce unnecessary memory usage in each device in the outer NW.

The Second Modification of the First Embodiment

The first modification of the first embodiment discloses the methods for deregistering the UE that is connected in cascade with a plurality of NWs. The second modification discloses methods for the UE to start the connection.

The UE starts the connection with the inner NW and the outer NW in this order. This operation may be applied to the start of connection initiated by the UE. The method disclosed in 4.2.3.2 of Non-Patent Document 25 (TS23.502) may be used for starting the connection with each of the NWs. This can, for example, prevent disconnection with the outer NW in a procedure for starting the connection with the outer NW.

The UE may transmit generated uplink data to the inner UPF through the inner AMF and the inner SMF. The UE may determine whether to transmit the data to the inner AMF. The UE may make the determination using information on the uplink data, for example, the size of the uplink data, or using information on the QoS of the uplink data. The inner AMF or the inner SMF may make the determination. This enables, for example, the UE to promptly transmit the uplink data.

The UE may transmit the generated uplink data to the outer UPF through the outer AMF and the outer SMF. The UE may determine whether to transmit the data to the outer AMF. The UE may make the determination using the information on the uplink data, for example, the size of the uplink data, using the information on the QoS of the uplink data, or using a result of determination on whether to route the inner AMF. The UE may include the result of determination on whether to route the inner AMF in the uplink data and notify the outer AMF of the result. The N3IWF, the outer AMF, or the outer SMF may make the determination. The N3IWF may transmit the uplink data to the outer AMF using the result of determination. This enables, for example, the UE to promptly transmit the uplink data.

Another solution is disclosed. The outer AMF notifies the UE of the signaling for instructing to start the connection. The outer AMF may notify the signaling, for example, in the start of connection initiated by the outer NW. The signaling may be, for example, the NAS signaling, the paging request signaling, or new NAS signaling. The new NAS signaling may include information on the paging, or another data, for example, information on the IP address of the UE. The new NAS signaling may include dummy data. The outer AMF may notify the UE of the signaling for instructing to start the connection through the N3IWF, the inner UPF, and the RAN.

The N3IWF may establish the AN connection with the UE. The N3IWF may establish, for example, the IPsec configuration with the UE. For example, the N3IWF and the UE may mutually transmit and receive the IKE_SA_INIT signaling described in Non-Patent Document 23 (RFC7296). For example, the N3IWF and the UE may mutually transmit and receive the IKE_AUTH signaling described in Non-Patent Document 23 (RFC7296). The AN connection in the N3IWF may be established, for example, when the signaling transmitted from the outer AMF to the UE is delivered to the N3IWF. The N3IWF may hold the signaling for instructing to start the connection which has been transmitted by the outer AMF, until establishing the AN connection with the UE.

The inner UPF may notify the inner SMF that the downlink data has been generated for the UE. The inner SMF may notify the inner AMF that the downlink data has been generated. The inner AMF may start paging for the UE. The inner UPF may give the notification to the inner SMF when the PDU session with the UE is deactivated or released. The inner UPF may start the operation, for example, when the signaling to be used for the AN connection (e.g., IKE_SA_INIT) is delivered from the N3IWF to the inner UPF. The inner UPF may hold the signaling to be used for the AN connection, until the completion of the paging for the UE.

As another example, the inner UPF may notify the inner AMF that the downlink data has been generated for the UE. The inner UPF may directly give the notification to the inner AMF. An interface between the inner UPF and the inner AMF may be provided. In response to the notification, the inner AMF may start paging for the UE. This enables, for example, the UE to promptly start the connection in the inner NW.

The UE may start a service request procedure with the inner NW. The UE may start the procedure using the paging received by the UE. The procedure may be, for example, a procedure described in 4.2.3.2 of Non-Patent Document 25 (TS23.502).

The inner UPF may transmit, to the RAN, the signaling to be used for the AN connection. The RAN may transmit, to the UE, the signaling received from the inner UPF. The RAN may transmit the signaling to the UE after the UE transitions to RRC_CONNECTED state.

As another example, the RAN may start the paging. The RAN may start the paging, for example, when the UE is in RRC_INACTIVE state. The RAN may start the paging, for example, when the signaling to be used for the AN connection (e.g., IKE_SA_INIT) is delivered from the N3IWF to the RAN. The RAN may hold the signaling to be used for the AN connection, until the completion of the paging for the UE.

The RAN may transmit the signaling to the UE. The RAN may transmit the signaling to the UE after the UE transitions to RRC_CONNECTED state.

As another example, the paging for the UE need not be performed. The paging need not be performed, for example, when the UE is in RRC_CONNECTED state or CM_CONNECTED state. Here, the N3IWF may transmit the signaling to be used for the AN connection (e.g., IKE_SA_INIT) to the UE through the inner UPF and the RAN.

The UE may establish the IPsec connection with the N3IWF using the signaling from the N3IWF. For example, the UE may transmit, to the N3IWF, the IKE_SA_INIT signaling described in Non-Patent Document 23 (RFC7296). The N3IWF may continue operations for establishing the IPsec connection with the UE, using the signaling from the UE. For example, the N3IWF and the UE may mutually transmit and receive the IKE_AUTH signaling described in Non-Patent Document 23 (RFC7296).

The N3IWF may transmit, to the UE, the signaling for instructing to start the connection which has been transmitted from the outer AMF. The signaling may be signaling held by the N3IWF until the establishment of the AN connection between the N3IWF and the UE.

The UE may start a service request procedure with the outer NW. The UE may start the procedure, using the signaling for instructing to start the connection which has been transmitted from the outer AMF to the UE. The procedure may be, for example, the procedure described in 4.12.4.2 of Non-Patent Document 25 (TS23.502).

Figure 28:
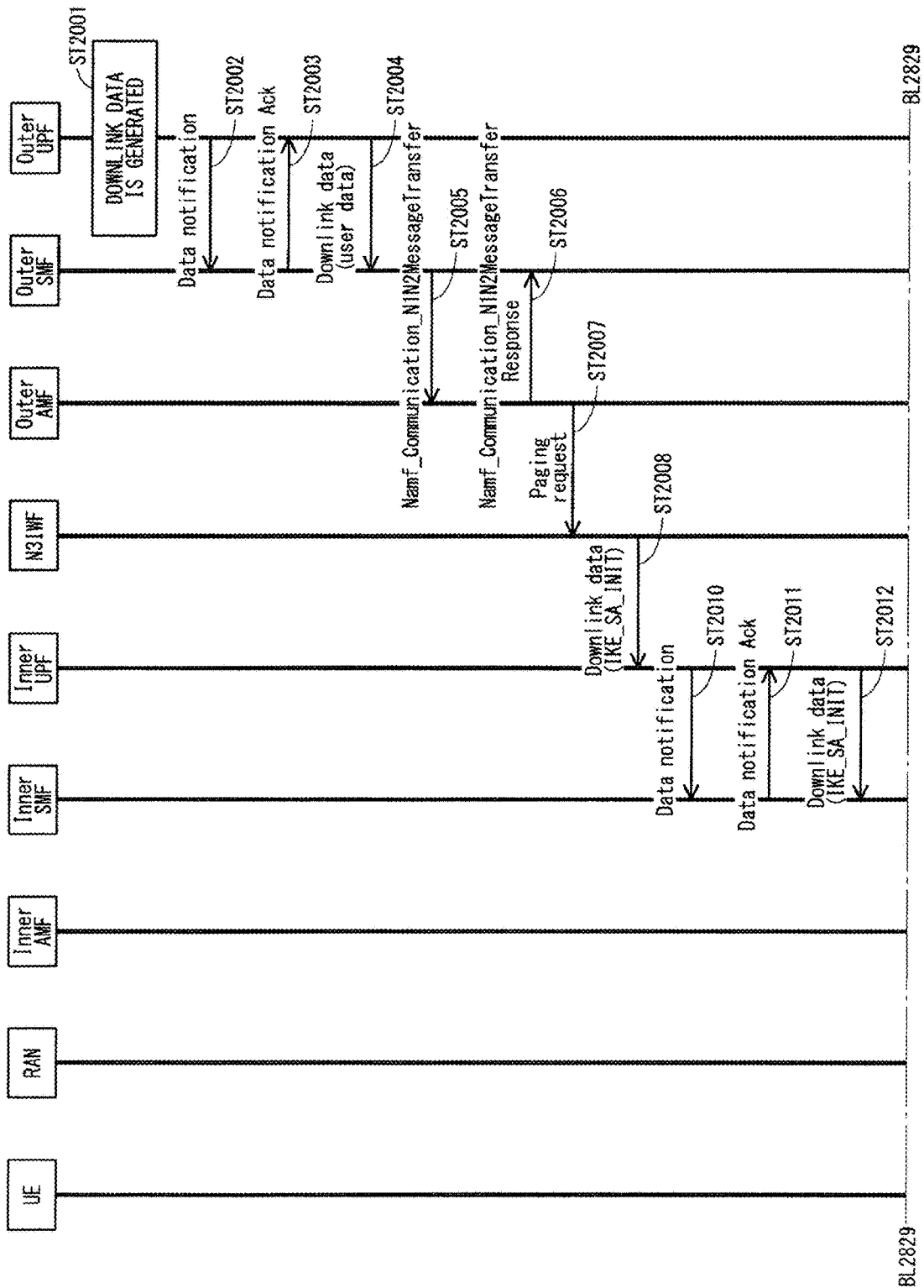
FIG. 28 is a sequence diagram illustrating operations for connecting the UE to the outer NW through the inner NW when the outer NW initiates start of the connection according to the second modification of the first embodiment.
Figure 29:
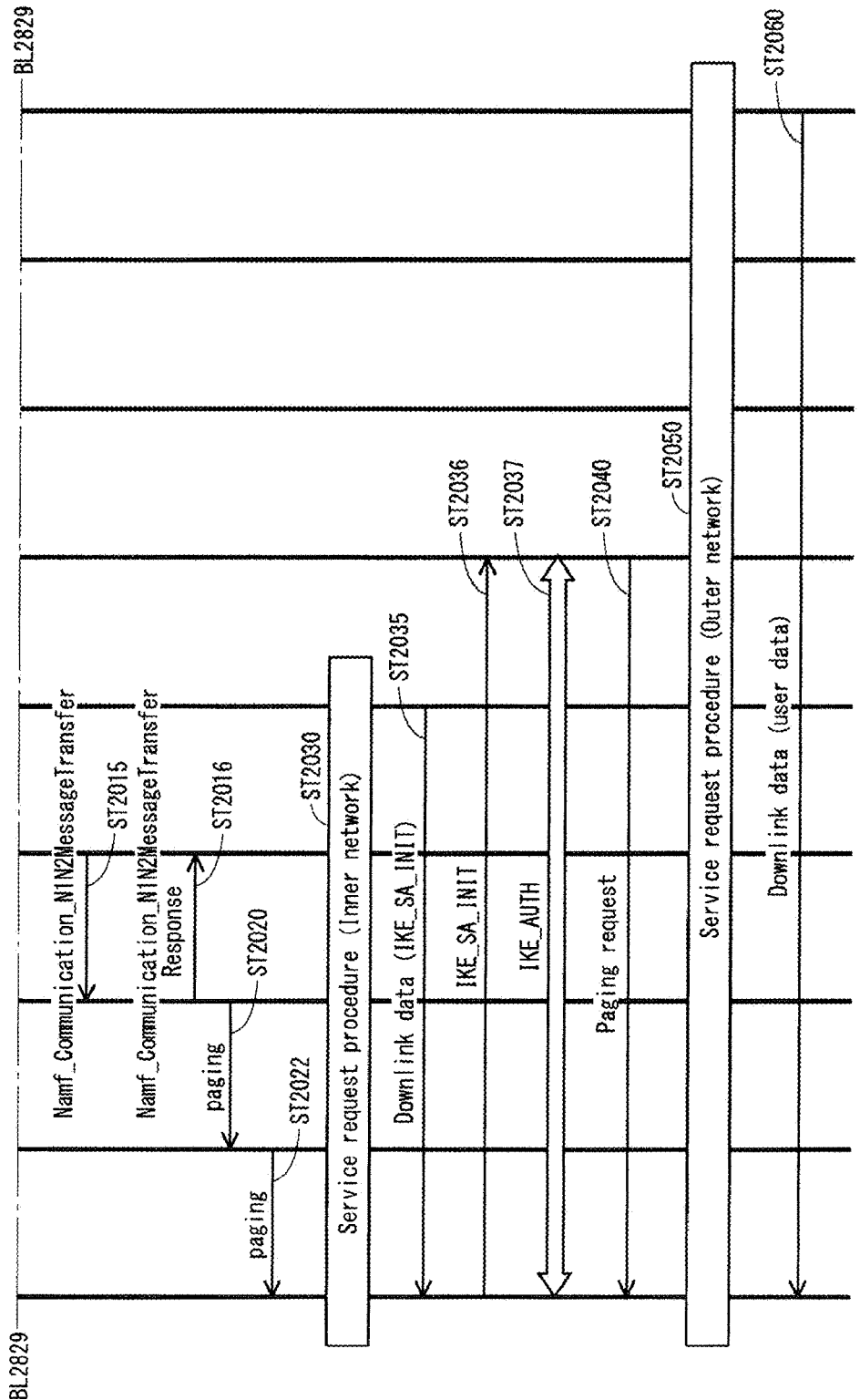
FIG. 29 is a sequence diagram illustrating operations for connecting the UE to the outer NW through the inner NW when the outer NW initiates start of the connection according to the second modification of the first embodiment.

FIGS. 28 and 29 are sequence diagrams illustrating operations for connecting the UE to the outer NW through the inner NW when the outer NW initiates start of the connection. FIGS. 28 and 29 are connected across a location of a border BL2829. FIGS. 28 and 29 illustrate an example where the outer AMF initiates operations for starting the connection. FIGS. 28 and 29 illustrate a case where the UE is in RRC_IDLE state before start of the connection, that is, an example where the UE is connected to neither the inner NW nor the outer NW before start of the connection.

In Step ST2001 of FIG. 28, the downlink data for the UE has been generated in the outer UPF. In Step ST2002, the outer UPF notifies the outer SMF that the data has been generated. In Step ST2003, the outer SMF transmits the acknowledgement of Step ST2002 to the outer UPF. In Step ST2004, the outer UPF transfers the downlink data in Step ST2002 to the outer SMF. The outer UPF may hold the downlink data in Step ST2001.

In Step ST2005 of FIG. 28, the outer SMF requests the outer AMF to transfer the N1 and/or N2 message. In Step ST2006, the outer AMF transmits, to the outer SMF, a response to the request. In Steps ST2005 and ST2006, the Namf_Communication_N1N2MessageTransfer service operation described in 5.2.2.2.7 of Non-Patent Document 25 (TS23.502) may be used.

In Step ST2007 of FIG. 28, the outer AMF transmits, to the N3IWF, the signaling for instructing to start the connection. The signaling may be, for example, the NAS signaling for the UE, the paging request signaling, or new NAS signaling. The new NAS signaling may include information on the paging, or another data, for example, information on the IP address of the UE. The new NAS signaling may include dummy data. The N3IWF may hold the signaling in Step ST2007 until establishing the AN connection with the UE.

In Step ST2008 of FIG. 28, the N3IWF transmits, to the inner UPF, the signaling for establishing the IPsec with the UE. The signaling may be, for example, the IKE_SA_INIT signaling described in Non-Patent Document 23 (RFC7296). The N3IWF may transmit the signaling as, for example, the downlink data for the UE.

In Step ST2010 of FIG. 28, the inner UPF notifies the inner SMF that the data has been generated. In Step ST2011, the inner SMF transmits the acknowledgement of Step ST2010 to the inner UPF. The inner UPF may hold the downlink data in Step ST2008.

In Step ST2012, the inner UPF may transfer the downlink data in Step ST2008 to the inner SMF. Step ST2012 may be performed when the inner SMF instructs the inner UPF to transfer the downlink data. The inner SMF may include the instruction to the inner UPF in the acknowledgement of Step ST2010 and transmit the instruction. The inner SMF may hold the downlink data in Step ST2008. In this case, the inner UPF need not hold the downlink data in Step ST2008. This can, for example, reduce the memory usage in the inner UPF.

In Step ST2015 of FIG. 29, the inner SMF requests the inner AMF to transfer the N1 and/or N2 message. In Step ST2016, the inner AMF transmits, to the inner SMF, a response to the request. In Steps ST2015 and ST2016, the Namf_Communication_N1N2MessageTransfer service operation described in 5.2.2.2.7 of Non-Patent Document 25 (TS23.502) may be used.

In Step ST2020 of FIG. 29, the inner AMF transmits, to the RAN, the paging for the UE. In Step ST2022, the RAN transmits the paging to the UE.

In a procedure ST2030 of FIG. 29, the UE starts the service request procedure for the inner NW. The procedure described in 4.2.3.2 of Non-Patent Document 25 (TS23.502) may be used as the procedure. Through the procedure, the connection between the UE and the inner NW is established.

In Step ST2035 of FIG. 29, the inner UPF transmits, to the UE, the signaling for establishing the IPsec which has been transmitted by the N3IWF. The inner UPF may perform the transmission in Step ST2035, using the downlink data of Step ST2008 held by its own inner UPF. In Step ST2036, the UE transmits, to the N3IWF, the signaling for establishing the IPsec. The signaling to be transmitted by the UE in Step ST2036 may be, for example, the IKE_SA_INIT signaling described in Non-Patent Document 23 (RFC7296). In Step ST2037, the N3IWF and the UE perform operations for establishing the IPsec. The operations may be, for example, transmission and reception of the IKE_SA_AUTH signaling described in Non-Patent Document 23 (RFC7296). Step ST2037 establishes the AN connection between the N3IWF and the UE.

As another example of Step ST2035 of FIG. 29, the inner SMF may transmit, to the UPF, the signaling for establishing the IPsec which has been transmitted by the N3IWF. The inner UPF may transmit the signaling to the UE. The operation may be performed when the inner UPF transfers, in Step ST2012, the downlink data in Step ST2008 to the inner SMF. This enables, for example, the inner SMF to transmit the held downlink data to the UE. Consequently, the memory usage in the inner UPF can be reduced, and the reliability on transmitting and receiving the downlink data can be enhanced.

In Step ST2040 of FIG. 29, the N3IWF transmits, to the UE, the signaling for instructing to start the connection which has been transmitted by the outer AMF. The N3IWF may perform the transmission in Step ST2040, using the signaling of Step ST2007 held by its own N3IWF. The signaling in Step ST2040 may be encrypted and decoded between the N3IWF and the UE through the IPsec. Upon receipt of the signaling in Step ST2040, the UE recognizes the presence of the downlink data from the outer NW.

In a procedure ST2050 of FIG. 29, the UE starts the service request procedure for the outer NW. The procedure described in 4.2.3.2 of Non-Patent Document 25 (TS23.502) may be used as the procedure. In Step ST2050, RRC Connection reconfiguration need not be performed in the procedure described in 4.2.3.2 of Non-Patent Document 25 (TS23.502). Through the procedure, the connection between the UE and the outer NW is established.

In Step ST2060 of FIG. 29, the outer UPF transmits the downlink data to the UE. The outer UPF may transmit, as the downlink data, the data of Step ST2001 held by the outer UPF.

Although FIGS. 28 and 29 illustrate a case where the inner AMF and the RAN transmit the paging, the inner AMF and the RAN need not perform the paging. The inner AMF and the RAN need not perform the paging, for example, when the UE is in RRC_CONNECTED state in the inner NW. The inner AMF and the RAN need not perform the paging, for example, when the UE is in CM_CONNECTED state. This enables, for example, prompt transmission of the downlink data to the UE.

Although FIGS. 28 and 29 illustrate a case where the inner AMF and the RAN transmit the paging, only the RAN may perform the paging. The operation may be performed, for example, when the UE is in RRC_INACTIVE state in the inner NW. The operation may be performed, for example, when the UE is in CM_CONNECTED state. This produces, for example, the same advantages as previously described.

The downlink data in the outer NW may be notified to the UE through the outer SMF and the outer AMF. The outer SMF may notify the UE of the downlink data through its own SMF, the outer AMF, and the N3IWF. The outer SMF may determine whether to notify the UE of the downlink data through the outer SMF and the outer AMF. The outer SMF may make the determination using information on the downlink data, for example, the size of the downlink data, or using information on the QoS of the downlink data. This enables, for example, the outer NW to promptly notify the UE of the downlink data.

The downlink data may be notified to the UE through the inner SMF and the inner AMF. The downlink data may be downlink data in the inner NW, or downlink data transmitted from the outer NW. The inner SMF may notify the UE of the downlink data through its own SMF, the inner AMF, and the RAN. The inner SMF may determine whether to notify the UE of the downlink data through its own SMF and the inner AMF. The inner SMF may make the determination using information on the downlink data, for example, the size of the downlink data, using information on the QoS of the downlink data, or using a result of the determination by the outer SMF. The outer AMF may notify the inner SMF of the result of the determination by the outer SMF. The outer AMF may include the result of the determination by the outer SMF in the downlink data and notify the inner SMF of the result. This enables, for example, the inner NW to promptly notify the UE of the downlink data.

The second modification enables establishment of the NW for the UE from the outer NW.

The Third Modification of the First Embodiment

The second modification of the first embodiment discloses the methods for the outer NW to start the connection with the UE that is connected in cascade with a plurality of NWs. The third modification discloses methods for releasing the PDU session of the UE.

The PDU session between the UE and the outer NW and the PDU session between the UE and the inner NW are released in this order. The operations may be applied to release of the PDU sessions started by the UE. The method disclosed in 4.3.4.2 of Non-Patent Document 25 (TS23.502) may be used for releasing the PDU session in each of the NWs. This can, for example, prevent disconnection of the PDU session with the outer NW as the PDU session with the inner NW is released.

Another solution is disclosed. The inner AMF notifies the UE to release the PDU session with the inner NW (hereinafter may be referred to as an inner PDU session). The inner AMF may give the notification, for example, when determining to release the inner PDU session. The inner AMF may give the notification via the NAS signaling. As another example of the notification, the inner AMF may give the notification when the inner SMF determines to release the inner PDU session. The inner SMF may notify the inner AMF to release the inner PDU session. The inner AMF may transfer the notification from the inner SMF to the UE.

The UE requests the inner AMF to wait for release of the inner PDU session. The UE may make the request via the NAS signaling. The NAS signaling may be the signaling described in Non-Patent Document 26 (TS24.501), or new NAS signaling, for example, PDU Session Release Notification. The inner AMF delays the release of the inner PDU session in response to the request. The inner AMF may transfer the request to the inner SMF. The inner AMF may transfer the request, for example, when the inner SMF determines to release the inner PDU session. The inner SMF delays the release of the inner PDU session in response to the notification transferred from the inner AMF.

The UE may include, in the request, information on the idle time for deregistering. The information and/or operations on the idle time may be identical to those on the idle time for deregistering from the inner NW which are described in the first modification of the embodiment. This can, for example, prevent release of the inner PDU session before release of an outer PDU session. Consequently, unnecessary memory usage in the outer NW can be reduced.

The UE may have a timer for managing the release of the inner PDU session. The timer may be, for example, a timer for managing the idle time. The UE may reset the timer upon establishment of the inner PDU session. The UE may start the timer using the reception of notification for releasing the inner PDU session from the inner AMF as a trigger. The UE may stop the timer using the release of the outer PDU session as a trigger. The UE may recognize the release of the inner PDU session, using expiration of the timer as a trigger. This facilitates, for example, management of operations for releasing the inner PDU session in the UE.

The inner AMF may have a timer for managing the release of the inner PDU session. The timer may be, for example, a timer for managing the idle time. The inner AMF may reset the timer upon establishment of the inner PDU session. The inner AMF may start the timer, using transmission of notification for releasing the inner PDU session to the UE as a trigger. The inner AMF may stop the timer, using notification of resumption of releasing the inner PDU session from the UE as a trigger. The inner may resume releasing the inner PDU session from the UE, using expiration of the timer as a trigger. This facilitates, for example, management of deregistering operations in the inner AMF.

The UE starts processing for releasing a PDU session in the outer NW (hereinafter may be referred to as an outer PDU session). The UE may start the processing for releasing the outer PDU session, for example, using notification for releasing the inner PDU session which has been transmitted from the inner AMF. The outer PDU session to be released by the UE may be, for example, an outer PDU session that shares the QoS flow with the inner PDU session to be released by the inner AMF. The UE requests the outer AMF to release the outer PDU session. The UE may make the request, for example, via the NAS signaling. The NAS signaling may be the NAS signaling described in Non-Patent Document 26 (TS24.501), for example, the PDU Session Release Request. New NAS signaling may be provided. The request from the UE to the outer AMF may include information on the outer PDU session to be released, for example, an identifier of the PDU session. The request from the UE to the outer AMF may include information on release of the inner PDU session. The request may include the information on release of the inner PDU session, for example, as a cause of the request. In response to the request, the outer AMF may release the outer PDU session. As another example, the outer AMF may transfer the request to the outer SMF. In response to the request, the outer SMF may release the outer PDU session.

In response to the request from the UE, the outer AMF requests the N3IWF to release AN resources associated with the PDU session. The outer AMF may make the request to the N3IWF, for example, using the connection of the UE to the outer NW through the inner NW. The outer AMF may make the request to the N3IWF, using information indicating that the UE releases the inner PDU session, for example, information indicating that the cause included in the notification from the UE is on the release of the inner PDU session. This enables, for example, application of conventional design to the design of the communication system. Consequently, the complexity in designing the communication system can be avoided.

The UE notifies the inner AMF that the outer PDU session has been released. The UE may notify that the release of the inner PDU session is ready. The UE may give the notification to the inner AMF via the NAS signaling. The NAS signaling may be the signaling described in Non-Patent Document 26 (TS24.501), or new NAS signaling, for example, PDU session release ready signaling. In response to the notification, the inner AMF may resume releasing the inner PDU session. As another example, the inner AMF may transfer the request to the inner SMF. In response to the request, the inner SMF may release the inner PDU session.

Figure 30:
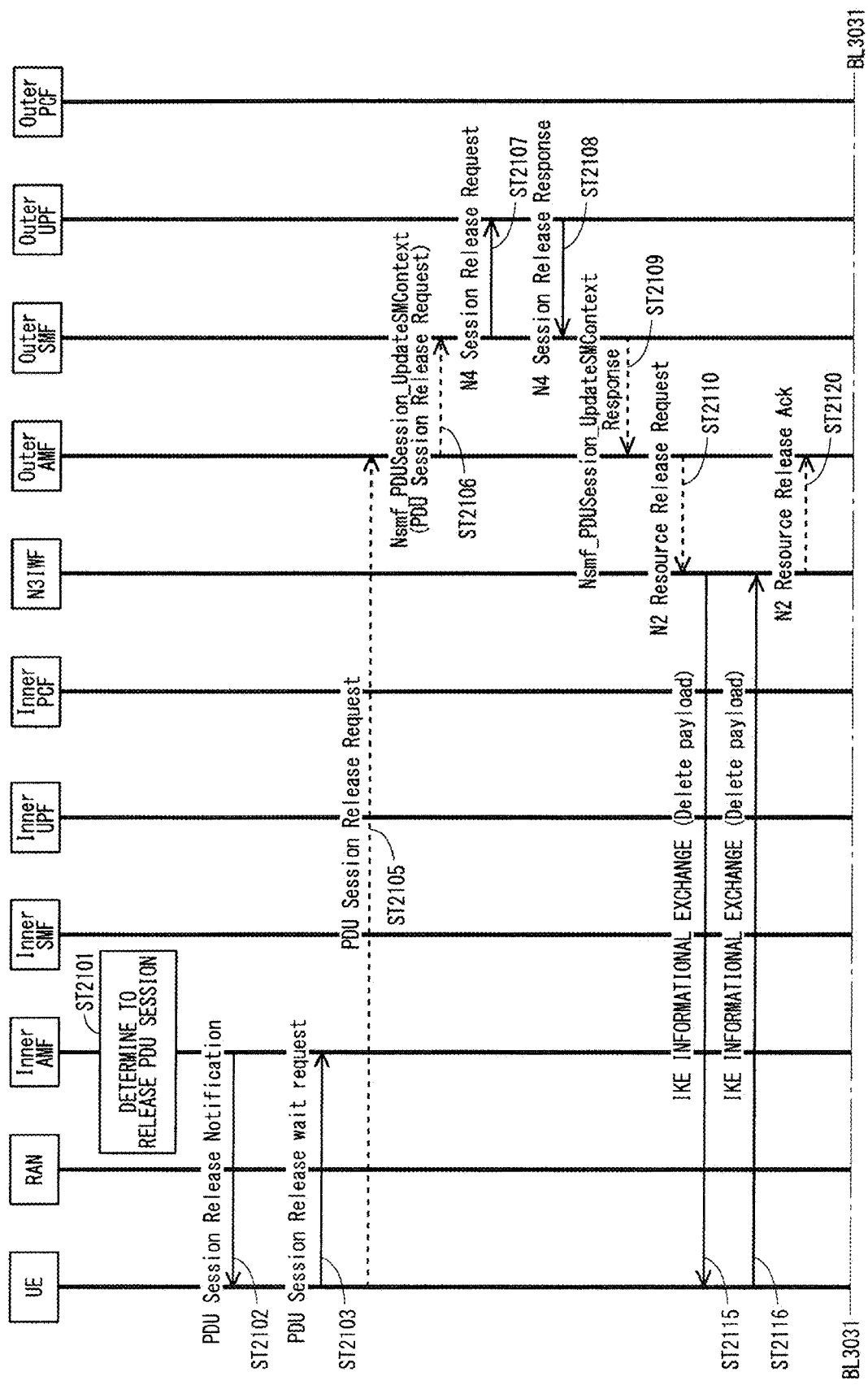
FIG. 30 is a sequence diagram illustrating the first example of operations for releasing an outer PDU session as an inner PDU session is released for the UE connected to the outer NW through the inner NW according to the third modification of the first embodiment.
Figure 31:
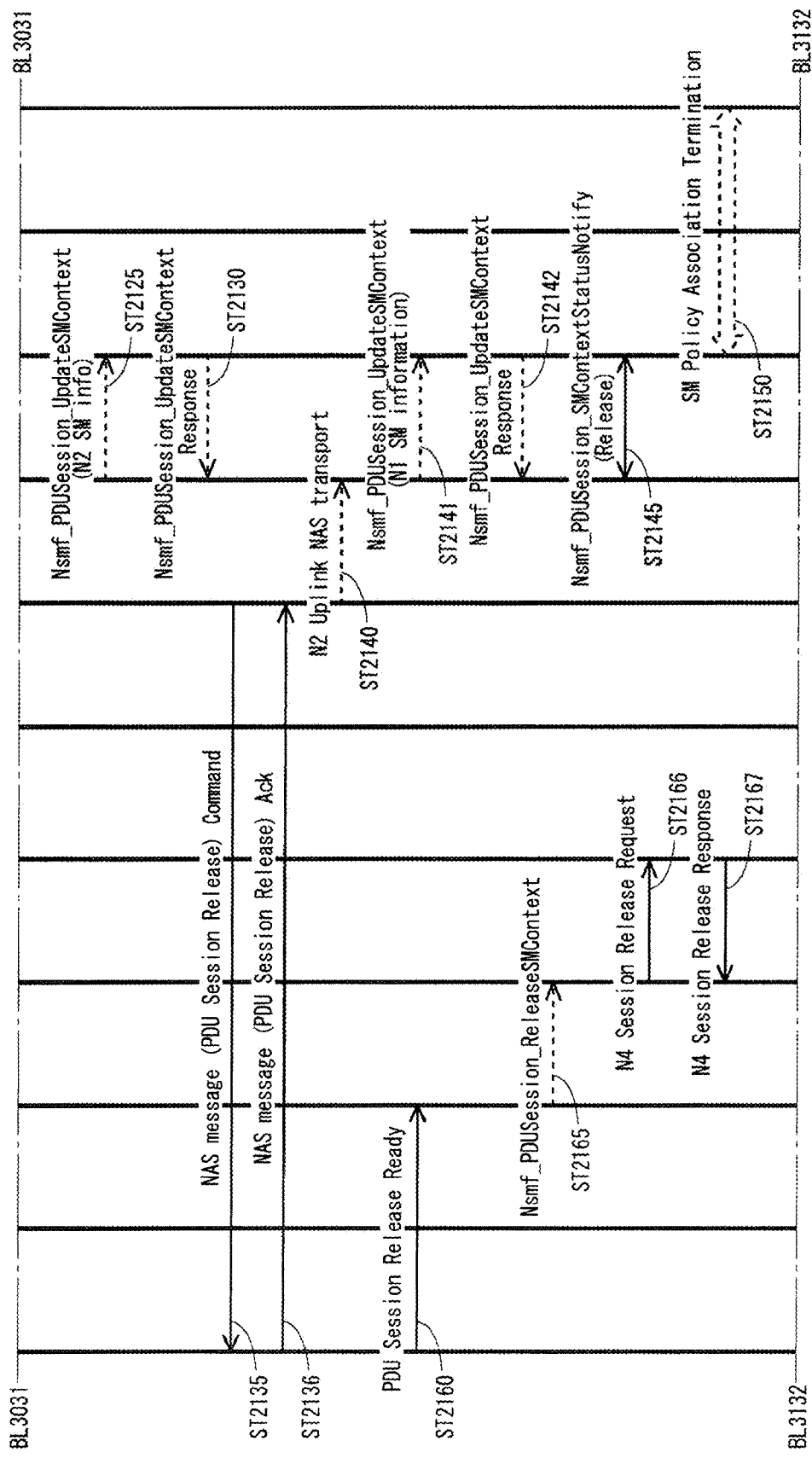
FIG. 31 is a sequence diagram illustrating the first example of operations for releasing the outer PDU session as the inner PDU session is released for the UE connected to the outer NW through the inner NW according to the third modification of the first embodiment.

FIGS. 30 to 32 are sequence diagrams illustrating the first example of operations for releasing the outer PDU session as the inner PDU session is released for the UE connected to the outer NW through the inner NW. FIGS. 30 to 32 are connected across locations of borders BL3031 and BL3132. FIGS. 30 to 32 illustrate an example where the inner AMF starts releasing the inner PDU session.

In Step ST2101 of FIG. 30, the inner AMF determines to release the PDU session. In Step ST2102, the inner AMF notifies the UE to release the inner PDU session. The inner AMF may give the notification via new NAS signaling, for example, using the PDU Session Release Notification. The signaling may include information on the inner PDU session to be released, for example, information on an identifier of the PDU session. The signaling may include information on NW slicing corresponding to the PDU session, for example, Network Slice Selection Assistance Information (NSSAI) described in Non-Patent Document 22 (TS23.501) and/or Single Network Slice Selection Assistance Information (S-NSSAI). Upon receipt of the notification in Step ST2102, the UE recognizes the release of the inner PDU session.

In Step ST2103 of FIG. 30, the UE requests the inner AMF to wait for the release of the inner PDU session. The UE may make the request via the NAS signaling. The NAS signaling may be new NAS signaling, for example, the PDU session release wait request signaling. The signaling may include information on the idle time for releasing the PDU session. The inner AMF may wait for the release of the PDU session, using the signaling. The inner AMF may wait for the release of the PDU session, during the idle time included in the signaling or during a predefined idle time. The inner AMF may wait for the release of the PDU session until receiving notification of resuming deregistration from the UE, which will be described later. The starting point of the idle time in the inner AMF may be a point of receiving the wait request in Step ST2103.

In Step ST2105 of FIG. 30, the UE requests the outer NW to release the outer PDU session. The UE may make the request via the NAS signaling. The NAS signaling may be the existing signaling described in Non-Patent Document 26 (TS24.501), for example, the PDU Session Release Request. New NAS signaling may be provided. The NAS signaling may include information on a cause of the request. The information on the cause may be, for example, release of the inner PDU session. The outer AMF may start operations for releasing the outer PDU session via the NAS signaling.

In Step ST2106 of FIG. 30, the outer AMF requests the outer SMF to release the outer PDU session. The outer AMF may make the request using, for example, the Nsmf_PDUSession_UpdateSMContext service operation described in 5.2.8.2.6 of Non-Patent Document 25 (TS23.502). In Step ST2107, the outer SMF requests the outer UPF to release an N4 session. Upon receipt of the request in Step ST2107, the outer UPF releases resources for the outer PDU session. In Step ST2108, the outer UPF notifies the outer SMF of a response to the request for releasing the N4 session. In Steps ST2107 and ST2108, the N4 Session Release procedure described in 4.4.1.4 of Non-Patent Document 25 (TS23.502) may be used. In Step ST2109, the outer SMF notifies the outer AMF of a response to the request for releasing the outer PDU session. The outer SMF may respond using, for example, the Nsmf_PDUSession_UpdateSMContext service operation described in 5.2.8.2.6 of Non-Patent Document 25 (TS23.502).

In Step ST2110 of FIG. 30, the outer AMF requests the N3IWF to release the AN resources associated with the PDU session between the outer AMF and the N3IWF. The outer AMF may make the request, for example, via the N2 Resource Release Request signaling described in Non-Patent Document 24 (TS38.413). Upon receipt of the request in Step ST2110, the N3IWF starts releasing the AN resources associated with the PDU session with the UE.

In Steps ST2115 and ST2116 of FIG. 30, the AN resources associated with the PDU session are released between the N3IWF and the UE. In the example of FIG. 30, the IPsec Security Association (SA) is released between the N3IWF and the UE. In Step ST2115, the N3IWF notifies the UE to release the IPsec SA. The signaling to be used for the notification may be, for example, the IKE INFORMA- TIONAL exchange signaling described in Non-Patent Document 23 (IETF RFC7296). The signaling may include the Delete payload described in Non-Patent Document 23 (IETF RFC7296). The Delete payload may include information (e.g., an identifier) on the IPsec SA. Upon receipt of the notification in Step ST2115, the UE releases the IPsec SA. In Step ST2116, the UE notifies the N3IWF that the IPsec SA has been released. The UE may give the notification to the N3IWF, for example, via the same signaling in Step ST2115. Upon receipt of the notification in Step ST2115, the N3IWF recognizes the release of the AN resources associated with the PDU session in the UE.

The IPsec SA to be released in Steps ST2115 and ST2116 of FIG. 30 may be only the IPsec SA to be used for the outer PDU session. The UE and the N3IWF need not release the IPsec SA to be used for C-plane communication between the UE and the outer NW. This enables, for example, prompt communication of the signaling between the UE and the outer AMF.

In Step ST2120 of FIG. 30, the N3IWF transmits, to the outer AMF, a response to the request for releasing the AN resources associated with the PDU session. The N3IWF may respond via, for example, the N2 Resource Release Ack signaling described in Non-Patent Document 24 (TS38.413).

In Step ST2125 of FIG. 31, the outer AMF transmits, to the outer SMF, information on the N2 connection between the N3IWF and the outer AMF. In Step ST2130, the outer SMF transmits, to the outer SMF, a response to the information. In Steps ST2125 and ST2130, for example, the Nsmf_PDUSession_UpdateSMContext service operation described in 5.2.8.2.6 of Non-Patent Document 25 (TS23.502) may be used.

In Step ST2135 of FIG. 31, the N3IWF instructs the UE to release the PDU session. The N3IWF may transmit the instruction via the NAS signaling transmitted from the outer AMF. In response to the instruction, the UE releases the resources corresponding to the outer PDU session in its own UE. In Step ST2136, the UE transmits, to the N3IWF, a response to the instruction. In Step ST2140, the N3IWF transmits, to the outer AMF, the NAS signaling received in Step ST2136.

In Step ST2141 of FIG. 31, the outer AMF transmits, to the outer SMF, information on the N1 connection between the UE and the outer AMF. In Step ST2142, the outer SMF transmits, to the outer SMF, a response to the information. In Steps ST2141 and ST2142, for example, the Nsmf_PDUSession_UpdateSMContext service operation described in Non-Patent Document 25 (TS23.502) may be used.

In Step ST2145 of FIG. 31, the outer AMF and the outer SMF mutually notify release of the session management (SM) context on the outer PDU session. In Step ST2145, for example, Nsmf_PDUSession_SMContextStatusNotify described in 5.2.8.2.8 of Non-Patent Document 25 (TS23.502) may be used.

In Step ST2150 of FIG. 31, the outer SMF and the outer PCF perform operations of the session management (SM) Policy Association Termination described in 4.16.6 of Non-Patent Document 25 (TS23.502).

In Step ST2160 of FIG. 31, the UE notifies the inner AMF that the outer PDU session has been released. The UE may notify that the release of the inner PDU session is ready. The UE may give the notification to the inner AMF via the NAS signaling. The NAS signaling may be the signaling described in Non-Patent Document 26 (TS24.501), for example, the PDU Session Release Request. The NAS signaling may be new NAS signaling, for example, the PDU session release ready signaling. Upon receipt of the notification in Step ST2160, the inner AMF resumes releasing the inner PDU session.

In Steps ST2165, ST2166, and ST2167 of FIG. 31 and Step ST2170 of FIG. 32, the inner NW devices perform processes similar to those performed between the outer NW devices (Step ST2106, ST2107, ST2108, and ST2109 of FIG. 30, respectively).

In Step ST2175 of FIG. 32, the inner AMF requests the RAN to release the RRC resources associated with the inner PDU session between the inner AMF and the RAN. The inner AMF may make the request, for example, via the N2 Resource Release Request signaling described in Non-Patent Document 24 (TS38.413). Upon receipt of the notification in Step ST2175, the RAN starts releasing the AN resources with the UE that are associated with the inner PDU session.

In Step ST2176 of FIG. 32, the RAN and the UE perform operations for releasing the AN resources associated with the inner PDU session. The RAN may request the UE to release the inner PDU session. The RAN may make the request via the RRC signaling, for example, using the RRC Reconfiguration (RRCReconfiguration) disclosed in Non-Patent Document 27 (TS38.331). The RRC signaling may include information on the instruction for releasing the inner PDU session. In response to the signaling, the UE may release the inner PDU session. The UE may transmit, to the RAN, a response to the instruction. The response may be, for example, the RRC Reconfiguration completion (RRCReconfigurationComplete) disclosed in Non-Patent Document 27 (TS38.331).

In Step ST2177 of FIG. 32, the RAN transmits, to the inner AMF, a response to the request for releasing the AN resources associated with the inner PDU session. The RAN may respond via, for example, the N2 Resource Release Ack signaling described in Non-Patent Document 24 (TS38.413).

In Steps ST2178 and ST2179 of FIG. 32, the inner AMF and the inner SMF perform processes similar to those performed between the outer AMF and the outer SMF (Step ST2125 and ST2130 of FIG. 31).

In Step ST2180 of FIG. 32, the UE transmits, to the RAN, the acknowledgement to the PDU Session Release Request. The UE may respond, for example, via the NAS signaling from the UE to the inner AMF. The UE may transmit the response to the RAN, for example, via the RRC signaling including the NAS signaling. In Step ST2181, the RAN transmits, to the inner AMF, the NAS signaling received in Step ST2180.

In Steps ST2182, ST2183, ST2184, and ST2185 of FIG. 32, the inner NW devices perform processes similar to those performed between the outer NW devices (Step ST2141, ST2142, ST2145, and ST2150 of FIG. 31, respectively).

Although FIGS. 30 to 32 illustrate a case where the N3IWF instructs release of the AN connection for the outer PDU session and release of the outer PDU session via different signalings, the N3IWF may issue the instructions via the same signaling. For example, the processes in Step ST2115 of FIG. 30 and Step ST2135 of FIG. 31 may be performed via the same signaling. The processes in Step ST2116 of FIG. 30 and Step ST2136 of FIG. 31 may be performed via the same signaling. This can, for example, reduce the amount of signaling between the UE and the N3IWF.

Although FIGS. 30 to 32 illustrate a case where the N3IWF releases the outer PDU session after releasing the AN connection for the outer PDU session, the N3IWF may release the outer PDU session after releasing the AN connection for the outer PDU session. For example, Steps 2135 and ST2136 may be performed between Steps ST2110 and ST2115. This enables, for example, the UE to promptly perform the process in Step ST2160. Consequently, the processes for releasing the PDU session in the communication system can be promptly performed.

The inner AMF may notify the UE to release the PDU session only when the inner AMF understands the connection of the UE to the outer NW through the inner NW. The UE may notify the inner AMF of information on the outer NW in advance. The UE may give the notification, for example, similarly to that in the first modification of the first embodiment. The inner AMF may give the notification to the inner SMF. In response to the notification, the inner SMF may wait for the release of the PDU session. This can, for example, prevent release of the inner PDU session before release of the outer PDU session. Consequently, the robustness in the communication system can be increased.

Another solution is disclosed. The inner AMF need not release the PDU session when the release is started by the NW. The UE may notify the inner AMF of information on the outer NW in advance. The UE may give the notification in the aforementioned manner. The inner AMF may recognize that its own AMF is the inner AMF through the notification. This can, for example, increase the robustness in the communication system.

As another example, the outer AMF need not release the PDU session when the release is started by the NW. Alternatively, both of the AMFs included in a connection configuration of the inner NW and the outer NW need not perform the PDU session started by the NW. The UE may notify the outer AMF of information on the inner NW in advance. The UE may notify the inner AMF of information on the outer NW in advance. The inner AMF and/or the outer AMF may determine whether to release the PDU session when the release is started by the NW, using the notification from the UE. This can, for example, increase the robustness in the communication system.

Another solution is disclosed. The inner SMF notifies the inner AMF to release the inner PDU session. The inner SMF may give the notification, for example, when determining to release the inner PDU session. The inner SMF may give the notification via the AMF-SMF signaling, for example, using the Namf_Communication_N1N2MessageTransfer service operation disclosed in 5.2.2.2.7 of Non-Patent Document 25 (TS23.502). The inner SMF may give the notification before requesting release of the N4 session with the inner UPF. This enables, for example, the release of the inner PDU session after notification to the UE. Consequently, the release of the inner PDU session before release of the outer PDU session can be prevented. Consequently, the robustness in the communication system can be increased.

The inner AMF notifies the UE to release the inner PDU session. The inner AMF may give the notification similarly to the aforementioned solutions. The UE requests the inner AMF to wait for release of the inner PDU session. The UE may make the request similarly to the aforementioned solutions.

The inner AMF requests the inner SMF to wait for release of the inner PDU session. The inner SMF may make the request via the AMF-SMF signaling, for example, using the Namf_Communication_N1N2MessageTransfer service operation disclosed in 5.2.2.2.7 of Non-Patent Document 25 (TS23.502). The request may include information on the idle time.

The UE starts processing for releasing the outer PDU session. The release processing may be the one in the aforementioned solutions.

The UE notifies the inner AMF that the outer PDU session has been released. The UE may notify that the release of the inner PDU session is ready. The UE may give the notification similarly to the aforementioned solutions. The inner AMF transfers the notification to the inner SMF. The inner AMF may perform the transfer, for example, as the Nsmf_PDUSession_ReleaseSMContext service operation disclosed in 5.2.8.2.7 of Non-Patent Document 25 (TS23.502). The inner SMF may perform the processes for releasing the PDU session with the inner UPF, using the transfer.

Figure 34:
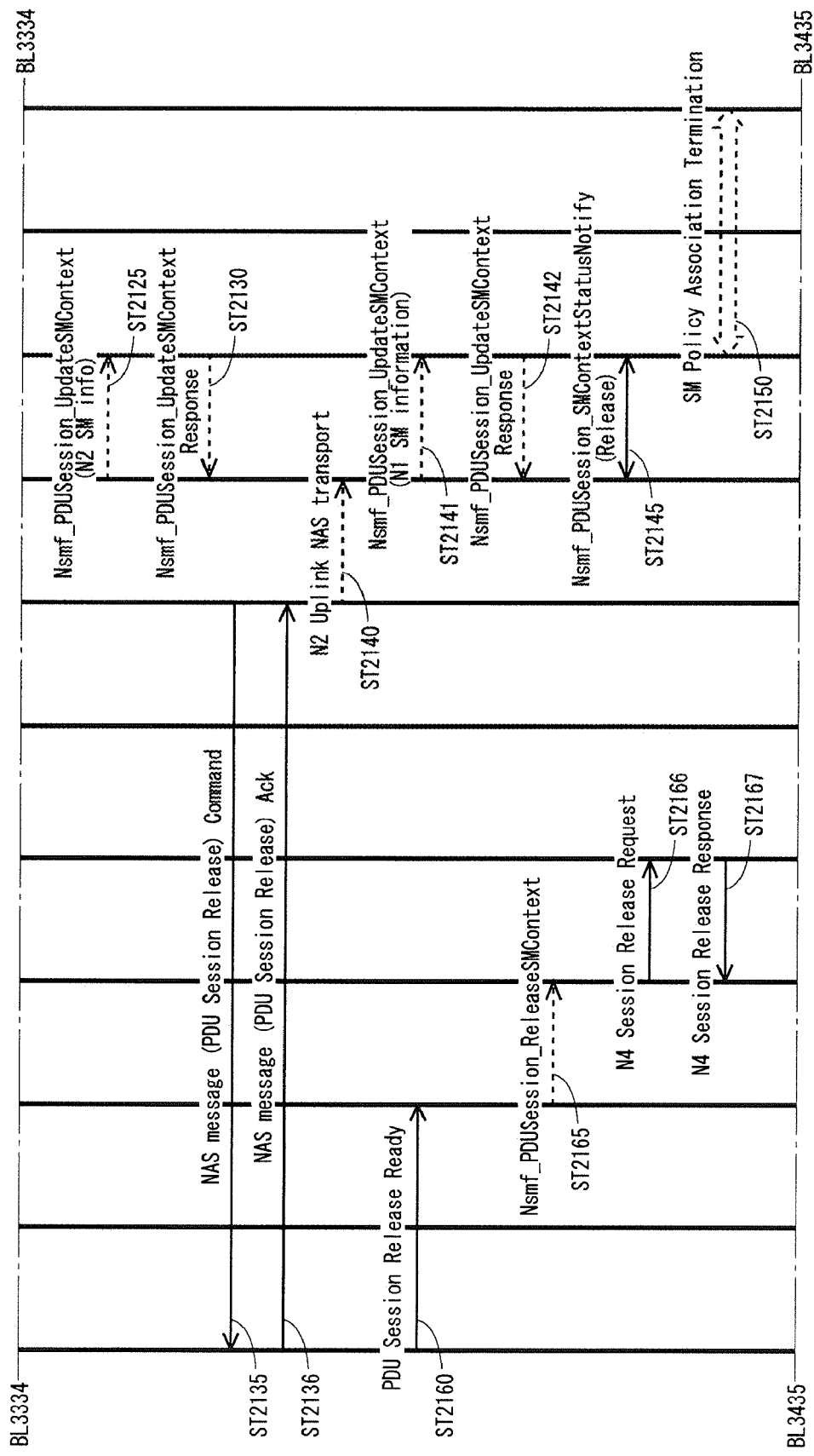
FIG. 34 is a sequence diagram illustrating the second example of operations for releasing the outer PDU session as the inner PDU session is released for the UE connected to the outer NW through the inner NW according to the third modification of the first embodiment.
Figure 35:
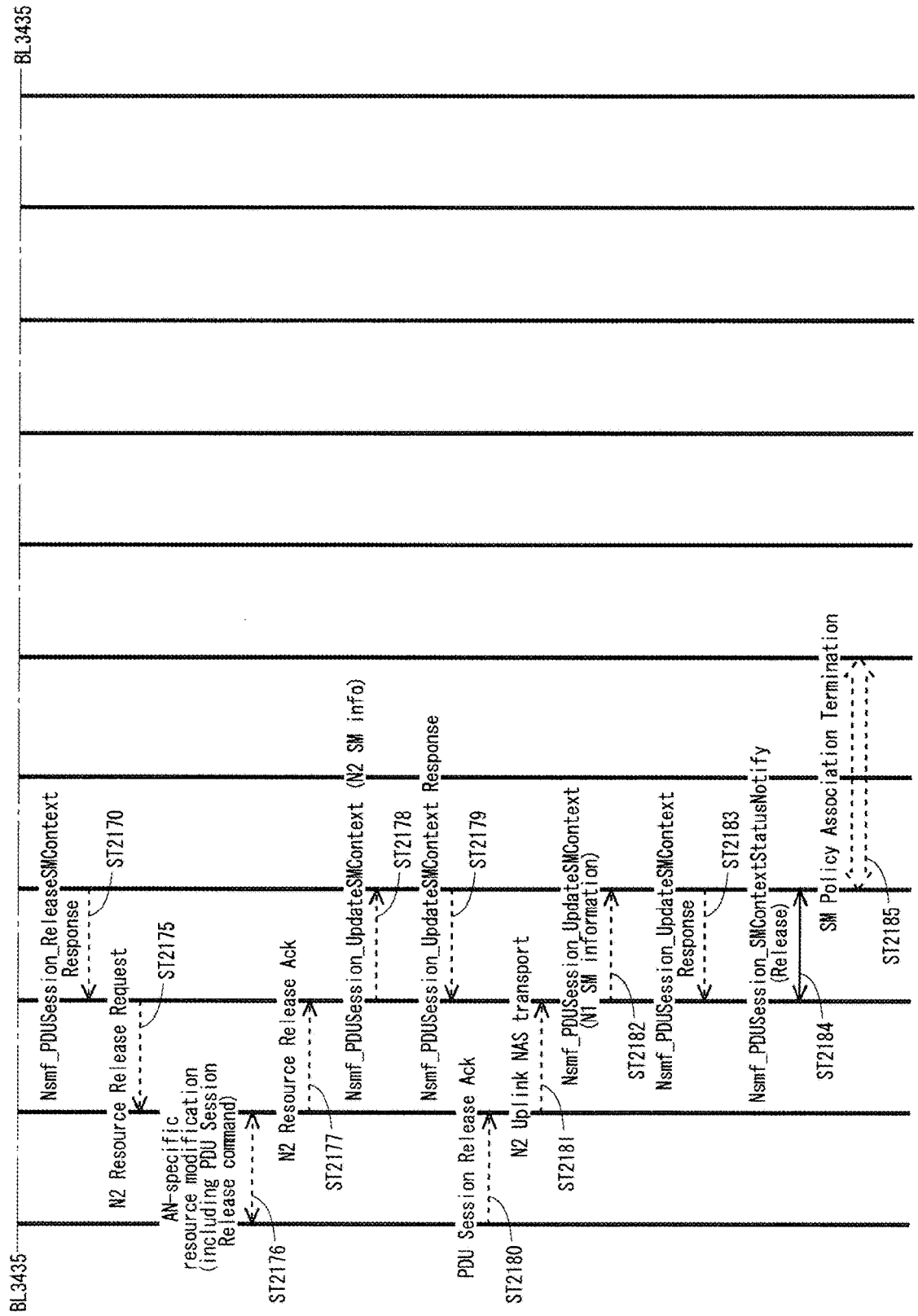
FIG. 35 is a sequence diagram illustrating the second example of operations for releasing the outer PDU session as the inner PDU session is released for the UE connected to the outer NW through the inner NW according to the third modification of the first embodiment.

FIGS. 33 to 35 are sequence diagrams illustrating the second example of operations for releasing the outer PDU session as the inner PDU session is released for the UE connected to the outer NW through the inner NW. FIGS. 33 to 35 are connected across locations of borders BL3334 and BL3435. FIGS. 33 to 35 illustrate an example where the inner SMF starts releasing the inner PDU session. In FIGS. 33 to 35, the same step numbers are applied to the processes identical to those in FIGS. 30 to 32, and the common description thereof is omitted.

In Step ST2201 of FIG. 33, the inner SMF determines to release the PDU session. In Step ST2202, the inner SMF notifies the inner AMF to release the inner PDU session. The inner SMF may give the notification via the AMF-SMF signaling, for example, using the Namf_Communication_N1N2MessageTransfer service operation disclosed in 5.2.2.2.7 of Non-Patent Document 25 (TS23.502).

Steps ST2102 and ST2103 in FIG. 33 are identical to those in FIG. 30.

In Step ST2204 of FIG. 33, the inner AMF requests the inner SMF to wait for the release of the inner PDU session. The inner AMF may make the request via the AMF-SMF signaling, for example, using the Namf_Communication_N1N2MessageTransfer service operation disclosed in 5.2.2.2.7 of Non-Patent Document 25 (TS23.502). The request in Step ST2204 may include information on the idle time. The inner SMF suspends the release of the inner PDU session in response to the request.

Steps ST2105 to ST2185 in FIGS. 33 to 35 are identical to those in FIGS. 30 to 32.

The inner NW may have a PDU session not to be released. For example, the inner PDU session to be used for transmitting and receiving the C-plane data in the outer NW need not be released. The UE may notify the inner AMF of information on the PDU session. The inner AMF may notify the inner SMF of the information. This enables, for example, stable C-plane communication in the outer NW.

The methods disclosed in the first modification of the first embodiment may be applied to releasing the PDU session. This produces the same advantages as those in the first modification of the first embodiment.

The methods disclosed in this third modification may be applied to release of the PDU session started by the RAN. For example, the RAN may notify the UE to release the inner PDU session. The UE may request the outer AMF to release the outer PDU session. As another example, the N3IWF may start releasing the PDU session. The N3IWF may notify the UE to release the outer PDU session. This can, for example, reduce unnecessary memory usage in the RAN and/or the N3IWF.

The methods disclosed in the third modification may be applied to release of the PDU session started by the PCF. For example, the inner PCF may notify the inner AMF to release the inner PDU session. The inner PCF may give the notification through the inner SMF. The inner AMF may transfer the notification to the UE. The UE may transfer the notification to the outer AMF. This can, for example, reduce unnecessary memory usage in the PCF.

The third modification can release the unnecessary outer PDU session. This can reduce the memory usage in the UE and the outer NW devices.

The Fourth Modification of the First Embodiment

The third modification of the first embodiment discloses the method for releasing the PDU session from the inner NW for the UE that is connected in cascade with a plurality of NWs. The fourth modification discloses methods for deactivating the U-plane connection in the PDU session of the UE.

In the communication system, the U-plane connection in the outer PDU session is deactivated (hereinafter may be referred to as outer U-plane deactivation) prior to deactivating the U-plane connection in the inner PDU session (hereinafter may be referred to as inner U-plane deactivation). The operation may be performed when the inner SMF starts the inner U-plane deactivation.

The inner SMF notifies the inner AMF of the inner U-plane deactivation. The inner SMF may give the notification via the signaling described in Non-Patent Document 25 (TS23.502), or new signaling, for example, Namf_U-planeDeactivation. The signaling described in Non-Patent Document 25 (TS23.502) may include information on the U-plane deactivation, for example, information indicating the U-plane deactivation and/or a PDU session identifier.

The inner AMF notifies the UE of the inner U-plane deactivation. The inner AMF may give the notification via the NAS signaling described in Non-Patent Document 25 (TS23.502). The inner AMF may give the notification via new NAS signaling, for example, using U-plane deactivation notification. The signaling may include information on the U-plane deactivation, for example, information indicating the U-plane deactivation and/or a PDU session identifier.

The UE may request the inner AMF to wait for the inner U-plane deactivation. The UE may make the request via the NAS signaling described in Non-Patent Document 25 (TS23.502). The UE may make the request via new NAS signaling, for example, using the U-plane deactivation wait request. The signaling may include information on waiting for U-plane deactivation, for example, information indicating waiting for deactivation, information on the PDU session corresponding to the U-plane to be deactivated, and/or U-plane deactivation idle time.

The U-plane deactivation idle time included in the request from the UE to the inner AMF may be predetermined in another example. This can, for example, reduce the size of the signaling from the UE to the inner AMF.

The inner AMF may request the inner SMF to wait for the inner U-plane deactivation. The inner AMF may make the request via the signaling described in Non-Patent Document 25 (TS23.502), for example, Nsmf_PDUSession_UpdateSMContext. The inner AMF may make the request via new signaling, for example, using a response to Namf_U-planeDeactivation. The inner AMF may make the request using Nsmf_UplaneDeactivationWait. The signaling may include information on waiting for the U-plane deactivation. The information may be identical to the information included in the request for waiting for the inner U-plane deactivation from the UE to the inner AMF.

The U-plane deactivation idle time included in the request from the inner AMF to the inner SMF may be predetermined in another example. This can, for example, reduce the size of the signaling from the inner AMF to the inner SMF.

The UE may have a timer for managing the inner U-plane deactivation. The timer may be, for example, a timer for managing the idle time. The UE may reset the timer upon establishment of the inner PDU session. The UE may start the timer, using the reception of notification of the inner U-plane deactivation from the inner AMF as a trigger. The UE may stop the timer, using completion of the outer U-plane deactivation as a trigger. The UE may recognize the inner U-plane deactivation, using expiration of the timer as a trigger. This facilitates, for example, management of operations for the inner U-plane deactivation in the UE.

The inner AMF may have a timer for managing the inner U-plane deactivation. The timer may be, for example, a timer for managing the idle time. The inner AMF may reset the timer upon establishment of the inner PDU session. The inner AMF may start the timer, using transmission of notification of the inner U-plane deactivation to the UE as a trigger. The inner AMF may stop the timer, using notification of resumption of the inner U-plane deactivation from the UE as a trigger. The inner may resume the inner U-plane deactivation in the UE, using expiration of the timer as a trigger. This facilitates, for example, management of deregistering operations in the inner AMF. The SMF may have the timer. This facilitates, for example, management of deregistering operations in the inner SMF.

The UE may request the outer U-plane deactivation from the outer AMF. The UE may make the request via the NAS signaling described in Non-Patent Document 25 (TS23.502), for example, using the PDU session modification request. The UE may make the request via new NAS signaling, for example, using the U-plane deactivation request. The signaling may include information on the PDU session in which the U-plane connection is deactivated. The UE may, for example, determine to deactivate the U-plane connection in the outer PDU session including the QoS flow corresponding to the inner U-plane connection to be deactivated.

The outer AMF may request the outer U-plane deactivation from the outer SMF. The outer AMF may make the request via the signaling described in Non-Patent Document 25 (TS23.502), for example, Nsmf_PDUSession_UpdateSMContext. The outer AMF may make the request via new signaling, for example, Namf_UplaneDeactivation. The signaling may include information on the PDU session in which the U-plane connection is deactivated. The outer SMF may start operations for the outer U-plane deactivation, using the information.

The outer SMF may transmit, to the outer AMF, a response to the request for the outer U-plane deactivation. The outer SMF may transmit the response after a request for modifying the N4 session and the response between the outer SMF and the outer UPF, and/or after a request for releasing the N4 session and the response between the outer SMF and the outer UPF. The outer SMF may respond to the outer AMF instead of Namf_Communication_N1N2MessageTransfer described in Non-Patent Document 25 (TS23.502). The outer AMF may perform the processes for releasing N2 PDU session resources with the N3IWF, using the response. The N3IWF may release, with the UE, the AN resources, for example, child SA in IPsec.

The UE may request the inner AMF to resume the inner U-plane that has been put on hold or to deactivate the inner U-plane, or notify the inner AMF that the inner U-plane deactivation is ready. The UE may make the request via the NAS signaling described in Non-Patent Document 25 (TS23.502). The UE may make the request via new NAS signaling, for example, using notification indicating that the U-plane deactivation is ready.

As another example, the UE need not request the inner AMF to resume the inner U-plane deactivation or to deactivate the inner U-plane, or notify the inner AMF that the inner U-plane deactivation is ready. For example, the UE need not give the request or the notification to the inner AMF when the UE includes the idle time in the request or the notification and requests the inner AMF to deactivate the inner U-plane. For example, when the idle time is predefined, the UE need not give the request or the notification. This can, for example, reduce the signaling between the UE and the inner AMF.

The inner AMF may request the inner SMF to resume the inner U-plane that has been put on hold or to deactivate the inner U-plane, or notify the inner SMF that the inner U-plane deactivation is ready. The inner AMF may make the request via the signaling described in Non-Patent Document 25 (TS23.502), for example, Nsmf_PDUSession_UpdateSMContext. The inner AMF may make the request via new signaling, for example, Nsmf_UplaneDeactivation-Ready.

As another example, the inner AMF need not request the inner SMF to resume the inner U-plane deactivation or to deactivate the inner U-plane, or notify the inner SMF that the inner U-plane deactivation is ready. For example, the inner AMF need not give the request or the notification to the inner SMF when the inner AMF includes the idle time in the request or the notification and requests the inner SMF to deactivate the inner U-plane. For example, when the idle time is predefined, the inner AMF need not give the request or the notification. This can, for example, reduce the signaling between the inner AMF and the inner SMF.

Upon receipt of the request and/or the ready notification, the inner SMF may resume a procedure for deactivating the inner U-plane. As another example, the inner SMF may resume the procedure for deactivating the inner U-plane upon expiration of the idle time.

Figure 36:
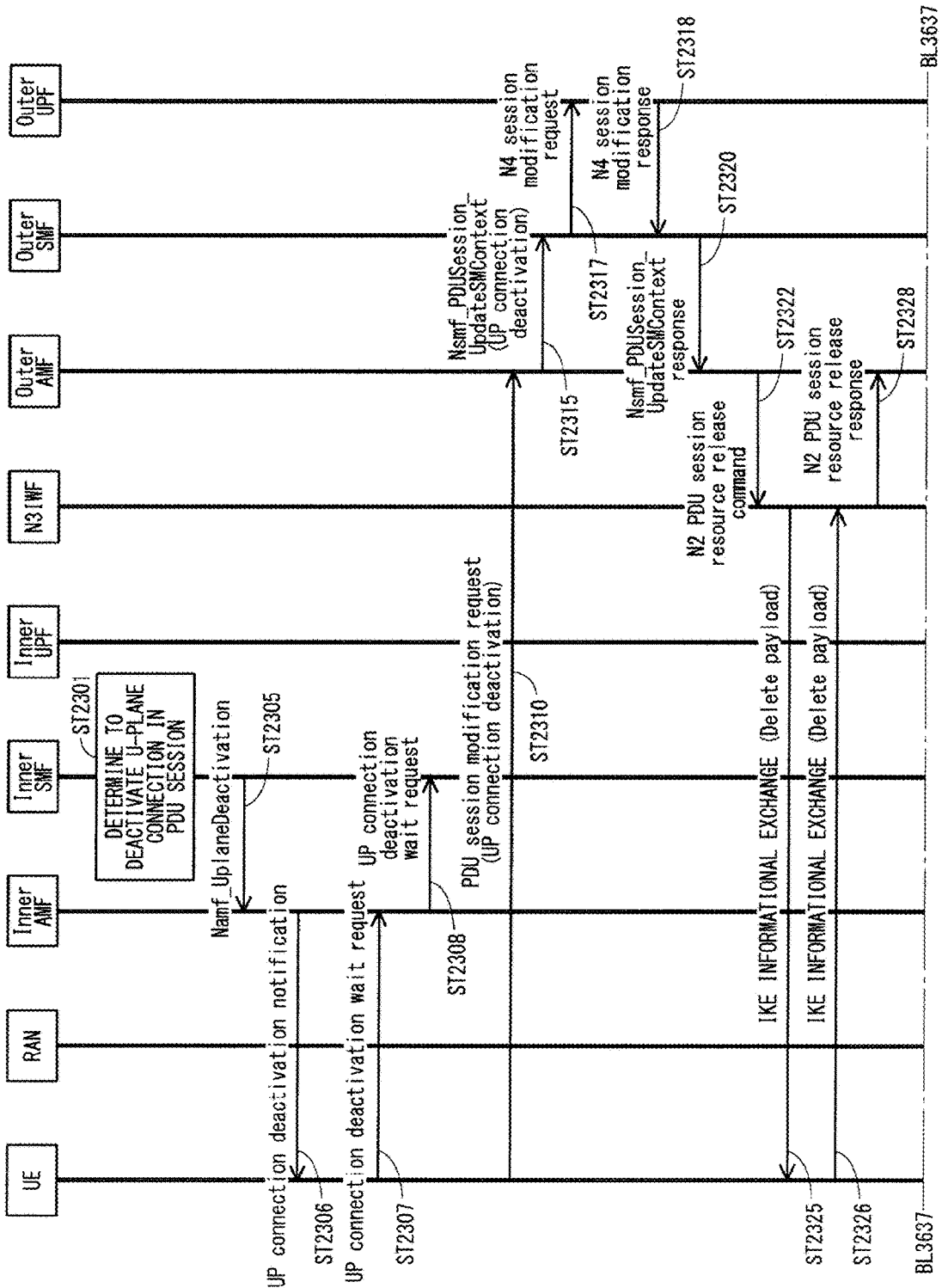
FIG. 36 is a sequence diagram illustrating operations for deactivating the outer U-plane as the inner U-plane is deactivated for the UE connected to the outer NW through the inner NW according to the fourth modification of the first embodiment.

FIGS. 36 and 37 are sequence diagrams illustrating operations for deactivating the outer U-plane as the inner U-plane is deactivated for the UE connected to the outer NW through the inner NW. FIGS. 36 and 37 are connected across a location of a border BL3637. FIGS. 36 and 37 illustrate an example where the inner SMF starts deactivating the inner U-plane.

In Step ST2301 of FIG. 36, the inner SMF determines to deactivate the U-plane connection in the inner PDU session.

In Step ST2305 of FIG. 36, the inner SMF notifies the inner AMF to deactivate the inner U-plane. The inner SMF may give the notification via the signaling described in Non-Patent Document 25 (TS23.502), or new signaling, for example, Namf_UplaneDeactivation. The notification in Step ST2305 may include information on the U-plane deactivation, for example, information indicating the U-plane deactivation and/or a PDU session identifier.

In Step ST2306 of FIG. 36, the inner AMF notifies the UE to deactivate the inner U-plane. The inner AMF may give the notification via the NAS signaling described in Non-Patent Document 25 (TS23.502), or new NAS signaling, for example, using the U-plane deactivation notification. The notification in Step ST2306 may include information identical to that in Step ST2305.

In Step ST2307 of FIG. 36, the UE requests the inner AMF to wait for the inner U-plane deactivation. The UE may make the request via the NAS signaling described in Non-Patent Document 25 (TS23.502). The UE may make the request via new NAS signaling, for example, using the U-plane deactivation wait request. The request in Step ST2307 may include information on waiting for the U-plane deactivation, for example, information indicating waiting for deactivation, information on the PDU session corresponding to the U-plane to be deactivated, and/or U-plane deactivation idle time.

In Step ST2308 of FIG. 36, the inner AMF requests the UE to wait for the inner U-plane deactivation. The inner AMF may make the request via the signaling described in Non-Patent Document 25 (TS23.502). The inner AMF may make the request via new signaling, for example, Nsmf_PDUSession_UpdateSMContext. The inner AMF may make the request via new signaling, for example, using a response to the Namf_UplaneDeactivation. The inner AMF may make the request using Nsmf_UplaneDeactivationWait. The request in Step ST2308 may include information identical to that in Step ST2307.

In Step ST2310 of FIG. 36, the UE requests the outer AMF to deactivate the outer U-plane. The UE may make the request via the NAS signaling described in Non-Patent Document 25 (TS23.502), for example, using the PDU session modification request. The UE may make the request via new NAS signaling, for example, using the U-plane deactivation request. The request in Step ST2310 may include information on the PDU session in which the U-plane connection is deactivated.

In Step ST2315 of FIG. 36, the outer AMF requests the outer SMF to deactivate the outer U-plane. The outer AMF may make the request via the signaling described in Non-Patent Document 25 (TS23.502), for example, Nsmf_PDUSession_UpdateSMContext. The outer AMF may make the request via new signaling, for example, Namf_UplaneDeactivation. The signaling may include information on the PDU session in which the U-plane connection is deactivated. The outer SMF may start operations for deactivating the outer U-plane, using the information.

In Step ST2317 of FIG. 36, the outer SMF requests the outer UPF to modify the N4 session. The outer SMF may make the request, for example, using the N4 session modification request described in Non-Patent Document 25 (TS23.502). As another example, the outer SMF may request the outer UPF to release the N4 session.

In Step ST2318 of FIG. 36, the outer UPF transmits, to the outer SMF, a response to the request for modifying the N4 session. The outer UPF may perform the transmission, for example, using the N4 session modification response described in Non-Patent Document 25 (TS23.502). As another example, the outer UPF may transmit, to the outer SMF, a response to the request for releasing the N4 session.

In Step ST2320 of FIG. 36, the outer SMF transmits, to the outer AMF, a response to the request for deactivating the outer U-plane. The outer SMF may transmit the response via the signaling described in Non-Patent Document 25 (TS23.502), for example, Nsmf_PDUSession_UpdateSMContext. The outer SMF may transmit the response using Namf_Communication_N1N2MessageTransfer. The outer SMF may transmit the response via new signaling, for example, Nsmf_UplaneDeactivationResponse.

In Step ST2322 of FIG. 36, the outer AMF requests the N3IWF to release the AN resources associated with the PDU session between the outer AMF and the N3IWF. Step ST2322 may be identical to Step ST2110 of FIG. 30.

In Steps ST2325 and ST2326 of FIG. 36, the AN resources associated with the PDU session are released between the N3IWF and the UE. Steps ST2325 and ST2326 may be identical to Steps ST2115 and ST2116 of FIG. 30, respectively.

In Step ST2328 of FIG. 36, the N3IWF transmits, to the outer AMF, a response to the request in Step ST2322. Step ST2328 may be identical to Step ST2120 in FIG. 30.

In Step ST2330 of FIG. 37, the outer AMF transmits, to the outer SMF, information on the N2 connection between the N3IWF and the outer AMF. In Step ST2331, the outer SMF transmits, to the outer AMF, a response to the information. Steps ST2330 and ST2331 may be identical to Steps ST2125 and ST2130 of FIG. 31, respectively.

In Step ST2340 of FIG. 37, the UE requests the inner AMF to resume the inner U-plane. The UE may transmit the request via the NAS signaling described in Non-Patent Document 25 (TS23.502). The UE may transmit the request via new NAS signaling, for example, using notification indicating that the U-plane deactivation is ready. The request may include information on the PDU session in which the U-plane connection is resumed.

In Step ST2341 of FIG. 37, the inner AMF requests the inner SMF to resume the inner U-plane. The inner AMF may make the request via the signaling described in Non-Patent Document 25 (TS23.502), for example, Nsmf_PDUSession_UpdateSMContext. The inner AMF may make the request via new signaling, for example, Nsmf_U-planeDeactivationReady. The request may include information on the PDU session in which the U-plane connection is resumed.

In Steps ST2345 and ST2347 of FIG. 37, the inner NW devices perform processes similar to those performed between the outer NW devices (Steps ST2318 and ST2320 of FIG. 36, respectively).

In Step ST2349 of FIG. 37, the inner SMF and the inner AMF perform processes for releasing the RAN resources associated with the PDU session. In Step ST2349, the Namf_Communication_N1N2MessageTransfer service operation described in 5.2.2.2.7 of Non-Patent Document 25 (TS23.502) may be used.

In Steps ST2350 to ST2354 of FIG. 37, processes similar to those performed in Steps ST2175 to ST2179 of FIG. 32, respectively, are performed.

Although the UE requests the inner AMF to wait for the U-plane connection deactivation in Step ST2340 of FIG. 37, the UE need not make the request. For example, when the UE notifies the inner AMF of the idle time for deactivating the U-plane connection, the UE need not make the request. For example, when the idle time is predefined, the UE need not make the request. The same may apply to the request for waiting for the U-plane connection deactivation from the inner AMF to the inner SMF in Step ST2341. For example, when the inner AMF notifies the inner SMF of the idle time for deactivating the U-plane connection, the inner AMF need not make the request. For example, when the idle time is predefined, the inner AMF need not make the request. This can, for example, reduce the signaling in the communication system.

The outer U-plane need not be deactivated as the inner U-plane is deactivated. For example, only the IPsec connection between the UE and the N3IWF in the outer NW may be released. In response to the request for deactivating the outer U-plane from the UE, the outer AMF may instruct the N3IWF to release the AN resources associated with the PDU session. The outer AMF need not request the outer SMF to deactivate the outer U-plane. This can, for example, promptly deactivate the inner U-plane.

The outer AMF need not implicitly deregister the UE. This can, for example, promptly resume the inner U-plane after deactivation of the inner U-plane.

The outer UPF may transmit the downlink data for the UE to the N3IWF. The N3IWF may hold the downlink data. The operations may be performed, for example, when the inner U-plane is deactivated and the outer U-plane is not deactivated. Upon receipt of the downlink data, the N3IWF may reestablish the IPsec connection with the UE. For example, the method disclosed in the fifth modification of the first embodiment may be applied to reestablishing the IPsec connection between the N3IWF and the UE. The IPsec connection between the N3IWF and the UE may be resumed after resumption of the inner U-plane. This can, for example, promptly resume the inner U-plane after deactivation of the inner U-plane.

As another example, the outer UPF may hold the downlink data for the UE. The outer UPF may notify the outer SMF that the downlink data has been generated. The outer UPF and the UE may resume the communication in the method disclosed in the second modification of the first embodiment. This can, for example, reduce the memory usage in the N3IWF.

A PDU session in which the U-plane connection is not deactivated may exist. For example, the U-plane connection need not be deactivated in the inner PDU session to be used for transmitting and receiving C-plane data in the outer NW. The UE may notify the inner AMF of information on the PDU session. The inner AMF may notify the inner SMF of the information. This enables, for example, stable C-plane communication in the outer NW.

The inner SMF may determine whether to notify the inner AMF to deactivate the inner U-plane. The inner SMF may make the determination using information on the connection with the outer NW. The UE may notify the inner AMF of information on the outer NW. The inner AMF may notify the inner SMF of the information on the outer NW. In response to the notification from the UE to the inner AMF, the inner AMF may give the notification to the inner SMF. This can, for example, reduce the signaling in the communication system.

The outer PDU session may be released as the inner U-plane is deactivated. The outer U-plane may be deactivated as the inner PDU session is released. Here, this fourth modification may be combined with the third modification of the first embodiment. The UE may request the outer AMF to release the outer PDU session or deactivate the outer U-plane. This enables, for example, flexible operations in the communication system.

The fourth modification enables deactivation of the U-plane connection in the outer PDU session as the U-plane connection in the inner PDU session is deactivated. Consequently, the efficiency in the communication system can be increased.

The Fifth Modification of the First Embodiment

The fourth modification of the first embodiment discloses the methods for deactivating the U-plane connection in the PDU session for the UE that is connected in cascade with a plurality of NWs. The fifth modification discloses operations on the outer NW as the UE transitions to RRC_INACTIVE state.

The outer NW may be released using the transition of the UE to RRC_INACTIVE state as a trigger. The outer NW may be released in the method identical to that in the first embodiment. This can, for example, reduce the memory usage in each device in the outer NW.

Another solution is disclosed. The outer NW need not be released for the UE that has transitioned to RRC_INACTIVE state.

This causes the following problem. Specifically, when the UE is connected to the outer NW through the inner NW, the IPsec is used for the AN connection between the outer NW and the UE. Thus, the UE and the N3IWF transmit and receive the keepalives disclosed in Non-Patent Document 28 (IETF RFC3706) even after the UE transitions to RRC_INACTIVE state. Thus, transmission of the keepalives from the N3IWF to the UE triggers the paging from the RAN to the UE, and causes the UE to resume RRC_CONNECTED state. This causes a problem of lessening the reduction of the amount of power consumption in the UE.

A solution to the problem is hereinafter disclosed.

The UE releases the AN connection with the outer NW as the UE transitions to RRC_INACTIVE state. The UE may start releasing the IPsec connection with the N3IWF.

The UE requests the outer AMF to release the AN connection with the outer NW. The UE may make the request via the NAS signaling disclosed in Non-Patent Document 26 (TS24.501). New NAS signaling, for example, NAS signaling for requesting suspension of service (Service suspend) may be provided. The NAS signaling may include information indicating its own UE transitions to RRC_INACTIVE state. The NAS signaling may include the information as a parameter of a cause of the request. Upon receipt of the request, the outer AMF recognizes that the UE transitions to RRC_INACTIVE state. The outer AMF may maintain the NAS connection with the UE.

The outer AMF may transmit, to the UE, a response to the request. The outer AMF may transmit the response via the NAS signaling disclosed in Non-Patent Document 26 (TS24.501). New NAS signaling, for example, NAS signaling for responding to the process for requesting suspension of service (Service suspend Ack) may be provided.

The outer AMF may request the N3IWF to deactivate the N2 connection on the UE between its own AMF and the N3IWF. The outer AMF may make the request via the N2 signaling described in Non-Patent Document 24 (TS38.413), for example, using the N2 UE Context Release Command. New N2 signaling, for example, the N2 UE Suspend Command may be provided and used. The N2 signaling may include information on the UE, for example, an identifier of the UE. The N2 signaling may include information indicating that the N2 connection on the UE will be deactivated. This can, for example, prevent unnecessary signaling between the outer NW and the UE. Consequently, the amount of signaling in the communication system can be reduced. Accordingly, the signaling can prevent unnecessary resumption of RRC_CONNECTED state in the UE. Consequently, the power consumption in the UE can be reduced.

The outer AMF may make the request to the N3IWF, for example, using the connection of the UE to the outer NW through the inner NW. This enables, for example, application of conventional design to the design of the communication system. Consequently, the complexity in designing the communication system can be avoided.

As another example, the outer AMF need not request the N3IWF to deactivate the N2 connection on the UE between its own AMF and the N3IWF. This can, for example, reduce the amount of signaling in the communication system.

The N3IWF releases the AN connection with the UE. The release of the AN connection may be, for example, release of the IPsec configuration. The N3IWF may notify the UE to release the IPsec configuration. The UE may release the IPsec configuration with the N3IWF in response to the notification. The UE may notify the N3IWF that the IPsec configuration has been released. The IPsec configuration between the N3IWF and the UE may be released in the method disclosed in the first embodiment. The UE transitions to RRC_INACTIVE state after giving the notification to the N3IWF.

The outer UPF, the outer SMF, the outer AMF, and/or the N3IWF may hold the outer PDU session on the UE that has transitioned to RRC_INACTIVE state. For example, the N3IWF and/or the outer UPF may hold the resources in the N2 interface to be used for the outer PDU session. As another example, the outer SMF may hold the configuration on the outer PDU session. This enables, for example, the UE to promptly perform operations for transitioning from RRC_INACTIVE state to RRC_CONNECTED state.

The N3IWF may notify the outer AMF of the resumption of the UE to the N2 connection between its own N3IWF and the outer AMF. The N3IWF may give the notification via the N2 signaling described in Non-Patent Document 24 (TS38.413). New N2 signaling, for example, the N2 UE Resume Indication may be provided and used. The N2 signaling may include information on the UE, for example, an identifier of the UE. The N2 signaling may include information indicating that the N2 connection on the UE will be resumed.

As another example, the outer AMF need not request the N3IWF to resume the N2 connection on the UE between its own AMF and the N3IWF. For example, the outer AMF need not request the N3IWF to resume the N2 connection when the outer AMF does not request the N3IWF to deactivate the N2 connection. This can, for example, reduce the amount of signaling in the communication system.

The UE may notify the upper layer (e.g., the NAS layer) in its own UE of information indicating the reception of an instruction for transitioning to RRC_INACTIVE state from the RAN. The UE may give the notification in the method identical to that disclosed in the first embodiment. The UE may give the notification, for example, soon after receiving the transition instruction from the RAN. The UE may give the notification, for example, before delay of 60 milliseconds described in 5.3.8.3 of Non-Patent Document 27 (TS38.331).

As another example, the UE need not request the outer AMF to release the AN connection with the outer NW. The UE may start releasing the AN connection with the N3IWF. For example, the UE may release the IPsec connection with the N3IWF. The UE may notify the N3IWF to release the IPsec. The N3IWF may release the IPsec configuration with the UE in response to the notification. The N3IWF may notify the UE to release the IPsec. This can, for example, reduce the amount of signaling in the communication system.

The duration of the delay may be changed similarly to the first embodiment. For example, the duration of the delay may be set longer than 60 milliseconds. This can, for example, prevent the release of the RRC connection before the release of the AN connection between the UE and the N3IWF.

The inner AMF or the RAN may change the duration of the delay similarly to the first embodiment. The method for the inner AMF and/or the RAN to change the duration of the delay may be identical to that in the first embodiment.

The UE may have a timer for managing the time until the RRC deactivation. The timer may be, for example, a timer for managing the duration of the delay. The operations on the timer may be identical to those for releasing the RRC disclosed in the first embodiment. This facilitates, for example, management of operations for the RRC deactivation in the UE. The inner AMF or the RAN may have the timer. This facilitates, for example, management of the operations for the RRC deactivation in the AMF and/or the RAN.

FIG. 38 is a sequence diagram illustrating the first example of operations for releasing the outer AN as the UE connected to the outer NW through the inner NW transitions to RRC_INACTIVE state. FIG. 38 illustrates an example where the outer AN connection is the IPsec connection and the N3IWF starts releasing the IPsec configuration. In FIG. 38, the same step numbers are applied to the processes identical to those in FIGS. 14 and 15 and FIGS. 28 and 29, and the common description thereof is omitted.

In Step ST2401 of FIG. 38, the RAN instructs the UE to transition to RRC_INACTIVE state. The RAN may issue the instruction via the signaling for releasing the RRC (RRCRelease) disclosed in Non-Patent Document 27 (TS38.331). The signaling may include information indicating that the UE will be deactivated. The signaling may include information on the idle time until the transition to RRC_INACTIVE state similarly to the first embodiment.

In Step ST2405 of FIG. 38, the UE requests the outer AMF to release the AN connection with the outer NW. The UE may make the request via the NAS signaling disclosed in Non-Patent Document 26 (TS24.501). New NAS signaling, for example, NAS signaling for requesting suspension of service (Service suspend) may be provided. The request in Step ST2405 may include information indicating its own UE transitions to RRC_INACTIVE state. The request may include the information as a parameter of a cause of the request.

In Step ST2406 of FIG. 38, the outer AMF transmits, to the UE, a response to the request in Step ST2405. The outer AMF may transmit the response via the NAS signaling disclosed in Non-Patent Document 26 (TS24.501). New NAS signaling, for example, NAS signaling for responding to the process for requesting suspension of service (Service suspend Ack) may be provided.

In Step ST2407 of FIG. 38, the outer AMF requests the N3IWF to deactivate the N2 connection on the UE between its own AMF and the N3IWF. The outer AMF may make the request via the N2 signaling described in Non-Patent Document 24 (TS38.413), for example, using the N2 UE Context Release Command. New N2 signaling, for example, the N2 UE Suspend Command may be provided and used. The request in Step ST2407 may include information on the UE, for example, an identifier of the UE, or information indicating that the N2 connection on the UE will be deactivated.

Steps ST1408 and ST1409 in FIG. 38 are identical to those in FIG. 14.

In Step S2415 of FIG. 38, the UE transitions to RRC_INACTIVE state according to the instruction received in Step ST2401. The UE may transition to RRC_INACTIVE state after the transmission in Step ST1409.

The operations after Step ST2001 in FIG. 38 are operations when the UE resumes from RRC_INACTIVE state.

Step ST2001 in FIG. 38 is identical to that in FIG. 28. In Step ST2420, the outer UPF notifies the N3IWF of the downlink data generated in Step ST2001. The N3IWF may hold the downlink data received in Step ST2420. Upon receipt of the downlink data in Step ST2420, the N3IWF resumes the IPsec connection with the UE.

In Step ST2421 of FIG. 38, the N3IWF transmits, to the inner UPF, the signaling for establishing the IPsec with the UE. In Step ST2422, the inner UPF transmits, to the RAN, the signaling in Step ST2421. The signaling in Steps ST2421 and ST2422 may be identical to that in Step ST2008 of FIG. 28.

In Step ST2423 of FIG. 38, the RAN transmits the paging to the UE. The RAN may transmit the paging in Step ST2423, using Step ST2422 as a trigger. In Step ST2425, the UE and the RAN perform a procedure for resuming the RRC. The procedure may include, for example, a request for resuming the RRC from the UE to the RAN, an instruction for resuming the RRC from the RAN to the UE, or completion of resuming the RRC from the UE to the RAN. In Step ST2426, the UE resumes RRC_CONNECTED state.

In Step ST2430 of FIG. 38, the RAN transmits, to the UE, the signaling for establishing the IPsec which has been transmitted by the N3IWF. The RAN may perform the transmission in Step ST2430, via the signaling of Step ST2422 held by its own RAN.

Steps ST2036 and ST2037 in FIG. 38 are identical to those in FIG. 29.

In Step ST2438 of FIG. 38, the N3IWF requests the outer AMF to resume the N2 connection on the UE between its own N3IWF and the outer AMF. The N3IWF may give the notification via the N2 signaling described in Non-Patent Document 24 (TS38.413). New N2 signaling, for example, the N2 UE Resume Indication may be provided and used. The request in Step ST2438 may include information on the UE, for example, an identifier of the UE, or information indicating that the N2 connection on the UE will be resumed.

In Step ST2440 of FIG. 38, the N3IWF transmits the downlink data to the UE. The N3IWF may transmit the downlink data, using the data in Step ST2420 that is held by the N3IWF.

Although FIG. 38 illustrates that the outer AMF transmits, to the UE, a response to the request in Step ST2405, the outer AMF need not transmit the response. The UE may determine that the request in Step ST2405 has been accepted, from the release of the IPsec configuration in Steps ST1408 and ST1409. This can, for example, reduce the amount of NAS signaling between the UE and the outer AMF.

Another solution is disclosed. The UE may start releasing the IPsec configuration. Upon receipt of the instruction for transitioning to RRC_INACTIVE state from the RAN, the UE may release the IPsec configuration between the UE and the N3IWF. The UE may notify the N3IWF to release the IPsec configuration. Upon receipt of the notification, the N3IWF may release the IPsec configuration between the UE and the N3IWF. This saves, for example, the signaling for the N2 deactivation from the outer AMF to the N3IWF. Consequently, the amount of signaling in the N2 interface can be reduced.

Figure 39:
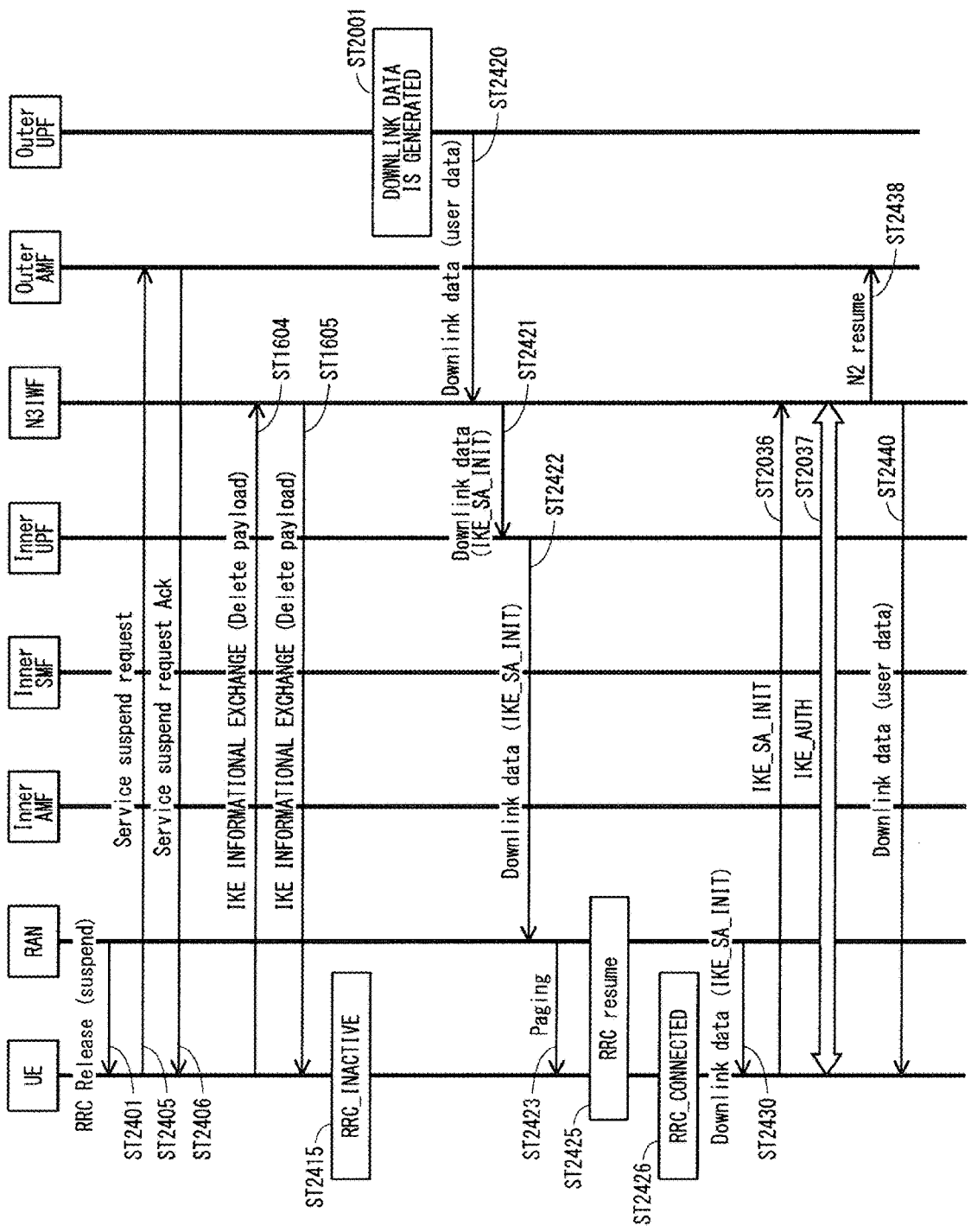
FIG. 39 is a sequence diagram illustrating the second example of operations for releasing the outer AN as the UE transitions to RRC_INACTIVE state according to the fifth modification of the first embodiment.

FIG. 39 is a sequence diagram illustrating the second example of operations for releasing the outer AN as the UE connected to the outer NW through the inner NW transitions to RRC_INACTIVE state. FIG. 39 illustrates an example where the outer AN connection is the IPsec connection and the UE starts releasing the IPsec configuration. In FIG. 39, the same step numbers are applied to the processes identical to those in FIGS. 14 and 15, FIGS. 18 and 19, FIGS. 28 and 29, and FIG. 38, and the common description thereof is omitted.

Steps ST2401 to ST2406 in FIG. 39 are identical to those in FIG. 38.

In Steps ST1604 and ST1605 of FIG. 39, the UE notifies the N3IWF to release the IPsec configuration earlier than the notification for releasing the IPsec configuration from the N3IWF to the UE, similarly to FIG. 18.

Steps ST2415 to ST2440 in FIG. 39 are identical to those in FIGS. 29 and 38.

Another solution is disclosed. The UE need not implement the keepalives with the outer NW to which the UE is connected through the inner NW. The cycle of the keepalives may be infinite. As another example, the UE may implement the keepalives using the signaling for Tracking Area Update and/or RAN Notification Area update (RNA update) in the UE. Here, the UE need not request the inner AMF to suspend service. This can, for example, reduce the amount of signaling in the communication system.

When the network between the UE and the N3IWF is 3GPP access, for example, the inner NW, the UE need not implement the keepalives, or may perform operations of configuring the infinite cycle of the keepalives and/or implementing the keepalives using the signaling for Tracking Area Update and/or RAN Notification Area update. When the UE is connected in cascade with the inner NW and the outer NW, the UE need not implement the keepalives, or may perform operations of configuring the infinite cycle of the keepalives and/or implementing the keepalives using the signaling for Tracking Area Update and/or RAN Notification Area update. The UE may notify the N3IWF of information on the network between the UE and the N3IWF. The UE may notify the N3IWF of information on the cascade connection, for example, information on the presence or absence of the cascade connection. As another example, the UE may notify the outer AMF of the information. The outer AMF may transfer the information to the N3IWF. For example, the outer AMF may transfer the information to the N3IWF, using the connection of the UE to the outer NW through the inner NW. The entity that determines whether to implement the keepalives may be the UE, the N3IWF, or the outer AMF. Similarly, the entity that determines whether to configure the infinite cycle of the keepalives may be the UE, the N3IWF, or the outer AMF. The entity that determines whether to implement the keepalives using the signaling for Tracking Area Update and/or RAN Notification Area update may be the UE, the N3IWF, or the outer AMF. This can, for example, reduce the amount of signaling between the UE and the N3IWF.

The fifth modification can prevent the N3IWF from transmitting the keepalives to the UE in RRC_INACTIVE state. This can prevent the UE from resuming RRC_CONNECTED state for transmitting and receiving the keepalives. Consequently, the power consumption in the UE can be reduced.

The Sixth Modification of the First Embodiment

The fifth modification of the first embodiment discloses the operations on the outer NW as the UE that is connected in cascade with a plurality of NWs transitions to RRC_INACTIVE state. The sixth modification discloses methods for updating the configuration on the UE.

The UE notifies the outer AMF of information on update of the configuration in the inner NW. The UE may give the notification, for example, when the inner AMF determines to update the configuration of the UE.

The UE may give the notification via the NAS signaling. The NAS signaling may be the NAS signaling described in Non-Patent Document 25 (TS23.502). New NAS signaling, for example, the UE configuration update notification may be provided and used.

The UE may include, in the notification, information on the NW whose configuration has been updated, for example, information indicating the inner NW. The UE may include, in the notification, information on the updated configuration. The updated configuration may include, for example, a parameter disclosed in 8.2.19 of Non-Patent Document 26 (TS24.501). The updated configuration may include, for example, information on the NW slicing permitted in the NW.

The outer AMF may update the configuration of the UE in the outer NW, using the notification. This can, for example, prevent a variance on the configuration of the same UE, between the inner NW and the outer NW. For example, the inner NW and the outer NW can maintain the same QoS.

The outer AMF may perform the update, for example, via the NAS signaling, e.g., the UE Configuration Update command signaling described in Non-Patent Document 25 (TS23.502). The signaling may include information on a cause of the update. The cause of the update may be, for example, update of the UE configuration in another NW.

The UE may determine whether updating the configuration in one of NWs needs to be notified to the AMF in the other NW, using the cause included in the notification. For example, when the cause is updating the configuration in the other NW, the UE need not notify the AMF in the other NW to update the configuration of its own UE. For example, when the UE configuration in the outer NW is updated as the UE configuration in the inner NW is updated, this method can prevent update of the UE configuration in the outer NW from triggering the update of the UE configuration in the inner NW. Specifically, the cycle of updating the UE configuration can be prevented.

The outer AMF may notify the N3IWF of the updated UE configuration. The outer AMF may give the notification, for example, via the N2 signaling. In response to the notification, the N3IWF may change the IPsec configuration according to the updated configuration. For example, the N3IWF may reconfigure the child SA in IPsec. This can, for example, satisfy the QoS after the update in the outer NW according to the update of the configuration in the inner NW.

The outer AMF may make the request to the N3IWF, for example, using the connection of the UE to the outer NW through the inner NW. The outer AMF may make the request to the N3IWF, using information on the updated UE configuration in the inner NW, for example, information indicating that the cause included in the notification from the UE is on the update of the configuration in the inner NW. This enables, for example, application of conventional design to the design of the communication system. Consequently, the complexity in designing the communication system can be avoided.

As another example, the UE may change the IPsec configuration according to the updated configuration. For example, the UE may reconfigure the child SA in IPsec. This can, for example, reduce the N2 signaling from the outer AMF to the N3IWF.

Figure 40:
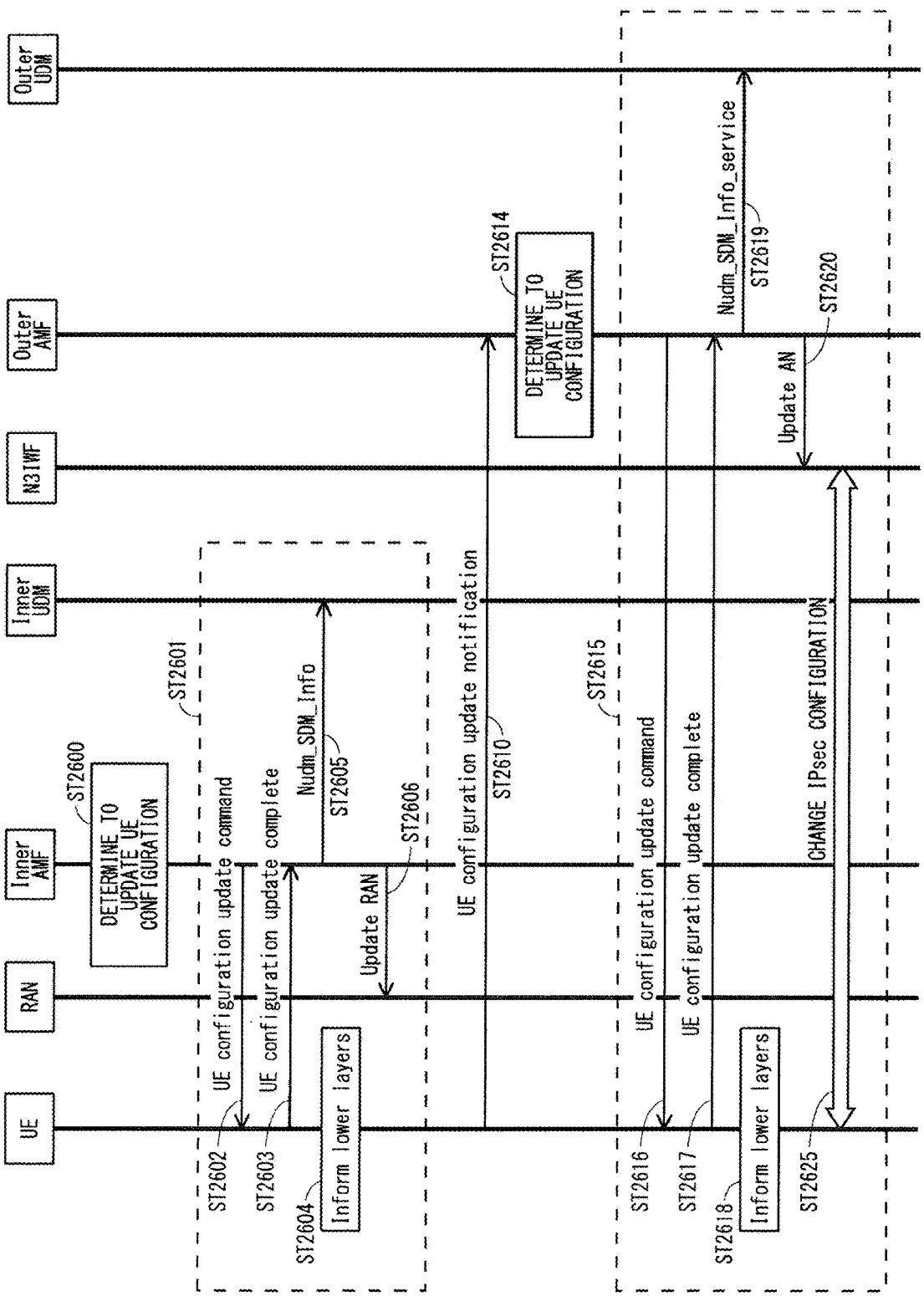
FIG. 40 is a sequence diagram illustrating operations for notifying the outer NW to update a UE configuration in the inner NW according to the sixth modification of the first embodiment.

FIG. 40 is a sequence diagram illustrating operations for notifying the outer NW to update the UE configuration in the inner NW, for the UE connected to the outer NW through the inner NW. FIG. 40 illustrates an example where the UE notifies the outer AMF to update the configuration in the inner NW.

In Step ST2600 of FIG. 40, the inner AMF determines to update the UE configuration.

In a procedure 2601 of FIG. 40, the configuration of the UE in the inner NW is updated. The procedure 2601 includes Steps ST2602 to ST2606.

In Step ST2602 of FIG. 40, the inner AMF transmits, to the UE, an instruction for updating the UE configuration. The inner AMF may issue the instruction via the NAS signaling, for example, the UE Configuration Update command signaling described in Non-Patent Document 25 (TS23.502). The signaling may include information on a cause of the update. The UE may update the configuration of its own UE in the inner NW, according to the instruction in Step ST2602. In Step ST2603, the UE notifies the inner AMF of the completion of the update of the configuration of its own UE. The UE may give the notification via the NAS signaling, for example, the UE Configuration Update command signaling described in Non-Patent Document 25 (TS23.502). In Step ST2604, the UE notifies the lower layers, for example, the RRC layer of the update of the configuration.

In Step ST2605 of FIG. 40, the inner AMF notifies the inner UDM that the UE has completed the change in the configuration. The inner AMF may give the notification, for example, using the Nudm_SDM_Info service operation described in 5.2.2.3.6 of Non-Patent Document 25 (TS23.502). In Step ST2606, the inner AMF notifies the RAN to update the UE configuration. The inner AMF may give the notification via the N2 signaling.

In Step ST2610 of FIG. 40, the UE notifies the outer AMF that the configuration of its own UE in the inner NW has been updated. The UE may give the notification in Step ST2610 via the NAS signaling, for example, the NAS signaling described in Non-Patent Document 25 (TS23.502). New NAS signaling, for example, the UE configuration update notification may be provided. The notification in Step ST2610 may include information on the NW whose configuration has been updated, for example, information indicating the inner NW. The notification in Step ST2610 may include information on the updated configuration. The updated configuration may include, for example, a parameter disclosed in 8.2.19 of Non-Patent Document 22 (TS23.501). The updated configuration may include, for example, information on the NW slicing permitted in the NW.

In Step ST2614 of FIG. 40, the outer AMF may determine to update the UE configuration. The UE configuration that the outer AMF determines to update may be a UE configuration on the outer NW. The outer AMF may perform Step ST2614 in response to the notification in Step ST2610.

In a procedure 2615 of FIG. 40, the configuration of the UE in the inner NW is updated. The procedure 2615 includes Steps ST2616 to ST2625.

In Steps ST2616 to ST2619 of FIG. 40, the outer AMF, the outer UDM, and the UE perform processes similar to those performed in Steps ST2602 to ST2605. In Step ST2620, the outer AMF notifies the N3IWF to update the UE configuration. The outer AMF may give the notification via the N2 signaling. In Step ST2625, the N3IWF and the UE change the IPsec configuration.

The instruction in Step ST2616 of FIG. 40 may include information on a cause of the update. The cause of the update may be, for example, update of the UE configuration in the inner NW. The UE may determine not to notify the inner AMF to update the configuration in the outer NW, based on the cause included in the notification. For example, when the UE configuration in the outer NW is updated as the UE configuration in the inner NW is updated, this method can prevent update of the UE configuration in the outer NW from triggering the update of the UE configuration in the inner NW. Specifically, the cycle of updating the UE configuration can be prevented.

The similar method may be applied when the outer AMF updates the UE configuration. The UE may notify the inner AMF of information on the update of the configuration in the outer NW. The UE may give the notification to the inner AMF similarly to the notification of information on update of the configuration in the inner NW from the UE to the outer NW. This enables, for example, update of the configuration in the inner NW with reflection of the updated configuration in the outer NW. For example, the inner NW and the outer NW can secure the same QoS.

The updated UE configuration from the inner AMF to the UE may include information on a cause of the update. The cause of the update may be, for example, update of the UE configuration performed by another NW. This can, for example, prevent the cycle of updating the UE configuration.

FIG. 41 is a sequence diagram illustrating operations for notifying the inner NW to update the UE configuration in the outer NW, for the UE connected to the outer NW through the inner NW. FIG. 41 illustrates an example where the UE notifies the inner AMF to update the configuration in the outer NW. In FIG. 41, the same numbers are applied to the processes identical to those in FIG. 40, and the common description thereof is omitted.

In Step ST2701 of FIG. 41, the outer AMF determines to update the UE configuration.

The procedure 2615 in FIG. 41 is identical to that in FIG. 40.

In Step ST2710 of FIG. 41, the UE notifies the inner AMF that the configuration of its own UE in the outer NW has been updated. The UE may give the notification in Step ST2710 via the same signaling in Step ST2610. The notification in Step ST2710 may include information identical to that in Step ST2610.

In Step ST2711 of FIG. 41, the inner AMF may determine to update the UE configuration. The UE configuration that the inner AMF determines to update may be a UE configuration on the inner NW. The outer AMF may perform Step ST2711 using the notification in Step ST2710.

The procedure 2615 in FIG. 41 is identical to that in FIG. 40.

The UE may notify the outer AMF of information on the QoS flow in the inner NW. The information may be an identifier of the QoS flow, or the 5QI disclosed in Non-Patent Document 22 (TS23.501). The information may be included in, for example, the notification to the outer AMF on update of the UE configuration in the inner NW. The outer AMF may update the UE configuration in the outer NW, using the information. The UE may notify the inner AMF of similar information. This can, for example, prevent a variance in QoS between the outer PDU session and the inner PDU session. Consequently, the QoS in the communication system can be secured.

The notification may be used for establishing the PDU session or modifying the PDU session (PDUsession modification). The UE may notify the outer AMF of information on the QoS flow in the inner NW. The information may be an identifier of the QoS flow, or the 5QI disclosed in Non-Patent Document 22 (TS23.501). The outer AMF may transfer the information to the outer SMF. The outer SMF may establish the outer PDU session using the information. The UE may notify the inner AMF of similar information. This can, for example, prevent a variance in QoS between the outer PDU session and the inner PDU session. Consequently, the QoS in the communication system can be secured.

The outer NW and the inner NW may use the same or overlapping information on the NW slicing. The information may be, for example, NSSAI. This can, for example, secure the same QoS in the outer NW and the inner NW, and increase the efficiency in the communication system.

Information indicating a relationship between the inner PDU session and the outer PDU session may be provided. The information may be, for example, information on the inner PDU session to be used (or included) in the outer PDU session. The UE may notify the information to the inner AMF or the outer AMF. The inner AMF may notify the inner SMF of the information. The outer AMF may notify the outer SMF of the information. The inner SMF may notify the inner UPF of the information. The outer SMF may notify the outer UPF of the information. These can, for example, prevent reserving overlapping resources in each of the inner PDU session and the outer PDU session using the inner PDU session. This can reduce the memory usage in each device in the communication system, and increase the efficiency in the communication system.

As another example, information indicating a relationship between the NW slicing in the inner NW and the NW slicing in the outer NW may be provided. Information indicating a relationship between the QoS flow in the inner NW and the QoS flow in the outer NW may be provided. The entity that notifies the information and/or a destination to which the information is notified may be those previously described. This produces the same advantages as previously described.

The method disclosed in the sixth modification may be used in a procedure for registering the NWs of the UE or in a service request procedure. For example, the UE may include information on the UE configuration in the inner NW, in a registration request to be transmitted to the outer AMF through the N3IWF. As another example, the UE may include information on the UE configuration in the inner NW, in a service request to be transmitted to the outer AMF through the N3IWF. The outer AMF may determine the UE configuration in the outer NW, using the information. This enables, for example, the outer AMF to promptly establish the NW configuration without any variance in configuration between the inner NW and the outer NW.

The sixth modification can prevent a variance in configuration between the inner NW and the outer NW.

The Second Embodiment

The first embodiment to the sixth modification of the first embodiment disclose the procedures on the UE that is connected in cascade with a plurality of NWs. The second embodiment discloses methods for managing UE states.

The UE has states for the inner NW and states for the outer NW. Examples of the states may include Connection Management (CM) states, Registration Management (RM) states, and 5G Mobility Management (5GMM) states described in Non-Patent Document 26 (TS24.501).

The CM states may include CM-IDLE and CM-CONNECTED states. The UE in CM-IDLE state may be a UE that does not establish the NAS signaling connection with the AMF. The CM-IDLE UE may select and/or reselect a cell, or select a PLMN. The UE in CM-CONNECTED state may be a UE that establishes the NAS signaling connection with the AMF. The AMF in CM-IDLE state need not establish the NAS signaling with the UE. The AMF in CM-CONNECTED state may establish the NAS signaling with the UE.

The RM states may include RM-DEREGISTERED and RM-REGISTERED states. The UE in RM-DEREGISTERED state may be a UE that is not registered in a network. The network may be a PLMN or a NPN. The same may apply to the following description. The UE may attempt registration into a network selected by the UE. The UE in RM-REGISTERED state may be a UE that is registered in a network. The UE may regularly update the registered information. The registered information may be, for example, information on the position of the UE. The AMF in RM-DEREGISTERED state may accept or reject a request for initial registration from the UE. The AMF in RM-REGISTERED state may start an implicit deregistration timer.

The states for the inner NW need not be affected by establishment/release of connection with the outer NW or establishment of registration/deregistration of the outer NW. For example, the CM-CONNECTED UE in the inner NW may maintain CM-CONNECTED state, irrespective of the establishment/release of connection with the outer NW. The RM-REGISTERED UE in the inner NW may maintain RM-REGISTERED state, irrespective of the registration/deregistration of the outer NW.

The states for the inner NW may transition through at least establishment/release of connection with the inner NW or at least establishment of registration/deregistration of the inner NW. For example, the CM-CONNECTED UE in the inner NW may transition to CM-IDLE state through at least release of the connection with the inner NW. The CM-IDLE UE in the inner NW may transition to CM-CONNECTED state through at least establishment of the connection with the inner NW. The same may apply to the RM states. For example, the RM-REGISTERED UE in the inner NW may transition to RM-DEREGISTERED state through at least deregistration from the outer NW. The RM-DEREGISTERED UE in the inner NW may transition to RM-REGISTERED state through at least establishment of registration in the inner NW.

The states for the outer NW may transition through the release of connection with the inner NW or deregistration from the inner NW. For example, the CM-CONNECTED UE in the outer NW may transition to CM-IDLE state through the release of the connection with the inner NW. The RM-REGISTERED UE in the outer NW may transition to RM-DEREGISTERED state through deregistration from the inner NW.

FIGS. 42 and 43 illustrate transition of states of the UE connected to the outer NW through the inner NW. FIG. 42 illustrates the CM states on the inner NW, whereas FIG. 43 illustrates the CM states on the outer NW.

In FIG. 43, the CM-IDLE UE in the inner NW transitions to CM-CONNECTED state when at least the connection with the inner NW is established, for example, when the AN signaling connection in the inner NW is established.

In FIG. 43, the CM-CONNECTED UE in the inner NW maintains the CM state when only the connection with the outer NW is established, for example, even when the AN signaling in the outer NW is established/released. The CM-CONNECTED UE in the inner NW transitions to CM-IDLE state when at least the AN signaling connection in the inner NW is released.

In FIG. 43, the CM-IDLE UE in the outer NW transitions to CM-CONNECTED state when the connection with the outer NW is established, for example, when the AN signaling connection in the outer NW is established.

In FIG. 43, the CM-CONNECTED UE in the outer NW transitions to CM-IDLE state when the connection with the inner NW and/or the outer NW is released, for example when the AN signaling connection in the inner NW and/or the outer NW is released.

Although FIGS. 42 and 43 illustrate the CM states, they may apply to the RM states. This can, for example, prevent a variance in the RM states between the UE, the inner AMF, and the outer AMF. Consequently, a malfunction in the communication system can be prevented.

Another solution is disclosed. The states for the inner NW and the states for the outer NW are integrated. For example, the CM states in the UE may transition to CM-CONNECTED state through establishment of the connection with the inner NW, and transition to CM-IDLE state through the release of the connection with the inner NW. As another example, a CM state in the UE may be CM-CONNECTED state only when the connection between the UE and each of the inner NW and the outer NW is established. Otherwise, the CM state may be CM-IDLE state. The same may apply to the RM states.

As another example of integrating the states for the inner NW and the outer NW, a state indicating a cascade connection may be added. For example, when the connection between the UE and each of the inner NW and the outer NW is released, the UE may be in CM-IDLE state. When the connection with the inner NW is established, the UE may be in CM-CONNECTED state. When the connection between the UE and each of the inner NW and the outer NW is established, the UE may be in the added state, for example, CM-CASCADE-CONNECTED state. This can, for example, reduce the number of state machines in the UE. Consequently, the memory usage in the UE can be reduced. The same may apply to the RM states. This can, for example, reduce the number of RM state machines in the UE. Consequently, the same advantages as previously described are produced.

Figure 44:
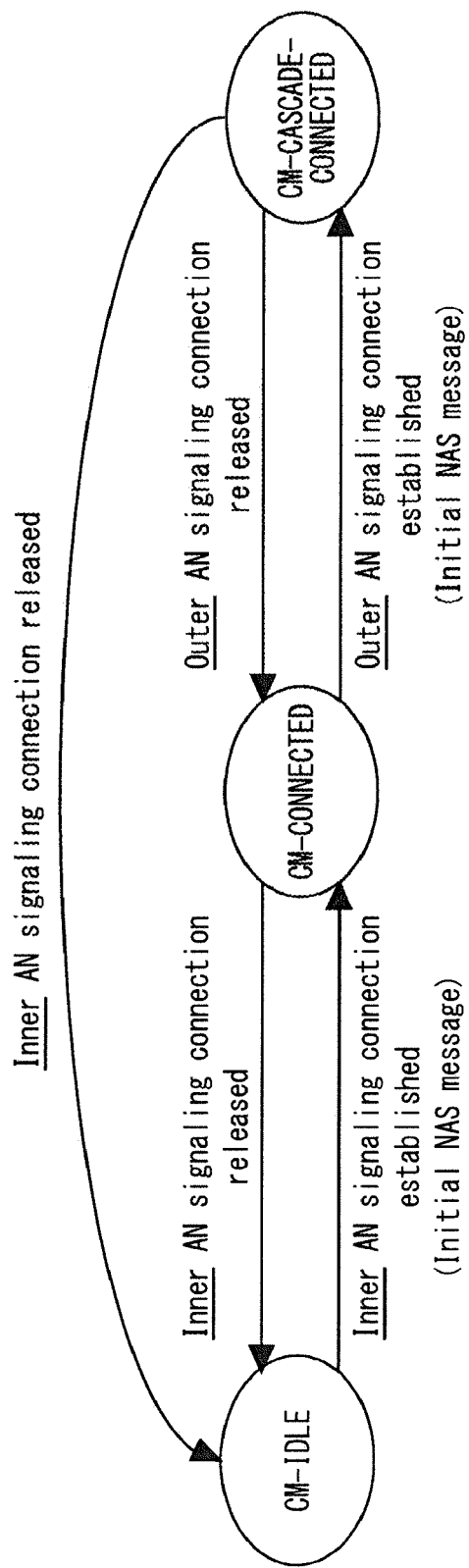
FIG. 44 is a transition diagram of CM states of the UE connected to the outer NW through the inner NW according to the second embodiment.

FIG. 44 illustrates another example transition of states of the UE connected to the outer NW through the inner NW. In FIG. 44, the UE has three states of CM-IDLE, CM-CONNECTED, and CM-CASCADE-CONNECTED.

In FIG. 44, the CM-IDLE UE transitions to CM-CONNECTED state when the connection with the inner NW is established, for example, when the AN signaling connection in the inner NW is established.

In FIG. 44, the CM-CONNECTED UE transitions to CM-CASCADE-CONNECTED state when the connection with the outer NW is established, for example, when the AN signaling connection in the outer NW is established. The CM-CONNECTED UE transitions to CM-IDLE state when the connection with the inner NW is released, for example, when the AN signaling connection in the inner NW is released.

In FIG. 44, the CM-CASCADE-CONNECTED UE transitions to CM-CONNECTED state when the connection with the outer NW is released, for example, when the AN signaling connection in the outer NW is released. The CM-CASCADE-CONNECTED UE transitions to CM-IDLE state when the connection with the inner NW is released, for example, when the AN signaling connection in the inner NW is released.

Although FIG. 44 illustrates the CM states, it may apply to the RM states. This can, for example, reduce the number of state machines in the RM states. Consequently, the memory usage in the UE can be reduced.

The AMF may have the integrated states for the inner NW and the outer NW. For example, the inner AMF, the outer AMF, or both of the inner AMF and the outer AMF may have the integrated states. This enables, for example, the UE, the inner AMF, and the outer AMF to share the similar state machines. Consequently, the design complexity in the communication system can be avoided. This further can, for example, prevent a variance in state between the UE, the inner AMF, and the outer AMF. Consequently, a malfunction in the communication system can be prevented.

The UE may notify the inner AMF of information on the outer NW. The information may be, for example, the information disclosed in the first embodiment, or may include information on the states of its own UE in the outer NW. The UE may notify the information, for example, via the NAS signaling similarly to the first embodiment. The inner AMF may update the states of its own AMF on the UE, using the information. This can, for example, prevent a variance in state between the UE, the inner AMF, and the outer AMF. Consequently, a malfunction in the communication system can be prevented.

The UE may notify the outer AMF of information on the inner NW. The information may be, for example, the aforementioned information. This produces, for example, the same advantages as previously described.

As another example of integrating the states for the inner NW and the outer NW, parameters on the number of network connection stages of the UE may be added. For example, when the UE is connected only to the inner NW, a value of the parameter when the UE is in the CM state may be 1. When the UE is connected to the inner NW and the outer NW, a value of the parameter may be 2. When the UE is further connected to an additional outer NW of the outer NW, a value of the parameter may be 3. The parameters may be provided for the RM states. The parameters may be provided for the CM states in the AMF, or for the RM states in the AMF. This can, for example, avoid the complexity in managing the states in the cascade connection with three or more networks.

Another solution is disclosed. The states for the outer NW need not be affected by establishment/release of connection with the inner NW or establishment of registration/deregistration of the inner NW. For example, the connection with the outer NW may be maintained when the connection with the inner NW is released, or the registration in the outer NW may be maintained in deregistration from the inner NW. This can, for example, increase the flexibility in the communication system.

The methods disclosed in the second embodiment may be applied to the 5GMM states in Non-Patent Document 26 (TS24.501). This can, for example, reduce the number of state machines in the 5GMM states. Consequently, the memory usage in the UE can be reduced.

The second embodiment can reduce the number of state machines in the UE. Consequently, the memory usage in the UE can be reduced. Furthermore, the variance in state between the UE, the inner AMF, and the outer AMF can be prevented. Consequently, a malfunction in the communication system can be prevented. The prevention of the malfunction can also prevent delay in starting the processing in each device in the communication system from the original timing.

The embodiments and the modifications are mere exemplifications, and can be freely combined. The arbitrary constituent elements of the embodiments and the modifications can be appropriately modified or omitted.

For example, a subframe in the embodiments and the modifications is an example time unit of communication in the fifth generation base station communication system. The subframe may be configured per scheduling. The processes described in the embodiments and the modifications as being performed per subframe may be performed per TTI, per slot, per sub-slot, or per mini-slot.

While the present disclosure is described in detail, the foregoing description is in all aspects illustrative and does not restrict the present disclosure. Therefore, numerous modifications and variations that have not yet been exemplified are devised.

DESCRIPTION OF REFERENCES 200, 210 communication system, 202 communication terminal device, 203 base station device.

The invention claimed is:

1. A communication terminal apparatus configured to connect to a plurality of networks, the plurality of networks comprising: a first network including a Radio Access Network (RAN), a first Access and Mobility Management Function (AMF) and a User Plane Function (UPF); and a second network including a Non-3GPP Interworking Function (N3IWF) and a second AMF, the communication terminal apparatus comprises:
a memory storing instructions; and
one or more processors configured to excite instructions to:
connect to the first network through the RAN, and connect to the second network through the UPF in the first network and the N3IWF in the second network;
transmit, to the N3IWF, a signaling for requesting the N3IWF and the second AMF to release a connection between the communication terminal apparatus and the second network; and
transmit to the RAN, a signaling for requesting the RAN and the first AMF to release a connection between the communication terminal apparatus and the first network.

2. The communication terminal apparatus according to claim 1, wherein the one or more processors are configured to execute the instructions to transmit the signaling for requesting the N3IWF and the second AMF to release the connection between the communication terminal apparatus and the second network in a state in which the communication terminal apparatus maintains a connection between the communication terminal apparatus and the first network.

3. The communication terminal apparatus according to claim 2, wherein the one or more processors are configured to execute the instructions to transmit the signaling for requesting the N3IWF and the second AMF to release the connection between the communication terminal apparatus and the second networks in a state in which the communication terminal apparatus maintains a Protocol Data Unit (PDU) session between the communication terminal apparatus and the first network.

4. The communication terminal apparatus according to claim 1, wherein the second network further includes a Session Management Function (SMF), and
the second AMF is configured to transmit, to the SMF, information on deactivation of a user plane connection in a Protocol Data Unit (PDU) session between the communication terminal apparatus and the second network.

5. The communication terminal apparatus according to claim 1, wherein the one or more processors are configured to execute the instructions to initiate release of Internet Protocol Security (IPsec) configuration.

6. The communication terminal apparatus according to claim 1, wherein the communication terminal apparatus has a Connection Management (CM) state in the first network and a CM state in the second network, independently.

7. The communication terminal apparatus according to claim 1, wherein the communication terminal apparatus has a Registration Management (RM) state in the first network and an RM state in the second network, independently.

8. The communication terminal apparatus according to claim 1, wherein the first network is a Public Land Mobile Network (PLMN), and
the second network is a standalone Non-Public Network (NPN).

9. The communication terminal apparatus according to claim 1, wherein the first network is a standalone Non-Public Network (NPN), and
the second network is a Public Land Mobile Network (PLMN).

10. A communication system comprising a communication terminal apparatus configured to connect to a plurality of networks, the plurality of networks comprising: a first network including a Radio Access Network (RAN), a first Access and Mobility Management Function (AMF) and a User Plane Function (UPF); and a second network including a Non-3GPP Interworking Function (N3IWF) and a second AMF, wherein
the communication terminal apparatus is configured to connect to the first network through the RAN, and connect to the second network through the UPF in the first network and the N3IWF in the second network;
the communication terminal apparatus is configured to transmit, to the N3IWF a signaling for requesting the N3IWF and the second AMF to release a connection between the communication terminal apparatus and the second network; and
the communication terminal apparatus is configured to transmit to the RAN, a signaling for requesting the RAN and the first AMF to release a connection between the communication terminal apparatus and the first network.

* * * * *